(12) United States Patent
Ito

(10) Patent No.: US 7,760,293 B2
(45) Date of Patent: Jul. 20, 2010

(54) OPTICALLY COMPENSATORY FILM AND POLARIZING PLATE AND LIQUID CRYSTAL DISPLAY USING SAME

(75) Inventor: Yoji Ito, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 93 days.

(21) Appl. No.: 11/990,636

(22) PCT Filed: Aug. 22, 2006

(86) PCT No.: PCT/JP2006/317022

§ 371 (c)(1),
(2), (4) Date: Feb. 19, 2008

(87) PCT Pub. No.: WO2007/024002

PCT Pub. Date: Mar. 1, 2007

(65) Prior Publication Data

US 2009/0115940 A1     May 7, 2009

(30) Foreign Application Priority Data

Aug. 22, 2005  (JP) ............................. 2005-240265
Sep. 1, 2005   (JP) ............................. 2005-253692

(51) Int. Cl.
    *G02F 1/1335* (2006.01)
(52) U.S. Cl. .................... 349/96; 349/117; 349/118
(58) Field of Classification Search .................. None
    See application file for complete search history.

(56) References Cited

U.S. PATENT DOCUMENTS

2005/0123693 A1   6/2005   Ito

2006/0176427 A1*  8/2006   Yoshimi et al. ............. 349/118
2007/0040963 A1*  2/2007   Maruyama et al. ........... 349/96

FOREIGN PATENT DOCUMENTS

| CN | 1646954 A    | 7/2005  |
|----|--------------|---------|
| JP | 2-176625 A   | 7/1990  |
| JP | 9-80424 A    | 3/1997  |
| JP | 9-211444 A   | 8/1997  |
| JP | 9-292522 A   | 11/1997 |
| JP | 10-54982 A   | 2/1998  |
| JP | 10-307291 A  | 11/1998 |
| JP | 11-95208 A   | 4/1999  |
| JP | 11-133408 A  | 5/1999  |

(Continued)

OTHER PUBLICATIONS

English Translation for JP-2002-221622-A, Sep. 8, 2002, [online], [retrieved on Aug. 13, 2009] Retrieved from the Industrial Property Digital Library of the Japanese Patent Office using Internet <URL: http://www.ipdl.inpit.go.jp/homepg_e.ipdl>.*

(Continued)

*Primary Examiner*—Omar Rojas
(74) *Attorney, Agent, or Firm*—Buchanan Ingersoll & Rooney PC

(57) ABSTRACT

An optical film is provided and includes a transparent polymer film. The optical film satisfies specific relations of retardation values and has a glass transition temperature of 120° C. or higher.

14 Claims, 8 Drawing Sheets

FOREIGN PATENT DOCUMENTS

| | | |
|---|---|---|
| JP | 11-202323 A | 7/1999 |
| JP | 11-305217 A | 11/1999 |
| JP | 11-316378 A | 11/1999 |
| JP | 2002-221622 A | 8/2002 |
| JP | 2003-15134 A | 1/2003 |
| JP | 2005-77853 A | 3/2005 |
| WO | WO 00/65384 A1 | 11/2000 |
| WO | WO 03/089965 | 10/2003 |
| WO | WO 2004/068226 A1 | 8/2004 |
| WO | WO 2005/022214 A1 | 3/2005 |

OTHER PUBLICATIONS

Y. Ito et al., "17.3: OCB-WV Film for Fast-Response-Time and Wide-Viewing-Angle LCD-TVs", SID 05 Digest, 2005, pp. 986-989.

International Search Report (PCT/ISA/210), for PCT/JP2006/317022, completed on Nov. 20, 2006.

Written Opinion of the International Searching Authority (PCT/ISA/237), for PCT/JP2006/317022, completed on Nov. 20, 2006.

* cited by examiner

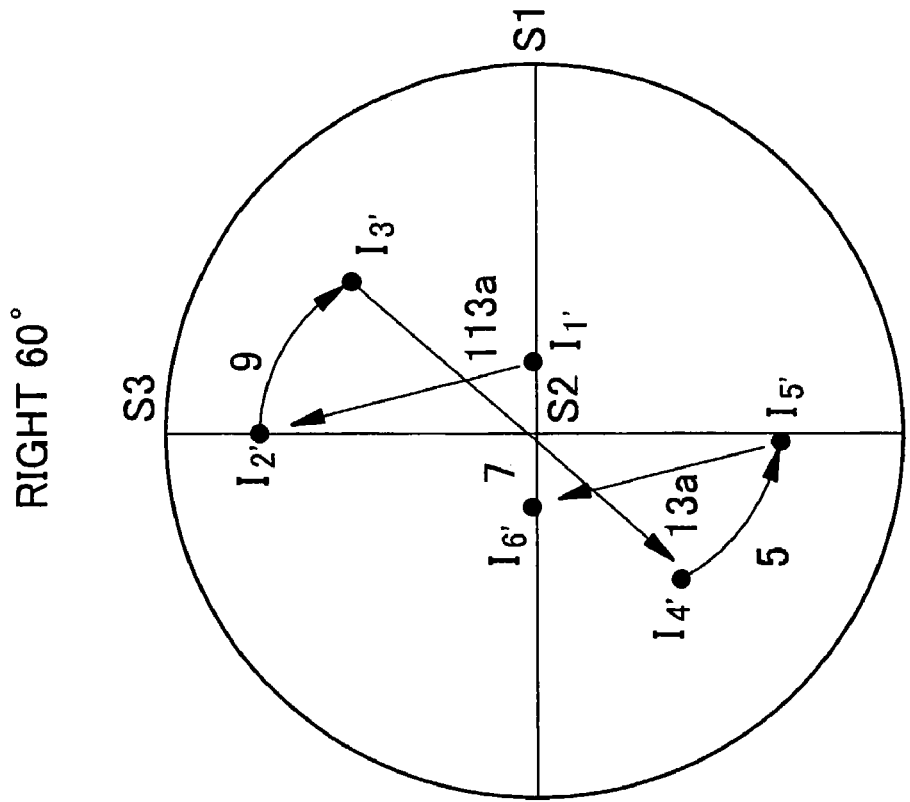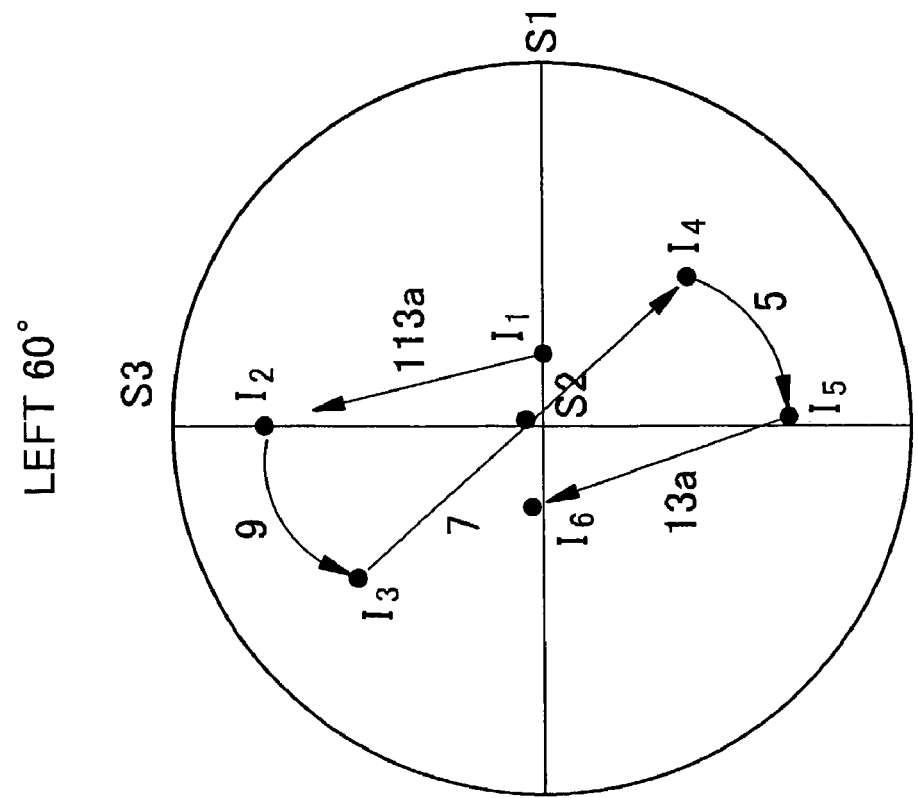

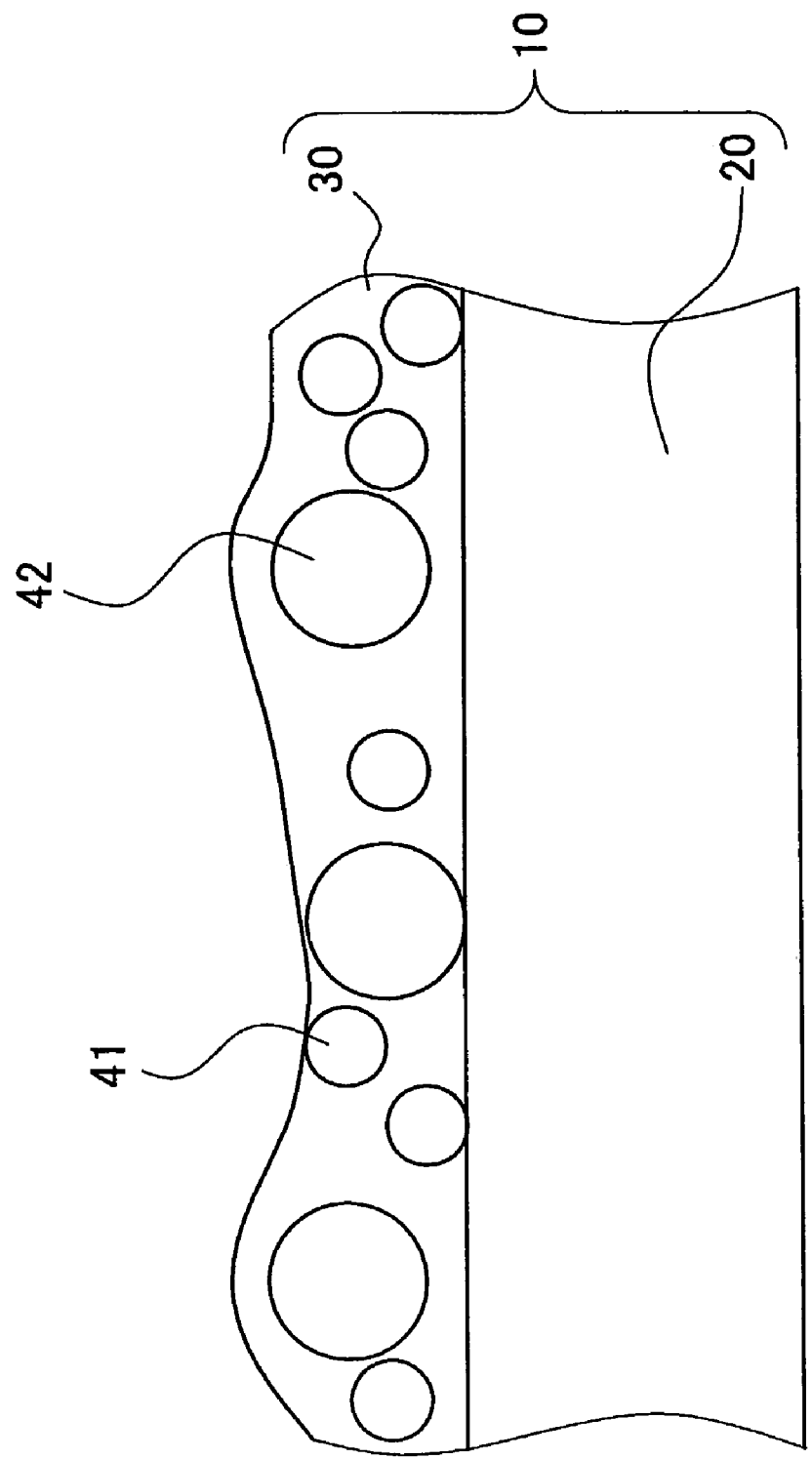

OPTICALLY COMPENSATORY FILM AND POLARIZING PLATE AND LIQUID CRYSTAL DISPLAY USING SAME

TECHNICAL FIELD

This invention relates to an optically compensatory film and a polarizing plate and a liquid crystal display using the same.

BACKGROUND ART

A liquid crystal display has a liquid crystal cell and a polarizing plate. The polarizing plate, which generally has a protective film made of cellulose acetate and a polarizing film, can be obtained by, for example, dyeing a polarizing film made of polyvinyl alcohol with iodine, stretching the same and layering protective films on both faces thereof. In a transmission type liquid crystal display, polarizing plates are attached to both sides of a liquid crystal cell and one or more optically compensatory films are further provided in some cases. In a reflection type liquid crystal display, a reflecting plate, a liquid crystal cell, one or more optically compensatory films and a polarizing plate are usually provided in this order. A liquid crystal cell comprises liquid crystal molecules, two substrates in which the liquid crystal molecules are enclosed and an electrode layer for applying voltage to the liquid crystal molecules. Concerning liquid crystal cells, there have been proposed display modes by which ON/OFF switching is made depending on the orientation state of liquid crystal molecules and which are applicable both of the transmission and reflection types, for example, TN (twisted nematic), IPS (in-plane switching), OCB (optically compensatory bend), VA (vertically aligned) and ECB (electrically controlled birefringence) modes.

Among these LCDs, 90° nematic mode liquid crystal displays (hereinafter referred to as the TN mode), which are driven by a thin-film transistor with the use of nematic liquid crystal molecules having a positive dielectric anisotropy, have been mainly employed when excellent visual qualities are needed. However, the TN mode has such a viewing angle characteristics that although excellent display characteristics are achieved when viewed from the front, the contrast is lowered and inverted gradation (reversion in brightness), etc. arise in gradient display when viewed from an oblique direction, thereby worsening the display characteristics. Thus, it has been strongly required to overcome this issue.

On the other hand, the share of wide-viewing angle liquid crystal modes such as the IPS mode, the OCB mode and the VA mode has been expanding with the recent increase in the demand for liquid crystal television sets. Although the visual qualities have been improved year after year in each of these modes (JP-A-9-211444, JP-A-11-316378, JP-A-2-176625, JP-A-11-95208, JP-A-2003-15134, JP-A-11-95208, JP-A-2002-221622, JP-A-9-80424, JP-A-10-54982, JP-A-11-202323, JP-A-9-292522, JP-A-11-133408, JP-A-11-305217 and JP-A-10-307291), color shift in viewing from an oblique direction still remains unsolved.

On the other hand, there has been reported a method of improving color shift in the VA mode by using a phase contrast film with the use of a birefringent layer consisting of two layers made of different amorphous polymer materials (JP-A-2005-77853). However, this method can be hardly applicable to the OCB mode and the IPS mode. Moreover, a highly complicated procedure is required in producing this film.

DISCLOSURE OF THE INVENTION

An object of an illustrative, non-limiting embodiment of the invention is to provide an optically compensatory film (in particular, an optically compensatory film for the VA, IPS and OCB modes), which allows accurate optical compensation by a liquid crystal cell, achieves a high contrast and an improved viewing angle-dependent color shift in black display and is excellent in productivity, and a polarizing plate using the same. Another object of an illustrative, non-limiting embodiment of the invention is to provide a liquid crystal display (in particular, a liquid crystal display of the VA, IPS or OCB mode) which has an elevated contrast and an improved viewing angle-dependent color shift in black display.

The objects can be accomplished by means as follows.

1-1. An optical film comprising a transparent polymer film, wherein the optical film has: a value A1 defined by formula (1), the value A1 ranging from 0.10 to 0.95; a value A2 defined by the formula (2), the value A2 ranging from 1.01 to 1.50; and a glass transition temperature of 120° C. or higher:

$$\text{Value } A1 = Re(450)/Re(550) \tag{1}$$

$$\text{Value } A2 = Re(650)/Re(550) \tag{2}$$

wherein $Re(\lambda)$ indicates an in-plane retardation value of the optical film to light having a wavelength of $\lambda$ (nm); and $Rth(\lambda)$ indicates a thickness-direction retardation value of the optical film to light having a wavelength of $\lambda$ (nm).

1-2. The optical film as described in the above 1-1, which comprises a compound in an amount of 0.01 to 30% by mass, the compound having a maximum absorption wavelength $\lambda$max shorter than 250 nm in a UV absorption spectrum of a solution of the compound.

1-3. The optical film as described in the above 1-1 or 1-2, wherein comprises cellulose acylate as a main component of the optical film.

1-4. The optical film as described in any one of the above 1-1 to 1-3, which has: a value C1 defined by formula (4), the value C1 ranging from 0.40 to 0.95; a value C2 defined by formula (5), the value C1 ranging from 1.05 to 1.93; and Rth(550) of 70 to 400 nm:

$$\text{Value } C1 = \{Re(450)/Rth(450)\}/\{Re(550)/Rth(550)\} \tag{4}$$

$$\text{Value } C2 = \{Re(650)/Rth(650)\}/\{Re(550)/Rth(550)\}. \tag{5}$$

1-5. An optically compensatory film comprising:
an optical film described in any one of the above 1-1 to 1-4; and
an optically anisotropic layer comprising a liquid crystal compound, the optically anisotropic layer having a liquid crystal transition temperature of from 25° C. to a temperature higher by 20° C. than a glass transition temperature of the optical film.

1-6. The optically compensatory film as described in the above 1-5, wherein the optically anisotropic layer comprising has such an optical characteristic to fulfill a value B1 defined by formula (3):

$$\text{Value } B1\ Re(450)/Re(650) \leq 1.25 \tag{3}$$

wherein Re(450) indicates an in-plane retardation value of the optically anisotropic layer to light having a wavelength of 450 nm; and Re(650) indicates an in-plane retardation value of the optically anisotropic layer to light having a wavelength of 650 mm.

1-7. The optically compensatory film as described in the above 1-5 or 1-6, wherein the liquid crystal compound is a discotic compound.

1-8. A polarizing plate comprising: a polarizer; and an optical film described in any one of the above 1-1 to 1-4 or an optically compensatory film described in any one of the above 1-5 to 1-7.

1-9. A liquid crystal display comprising: a liquid crystal cell; and a polarizing plate described in the above 1-8.

1-10. The liquid crystal display described in the above 1-9, wherein the liquid crystal cell is in VA mode, OCB mode or IPS mode.

2-1. An optically compensatory film comprising:

a transparent film is a composite birefringent member comprising a first birefringent layer and a second birefringent layer; and an optically anisotropic layer comprising a liquid crystal compound, wherein the transparent film has: a value A1 defined by formula (1), the value A1 ranging from 0.10 to 0.95; a value A2 defined by formula (2), the value A2 ranging from 1.01 to 1.50; a value B1 defined by formula (4), the value B1 ranging from 0.40 to 0.95; a value B2 defined by formula (5), the value B2 ranging from 1.05 to 1.93; and Rth(550) of 70 to 400 nm:

$$\text{Value } A1 = Re(450)/Re(550) \tag{1}$$

$$\text{Value } A2 = Re(650)/Re(550) \tag{2}$$

$$\text{Value } B1 = \{Re(450)/Rth(450)\}/\{Re(550)/Rth(550)\} \tag{4}$$

$$\text{Value } B2 = \{Re(650)/Rth(650)\}/\{Re(550)/Rth(550)\} \tag{5}$$

wherein $Re(\lambda)$ indicates an in-plane retardation value of the transparent film to light having a wavelength of $\lambda$ (nm); and $Rth(\lambda)$ indicates a thickness-direction retardation value of the transparent film to light having a wavelength of $\lambda$ (nm).

2-2. The optically compensatory film as described in the above 2-1, wherein the first and second birefringent layers differ from each other in wavelength dependency of birefringence.

2-3. The optically compensatory film as described in the above 2-2, wherein at least one of the first and the second birefringent layers is a birefringent layer comprising a liquid crystal compound.

2-4. The optically compensatory film as described in the above 2-1, wherein the liquid crystal compound is a discotic compound.

2-5. A polarizing plate comprising: a polarizer; and an optically compensatory film described in any one of the above 2-1 to 2-4.

2-6. A liquid crystal display comprising: a liquid crystal cell; and a polarizing plate described in the above 2-5.

2-7. The liquid crystal display as described in the above 2-6, wherein the liquid crystal cell is in VA mode, OCB mode or IPS mode.

The terms "45°", "parallel" and "orthogonal" as used herein each means falling within the range of the proper angle±less than 5°. The difference from the proper angle is preferably less than 4° and more preferably less than 3°. Concerning an angle, the symbol "+" means the clockwise direction while the symbol "−" means the anticlockwise direction. The term "slow axis" means the direction wherein the refractive index attains the maximum level. The term "visible light range" means the range from 380 nm to 780 nm. Unless otherwise noted, a refractive index is measured at a wavelength $\lambda=550$ nm falling within the visible light range.

Unless otherwise noted, the term "polarizing plate" as used herein involves both of a long sheet type polarizing plate and a polarizing plate having been cut into a size allowing the packaging into a liquid crystal display (the term "cutting" as used herein involves "die cutting", "cutting out" and so on). The terms "polarizing film" and "polarizing plate" are used herein in different meanings. That is, a "polarizing plate" means a layered product having a "polarizing film" and a transparent protective film on at least one face of the polarizing film for protecting it.

The term "molecular symmetry axis" as used herein means a rotational symmetry axis in the case of a molecule having the rotational symmetry axis. However, it is not required that a molecule has rotational symmetry in a strict meaning. In a discotic liquid crystal compound, the molecular symmetry axis generally agrees with an axis which perpendicularly penetrates the disc face at the center thereof. In a rod-shaped liquid crystal molecule, the molecular symmetry axis agrees with the major axis of its molecule. $Re(\lambda)$ and $Rth(\lambda)$ as used herein respective means an in-plane retardation value and a thickness-direction retardation value at a wavelength $\lambda$. The $Re(\lambda)$ is measured by making light having a wavelength of $\lambda$ nm incident into the normal line direction in KOBRA 21ADH (manufactured by Oji Science Instruments). The $Rth(\lambda)$ is computed by KOBRA 21 ADH on the basis of retardation values, as measured in three directions in total, of the foregoing $Re(\lambda)$, a retardation value as measured by making light having a wavelength of $\lambda$ nm incident from a direction inclined by +40° against the normal line direction of the film while making the in-plane slow axis (judged by KOBRA 21 ADH) serve as a tilt axis (rotational axis), and a retardation value as measured by making light having a wavelength of $\lambda$ nm incident from a direction inclined by −40° against the normal line direction of the film while making the in-plane slow axis serve as a tilt axis. Here, as hypothetical values of average refractive index, values described in *Polymer Handbook* (John Wiley & Sons, Inc.) and various catalogues of optical films can be employed. When an average refractive index value is not known, it can be measured by an Abbe's refractometer. Average refractive index values of major optical films are exemplified below: cellulose acylate (1.48), cycloolefin polymer (1.52), polycarbonate (1.59), polymethyl methacrylate (1.49), polystyrene (1.59). By inputting a hypothetical value of the average refractive index and a film thickness, KOBRA 21ADH computes nx, ny and nz. From the thus computed nx, ny and nz, Nz(nx−nz)/(nx/ny) is computed.

According to an aspect of the present invention that has been completed based on the findings obtained as the results of intensive studies by the inventors, viewing angle compensation can be established at almost all wavelengths in the black state particularly in the VA mode, the IPS mode and the OCB mode by using the optical film, the optically compensatory film or the polarizing plate as discussed above. As a result, the liquid crystal display of the invention shows lessened light leakage in an oblique direction and a considerably improved viewing angle contrast. In the liquid crystal display of the invention, moreover, light leakage in an oblique direction in black display can be prevented almost all over the visible light range and thus the viewing angle-dependent color shift in black display, which has been a serious problem, is largely ameliorated.

BRIEF DESCRIPTION OF DRAWINGS

FIG. 3 is a schematic view showing a Poincare sphere which is used in illustrating a change in the polarization state of an incident light in a liquid crystal display of the invention.

FIG. 7 is a sectional view illustrating a typical mode of a light diffusion film to be used in the invention.

DETAILED DESCRIPTION OF THE INVENTION

Figure 1:
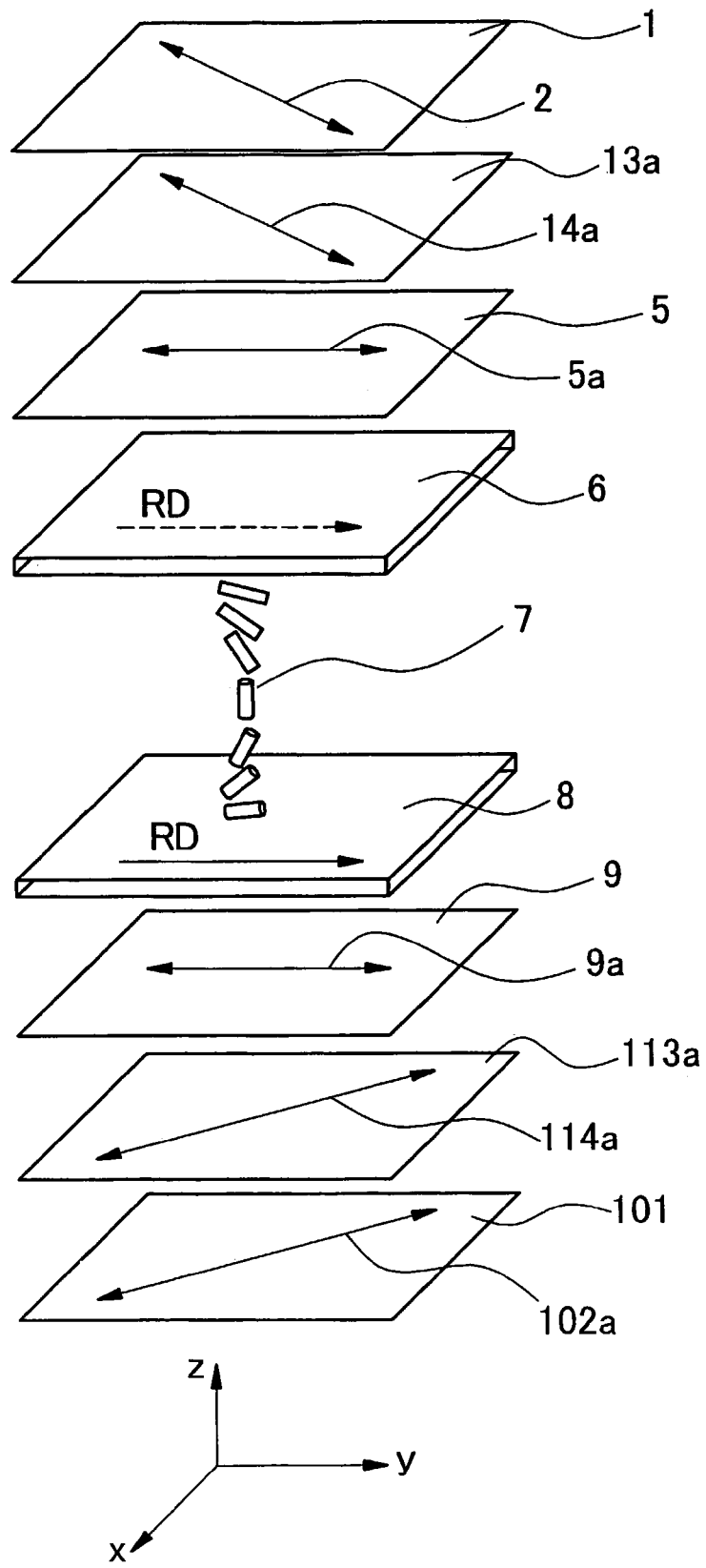
FIG. 1 is a schematic view illustrating an example of a liquid crystal display of the invention.

FIG. 1 shows an example of the constitution of the liquid crystal display of the invention. The OCB model liquid crystal display as shown in FIG. 1 has a liquid crystal cell comprising a liquid crystal layer 7, wherein liquid crystal molecules are bend oriented to the substrate face when voltage is applied (i.e., in black display), and an upper substrate 6 and a lower substrate 8 between which the liquid crystal layer 7 is sandwiched. The substrates 6 and 8 have been subjected to an orientation treatment in the liquid crystal faces and the arrows RD show each the rubbing direction. The broken line arrow is presented in the back face. Polarizing films 1 and 101 are provided so that they hold the liquid crystal cell. The transmission axes 2 and 102 of the polarizing films 1 and 101 intersect orthogonally each other and these transmission axes are provided at an angle 45° to the RD direction of the liquid crystal layer 7 in the liquid crystal cell. An optical film or composite birefringent member 13a of the invention and an optically anisotropic layer 5 are provided between the polarizing film 1 and the liquid crystal cell, while an optical film 13a or composite birefringent member 113a of the invention and an optically anisotropic layer 9 are provided between the polarizing film 101 and the liquid crystal cell. The in-plane slow axes 14a and 114a of the composite birefringent members 13a and 113a are located in parallel respectively to the directions of the transmission axes 2 and 012 of the adjacent polarizing films 1 and 101. The optically anisotropic layers 5 and 9 have optical anisotropy which is expressed depending on the orientation of a liquid crystal compound.

The liquid crystal cell shown in FIG. 1 a comprises an upper substrate 6, a lower substrate 8 and a liquid crystal layer 7, which comprises liquid crystal molecules, sandwiched between these substrates. On the surfaces of the substrates 6 and 8 being in contact with the liquid crystal molecules (hereinafter sometimes referred to as "inner faces"), orientation films (not shown in the figure) are formed so that the orientation of the liquid crystal molecules are regulated in the parallel direction with a pre-tilt angle when no or low voltage is applied. On the inner faces of the substrates 6 and 8, transparent electrodes (not shown in the figure), by which voltage can be applied on the liquid crystal layer 7 comprising the liquid crystal molecules, are formed. In the invention, it is preferable that the product ($\Delta n \cdot d$) of the thickness d ($\mu m$) of the liquid crystal layer 7 and the refractive index anisotropy $\Delta n$ ranges from 0.1 to 1.5 $\mu m$, more preferably from 0.2 to 1.5 $\mu m$, more preferably from 0.3 to 1.2 $\mu m$ and more preferably from 0.4 to 1.0 $\mu m$. When $\Delta n \cdot d$ falls within this range, a high white display luminance is exhibited when white voltage is applied and thus a liquid crystal display having a high brightness and a high contrast can be obtained. Although any liquid crystal material may be used without particular restriction, a liquid crystal material having a positive dielectric anisotropy, the liquid crystal molecules of which respond in the direction parallel to the electric field direction is employed in the mode where an electric field is applied between the upper substrate 6 and the lower substrate 8.

In the case of using a liquid crystal cell of the OCB mode, for example, use can be made of a nematic liquid crystal material, which has a positive dielectric anisotropy, $\Delta n$ of 0.16 and $\Delta \in$ of about 5, between the upper and lower substrates 6 and 8. Although the thickness d of the liquid crystal layer 7 is not particularly restricted, it may be set to about 4 $\mu m$ in the case of using a liquid crystal having the characteristics falling within the ranges as defined above. Since the brightness in white display varies depending on the product And of the thickness d and the refractive index anisotropy $\Delta n$ under the application of white voltage, it is preferable to set $\Delta n \cdot d$ of the liquid crystal layer 7 to 0.4 to 1.0 $\mu m$ so as to obtain a sufficient brightness when white voltage is applied.

Although a chiral material, which is generally employed in TN mode liquid crystal displays, is scarcely added in an OCB mode liquid crystal display because of a fear of worsening in the dynamic response characteristics, it is added in some cases to relieve orientation failure. In the case of employing the multidomain structure, it is advantageous in controlling the orientations of liquid crystal molecules at the boundaries among individual domains. The term multidomain structure means a structure wherein a single pixel in a liquid crystal display is divided into multiple domains. For example, it is preferable to employ the multidomain structure in the OCB mode, since the luminance and color tone viewing angle characteristics can be improved thereby. More specifically speaking, each pixel is divided and averaged into 2 or more (preferably 4 or 8) domains differing in the initial orientation state of liquid crystal molecules from each other. Thus, deviations in luminance and color tone depending on viewing angle can be lessened. Similar effects can be established by constructing individual pixels by 2 or more domains differing from each other wherein the orientation directions of liquid crystal molecules continuously vary when voltage is applied.

The optical film or composite birefringent members 13a and 113a may serve either as supports for the optically anisotropic layers 5 and 9 or protective films for the polarizing films 1 and 101. Alternatively, the optical film or composite birefringent members may have both of these functions. Namely, the polarizing film 1, the optical film or composite birefringent members 13a and the optically anisotropic layer 5, or the polarizing film 101, the optical film 113a and the optically anisotropic layer 9 may be integrated together and packaged as a layered product into a liquid crystal display. Alternatively, they may be separately packaged as individual members. Although use may be made of a constitution wherein another protective film for a polarizing film is provided between the optical film composite birefringent member 13a and the polarizing film 1 or between the optical film composite birefringent member 113a and the polarizing film 101, it is preferred not to provide this protective film. It is preferable that the slow axis 14a of the optical film or composite birefringent member 13a and the slow axis 114a of the optical film or composite birefringent member 113a are substantially parallel or orthogonal to each other. In the case where that the slow axis 14a of the optical film or composite birefringent member 13a and the slow axis 114a of the optical film or composite birefringent member 113a intersect orthogonally to each other, the birefringences thereof can be cancelled out each other and thus the optical characteristics of incident light orthogonal to the liquid crystal display can be prevented from worsening. In the mode where the slow axis 14a and the slow axis 114a are parallel to each other, a residual phase contrast, if any, in the liquid crystal layer can be compensated.

Concerning the transmission axes 2 and 102 of the polarizing films 1 and 101, the slow axis directions 14a and 114a of the optical films or composite birefringent members 13a and 113a and the orientation directions of liquid crystal molecules in the liquid crystal layer 7 are individually controlled within appropriate ranges depending on the materials to be used for individual members, the display mode, the layered structures of the members and so on. Namely, the polarizing film 1 and the polarizing film 101 are located in such a manner that the transmission axes 2 and 102 thereof intersect substantially orthogonally to each other, though the liquid crystal display of the invention is not restricted to this constitution.

The optically anisotropic layers 5 and 9 are provided between the optical films or composite birefringent members 13a and 113a and the liquid crystal cell. The optically anisotropic layers 5 and 9 are layers each being made of a composition containing, for example, a rod-shaped compound or a discotic compound. In an optically anisotropic layer, liquid crystal compound molecules are fixed in a defined orientation state. In the molecular symmetry axes 5a and 9a of the liquid crystal compounds in the optically anisotropic layers 5 and 9, the average directions of orientation 5a and 9a at least at the interfaces in the sides of the optical films or composite birefringent members 13a and 113a intersect each at an angle of about 45° to the in-plane slow axes 14a and 114a of the optical films or composite birefringent members 13a and 113a. When provided as described above, the optically anisotropic layer 5 or 9 expresses retardation to incident light from the normal line direction, thereby causing no beat leakage. At the same time, the advantages of the invention can be fully exerted on incident light form an oblique direction. At the interfaces in the liquid crystal cell side, it is also preferred that the average directions of orientation of the molecular symmetry axes of the optically anisotropic layers 5 and 9 intersect each at an angle of about 45° to the in-plane slow axes 14a and 114a of the optical films or composite birefringent members 13a and 113a.

It is also preferable that the average direction of orientation 5a of the molecular symmetry axis in the polarizing film side of the liquid crystal compounds in the optically anisotropic layer 5 is provided at an angle of about 45° to the transmission axis 2 of the polarizing film 1 located closer. Similarly, it is preferable that the average direction of orientation 9a of the molecular symmetry axis in the polarizing film side of the liquid crystal compounds in the optically anisotropic layer 9 is provided at an angle of about 45° to the transmission axis 102 of the polarizing film 101 located closer. Owing to this constitution, photo switching can be made depending on the sum of the retardation expressed by the optically anisotropic layer 5 or 9 and the retardation expressed by the liquid crystal layer 7 while the advantages of the invention can be fully exerted on incident light from an oblique direction.

Next, the principle of image display by the liquid crystal display shown in FIG. 1 will be illustrated.

In a driving state under the application of driving voltage corresponding to black to the transparent electrodes (not shown in the figure) of the substrates 6 and 8, liquid crystal molecules in the liquid crystal layer are bend-oriented. In this state, the in-plane retardation thereof is cancelled out by the in-plane retardations of the optically anisotropic layers 5 and 9 and consequently the polarization state of incident light is scarcely changed. Since the transmission axes 2 and 102 of the polarizing films 1 and 101 intersect orthogonally each other, incident light from the lower side is polarized by the polarizing film 101 and travels through the substrate 8, the liquid crystal cell and the substrate 6 while maintaining the polarization state. Then, it is blocked by the polarizing film 1. In the liquid crystal display of FIG. 1, namely, ideal black display is established in the driving state. In the driving state under the application of driving voltage corresponding to while display to the transparent electrodes (not shown in the figure), in contrast thereto, liquid crystal molecules in the liquid crystal layer 7 are bend-oriented differing from the bend-orientation corresponding to black and thus the front in-plane retardation differs from that in the black display. As a result, it is not cancelled out by the in-plane retardations of the optically anisotropic layers 5 and 9. When light passes through the liquid crystal cell, the polarization state varies and the light passes through the polarizing film 1 in the varied state, thereby giving white display.

In an OCB mode of the background art, even though a high contrast is achieved at the front, the contrast lowers in an oblique direction. In black display, a high contrast is achieved at the front owing to the compensation of the liquid crystal cell and the optically anisotropic layer. When viewed from an oblique direction, on the other hand, there arise the birefringence and the rotation of the polarization axis of the liquid crystal molecules in the liquid crystal layer 7. Although the transmission axes 2 and 102 of the upper and lower polarizing films 1 and 101 intersect orthogonally (90°) to each other at the front, the angle differs from 90° when viewed from an oblique direction. Because of these two factors, there has been a problem that light leakage arises and the contrast is lowered in an oblique direction. In the liquid crystal display of the invention having the constitution shown in FIG. 1, light leakage in n oblique direction in black display is relieved and the contrast is improved by using an optical film or composite birefringent member 13a (or 113a) which shows different Re's at R, B and B and having such optical characteristics as fulfilling specific requirements.

In the invention, more specifically speaking, use of the optical film or composite birefringent member having the optical characteristics as discussed above makes it possible to optically compensate by slow axes and retardations, which differ from wavelength to wavelength, for lights R, G and B of individual wavelengths. Further, optically anisotropic layers (5 and 9 in FIG. 1) having a liquid crystal compound in fixed orientation are provided so that the average direction of orientation of the molecular symmetry axis of the liquid crystal at the interface in the optical film or composite birefringent member side intersects at an angle of 45° with the slow axis of the optical film or composite birefringent member. Thus, the compensation system characteristic to the OCB orientation can be established at any wavelength. As a result, the viewing angle contrast in black display can be remarkably improved and the coloration in a viewing angle direction in black display can be remarkably lessened. In the case of moving the viewing angle from side to side (for example, at a polar angle of 60° in the directions of azimuth angles of 0° and 180°), in particular, coloration differs to induce left-right asymmetry in the existing cases. This problem can be remarkably relieved in the invention. As the wavelengths R, G and B, use is made therein a wavelength 650 nm as R, a wavelength 550 nm as G and a wavelength 450 nm as B. Although the wavelengths R, G and B are not always typified by these wavelengths, these wavelengths are seemingly adequate for specifying the optical characteristics whereby the advantages of the invention are established.

Figure 2:
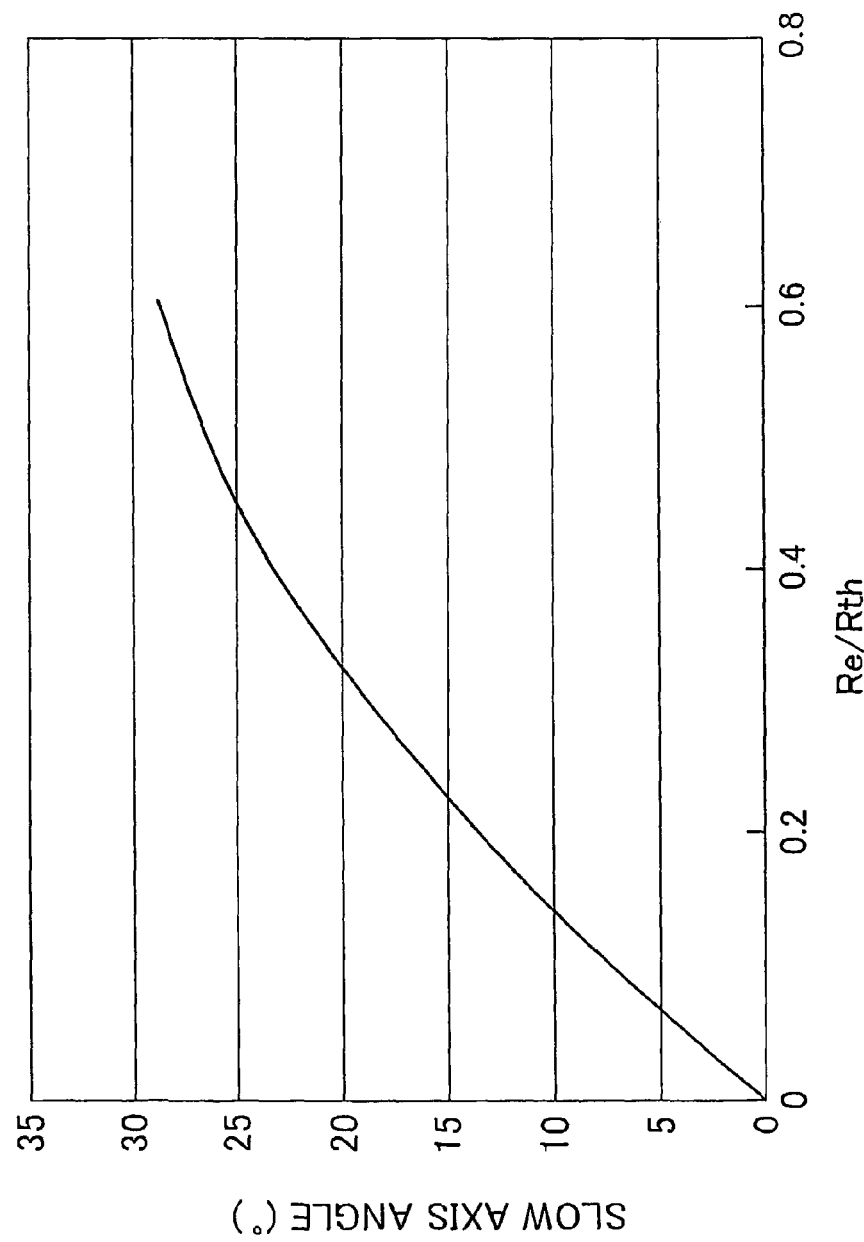
FIG. 2 is a graph showing optical characteristics of an optical compensatory film.

In the invention, particular attention is paid to the wavelength-dependency of birefringence, in particular, to Re/Rth that is the ratio of Re to Rth. This is because the Re/Rth value determines two intrinsic polarization axes in the transmission of light obliquely traveling in a biaxial birefringent medium. The two intrinsic polarization axes in the transmission of light obliquely traveling in a biaxial birefringent medium correspond respectively to the directions of the major and minor axes in the section formed by cutting the refractive index ellipse in the normal line direction of the transport direction of light. FIG. 2 shows an example of the calculated result on the relationship between the direction of one of two intrinsic polarization axes (i.e., the slow axis angle in this case) and Re/Rth in the case of an incident light obliquely traveling.

In FIG. 2, it is presumed that the azimuth angle is 45° while the polar angle is 34°. As FIG. 2 indicates, the slow axis angle is primarily determined by Re/Rth without depending on the wavelength of incident light. The change in the polarization state of the incident light caused by the passage through the optically compensatory film is determined mainly depending on the in-plane slow axis direction of the optically compensatory film and the retardation of the optically compensatory film. In the related art, it has been a practice that the Re/Rth values are almost the same (i.e., the slow axis angles are almost the same too) regardless of the R, G and B wavelengths. In the invention, in contrast thereto, the relationship Re/Rth is independently specified for each of the R, G and B wavelengths so that both of the slow axis and the retardation, which are main factors determining the change in the polarization state, are optimized at each of the R, G and B wavelengths. Moreover, the Re/Rth value of the optical film or composite birefringent member is controlled depending on the wavelength so that the two factors (i.e., the retardation and the apparent transmission axes of the upper and lower polarizing films are deviated from the front at any wavelength when light in an oblique direction passes through the optical film or composite birefringent member, the optically anisotropic layer having a liquid crystal compound with fixed orientation and a bend-oriented liquid crystal layer) can be compensated at the same time. More specifically speaking, the Re/Rth value of the optical film or composite birefringent member is elevated with an increase in wavelength, which makes it possible to resolve the difference in the polarization states at R, G and B caused by the wavelength dispersion of the optically anisotropic layer and the liquid crystal cell layer. Thus, complete compensation can be established and lowering in the contrast can be lessened. That is to say, by determining the parameters of the film with the use of R, G and B as representatives of the whole visible light region, almost complete compensation can be established all over the visible light region.

Next, the polar angle and the azimuth angle will be defined. The polar angle means a tilt angle from the normal line direction in the film plane, i.e., the z axis in FIGS. 1 and 2. For example, the normal line direction in the film plane means the direction of a polar angle of 0°. The azimuth angle means a direction determined by rotating clockwise on the basis of the positive direction of the x axis. For example, the positive direction of the x axis means the direction of an azimuth angle of 0° while the positive direction of the y axis means the direction of an azimuth angle of 90°. The oblique direction showing the most serious problem of light leakage in black display mainly means the case wherein the polarization axis of the polarization layer is at an angle of ±45°, i.e., the polar angle is not 0° and the azimuth angle is 0°, 90°, 180° or 270°.

To illustrate the advantages of the invention in greater detail, the polarization state of incident light to the liquid crystal display is shown on a Poincare sphere in FIG. 3. In FIG. 3, the S2 axis is an axis perpendicularly passing downward through the paper plane. In FIG. 3, the Poincare sphere is observed from the positive direction of the S2 axis. Since FIG. 3 is two-dimensionally drawn, dislocations of points before and after a change in the polarization state are shown by arrows. In practice, however, a change in the polarization state caused by the passage through the liquid crystal layer or the optically compensatory film is expressed on the Poincare sphere by rotating at a specific angle around a specific axis that is determined depending on the individual optical characteristics. The same will applies to FIGS. 5A-5B and 6A-6B given hereinbelow.

FIG. 3A is a drawing which shows a change in the polarization state of the G light incident from the left at 60° to the liquid crystal display of FIG. 1. FIG. 3B is a drawing which shows a change in the polarization state of the G light incident from the right at 60°. Calculation is made on the assumption that the optical characteristics of the optical film or composite birefringent members 13a and 113a and the optical characteristics of the optically anisotropic layers 5 and 9 are the same as those in the Poincare sphere of FIGS. 6A-6B as will be described hereinafter. The G light incident from the left at 60° shows a change in the polarization state as shown by the points on the Poincare sphere in FIG. 3A. More specifically, the polarization state $I_1$ of the G light passing through the polarizing film 101 turns successively into the polarization state $I_2$ after passing through the optical film or composite birefringent member 113a, the polarization state $I_3$ after passing through the optically anisotropic layer 9, the polarization state $I_4$ after passing through the liquid crystal layer 7 of the liquid crystal cell in black display, the polarization state $I_5$ after passing through the optically anisotropic layer 5 and the polarization state $I_6$ after passing through the optical film or composite birefringent member 13a. Then, the G light is blocked by the polarizing film 1 and thus presents ideal black display. On the other hand, the G light incident from the right at 60° shows a change in the polarization states $I_1' \rightarrow I_2' \rightarrow I_3' \rightarrow I_4' \rightarrow I_5' \rightarrow I_6'$. By examining these changes in the polarization states, it can be understood that the changes in the polarization states of the lights incident from the right and left passing through the optically anisotropic layers 9 and 5 and the liquid crystal layer 7 are mirror-symmetric, while changes in the polarization states of the lights incident from the left and right passing through the optical film or composite birefringent members 113a and 13a agree with each other. To lessen the black light leakage from side to side and the color shift from side to side, it is required to fulfill these compensation conditions simultaneously in right and left and at any wavelength. That is, the positions $I_6$ and $I_6'$ should agree with each other for each of incident lights R (red) and B (blue) in the visible light range and the positions should be located so as to indicate the polarization state blocked by the polarizing film 1. Although the transitions are expressed by lines in the drawings, the transitions are not restricted to linear ones on the Poincare sphere plane.

Figure 4:
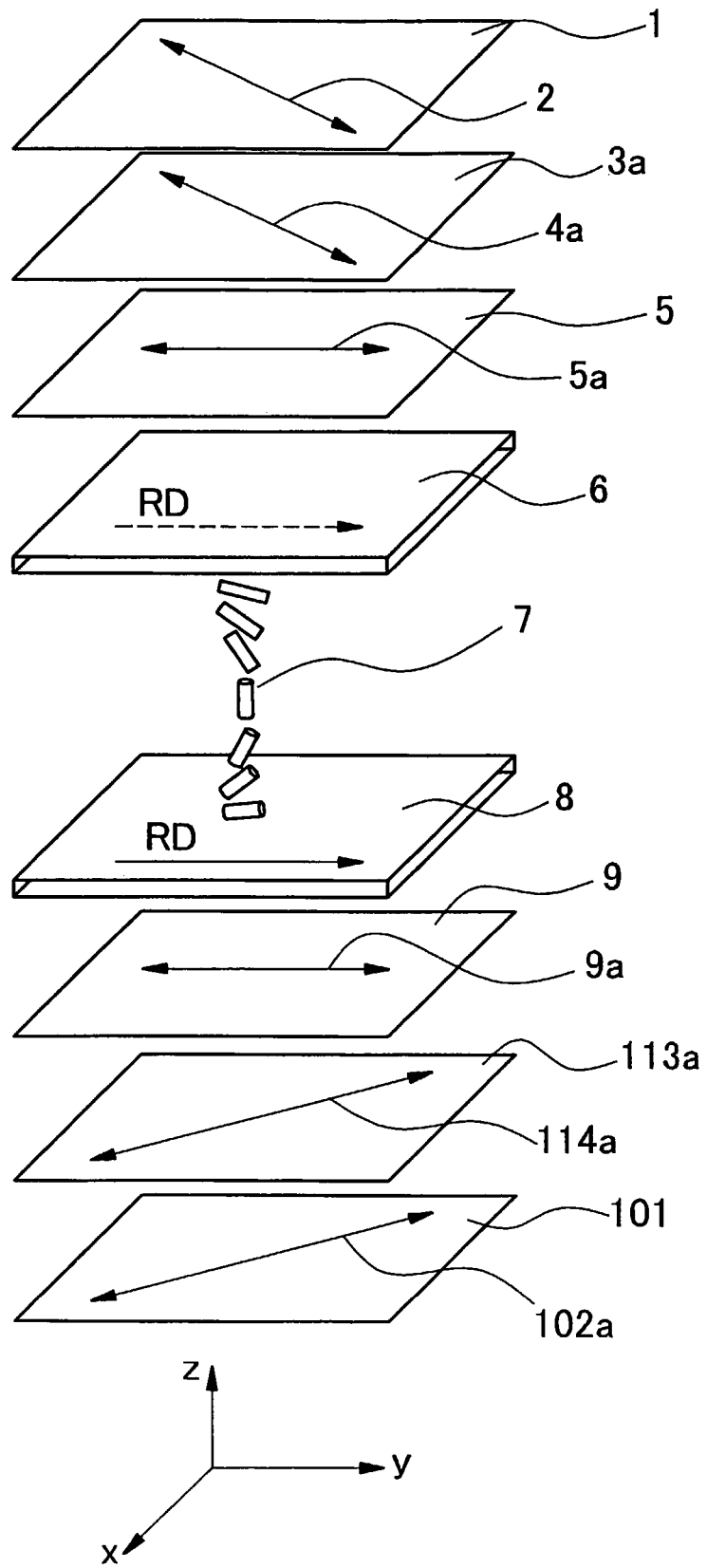
FIG. 4 is a schematic view illustrating an example of an OCB mode liquid crystal display in the background art.

In the constitution of an existing OCB mode liquid crystal display as shown in FIG. 4 (for example, the constitution disclosed in JP-A-11-316378), the optical film or composite birefringent members 113a and 13a the Re/Rth of which shows the wavelength-dependency as described above are not employed but, as substitutes therefor, for example, transparent supports 103a and 3a for the optically anisotropic layers 5 and 9 are provided. The transparent supports 103 and 3, which are employed to support the optically anisotropic layers 5 and 9, are made of a common polymer film. Therefore, these transparent supports have no wavelength-dependency of Re/Rth as in the optical film or composite birefringent members 113a and 13a but show the same Re and Rth for each of R, G and B wavelengths. Thus, the existing OCB mode liquid crystal display suffers from a problem that, when voltage is applied (i.e., in black display), the in-pane retardations of the liquid crystal cell and the optically anisotropic layer at the front are cancelled out to give black display but the light leakage in the black display cannot be completely prevented in an oblique direction. As a result, it is impossible to achieve a sufficient viewing angle contrast and there arises a problem of coloration since compensation cannot be made at any wavelength. In FIG. 4, "4a" and "104a" represent the slow axis of the transparent supports 3a and 103a, respectively.

Figure 5B:
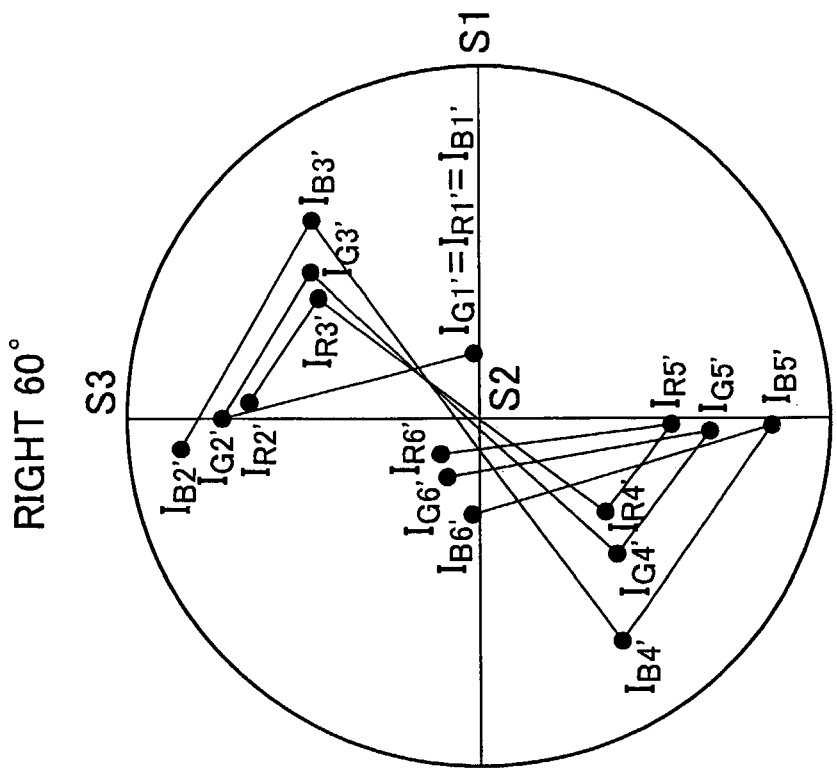
FIG. 5 is a schematic view showing a Poincare sphere which is used in illustrating a change in the polarization state of an incident light in an example of a liquid crystal display in the background art.
Figure 5A:
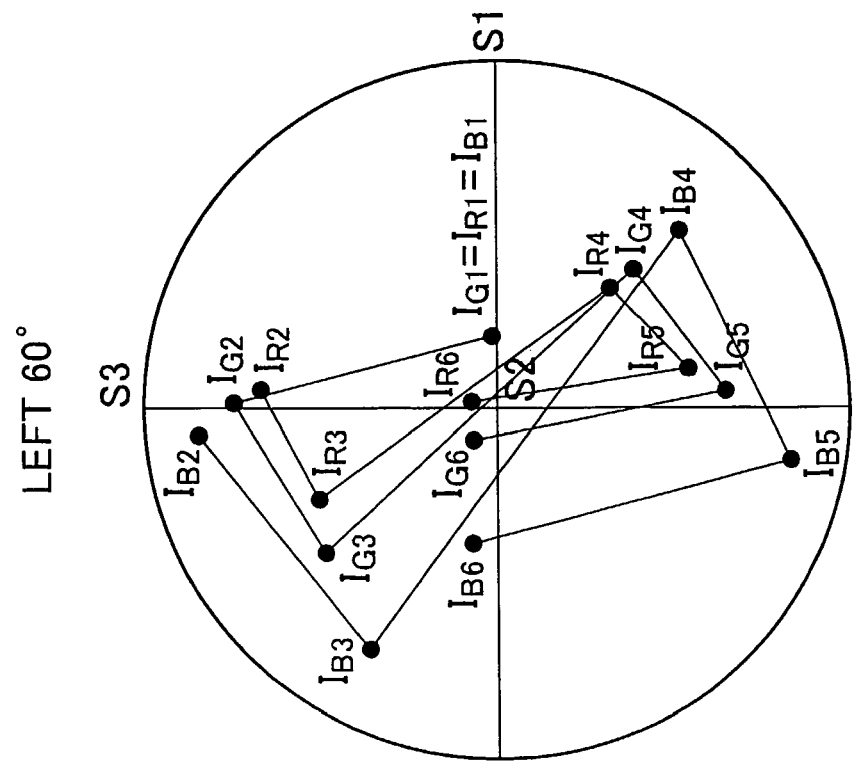

To illustrate in greater detail, FIGS. 5A-5B show the results of the calculation on the polarization states of the R, G and B lights incident to the OCB mode liquid crystal display of the existing constitution as shown in FIG. 4. FIG. 5A is a drawing which shows a change in the polarization state of each of the R, G and B lights incident from the left at 60° while FIG. 5B is a drawing which shows a change in the polarization state of each of R, G and B lights incident from the right at 60°. In these drawings, $I_R$ stands for the polarization state of the incident R light, $I_G$ stands for the polarization state of the incident G light and $I_B$ stands for the polarization state of the incident B light. Calculation is made on the assumption that, in the OCB mode liquid crystal display of the constitution of the background art as shown in FIG. 4, the transparent supports 3a and 103a have Re of 45 nm and Rth of 160 nm at all of the wavelengths of R, G and B. In FIG. 5A, the polarization states $I_{R1}$, $I_{G1}$ and $I_{B1}$ after passing the polarizing film 101 are all the same as each other. In the case of paying attention to the change in the polarization state of the B light, the B light incident from the left at 60° is in the polarization state $I_{B2}$ after passing through the transparent support 103a and then shows a deviation in the same direction as the transition direction after passing through the optically anisotropic layer 9. On the other hand, the B light incident from the right at 60° is in the polarization state $I_{B2'}$ after passing through the transparent support 103a and then shows a deviation in the direction opposite to the transition direction after passing through the optically anisotropic layer 9. Namely, the transparent support 103 exerts different effects on the right incident from the left and the light incident from the right. As a result, the positions of the final transition states $I_{R6}$, $I_{G6}$ and $I_{B6}$ of the R, G and B lights incident from the left at 60° do not agree with the positions of the final transition states $I_{R6'}$, $I_{G6'}$ and $I_{B6'}$ of the R, G and B lights incident from the right at 60° and, moreover, the positions considerably differ between left 60° and right 60°. Consequently, there arise the black light leakage from side to side and the color shift from side to side and these problems can be hardly overcome at the same time by the existing techniques.

Figure 6B:
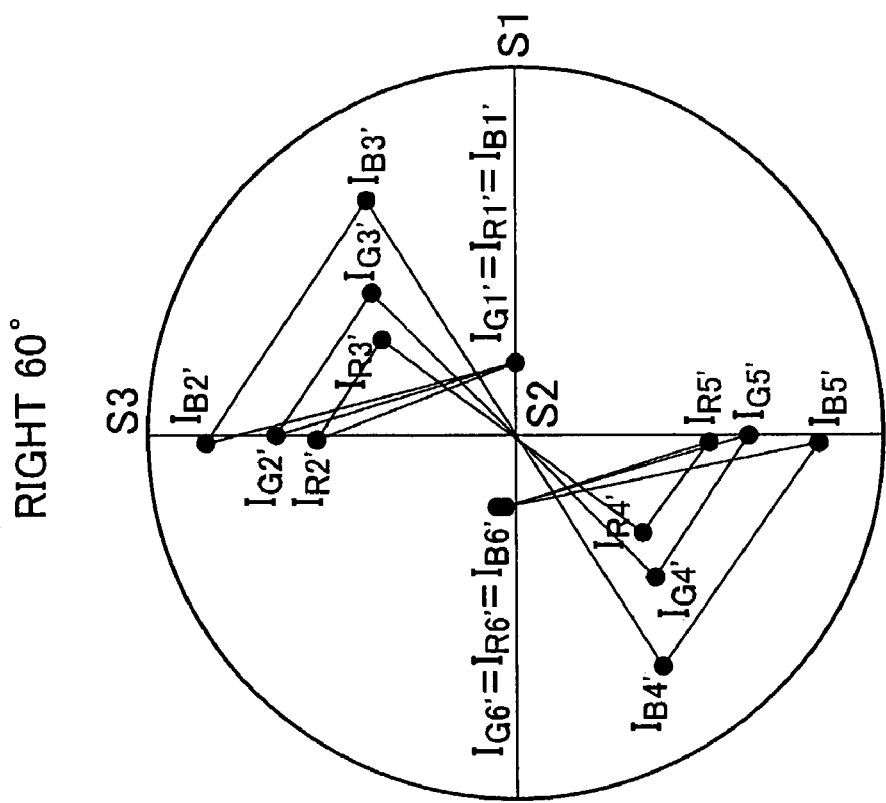
FIG. 6 is a schematic view showing a Poincare sphere which is used in illustrating a change in the polarization state of an incident light in a liquid crystal display of the invention.
Figure 6A:
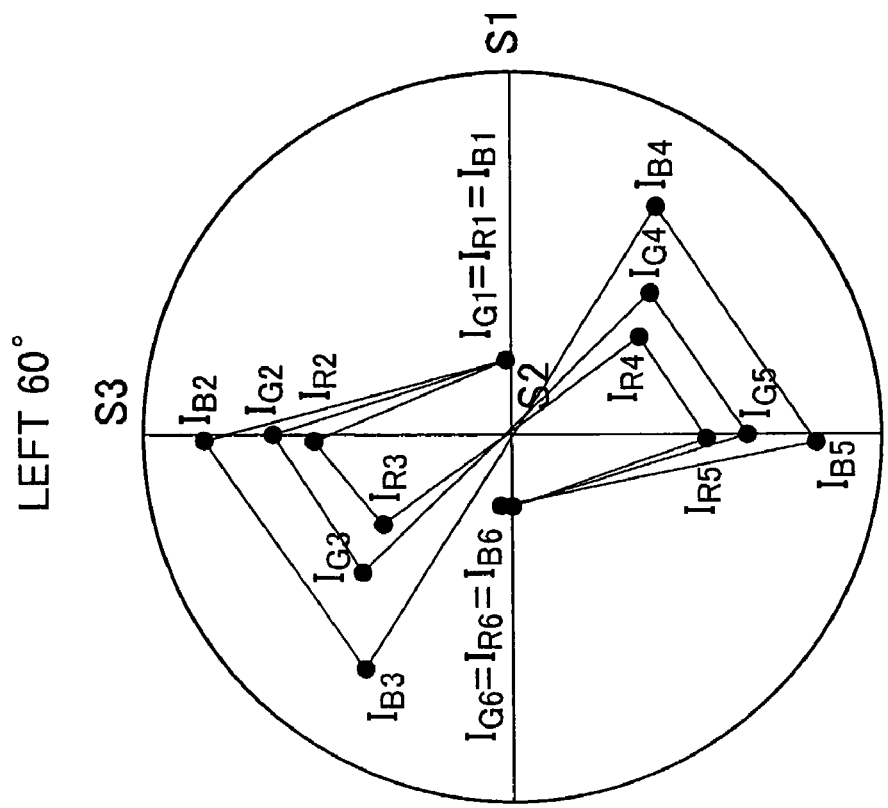

In the invention, the black light leakage from side to side and the color shift from side to side in an OCB mode liquid crystal display are ameliorated at the same time by providing an optical film or composite birefringent member having specific optical characteristics. To illustrate in greater detail, the results of the calculation on the polarization states of R, G and B lights passing through the OCB mode liquid crystal display of the constitution according to the invention as shown in FIG. 1 are indicated on the Poincare sphere in FIGS. 6A-6B. FIG. 6A is a drawing which shows a change in the polarization state of each of R, G and B lights incident from the left at 60°, while FIG. 6B is a drawing which shows a change in the polarization state of each of R, G and B lights incident from the right at 60°. In these drawings, $I_R$ stands for the polarization state of the incident R light, $I_G$ stands for the polarization state of the incident G light and $I_B$ stands for the polarization state of the incident B light. Calculation is made on the assumption that the Re/Rth values (450 nm) at a wavelength of 450 nm of the composite birefringent members 113a and 13a are 0.17, the Re/Rth values (550 nm) at a wavelength of 550 nm are 0.28, the Re/Rth values (650 nm) at a wavelength of 650 nm are 0.39 and Rth values at a wavelength of 550 nm are 160 nm. Also, it is assumed that the Re values of the optically anisotropic layers 5 and 9 are the same as those in the Poincare sphere shown in FIGS. 5A-5B.

As FIGS. 6A and 6B show, the R, G and B lights incident from right and left are all located at around S1=0 after passing through the optical film or composite birefringent members 113a and 13a and show deviations in the polarization states reflecting the wavelength-dependency of the Re/Rth of the optical film or composite birefringent member 113a. Owing to these deviations, it the deviations in the polarization states caused by the optically anisotropic layers 9 and 5 and the liquid crystal layer 7 can be cancelled out. As a result, it becomes possible to provide the final transition points of the lights incident from right and left at the same position regardless of the wavelength. Thus, the black light leakage from side to side and the color shift from side to side can be improved at the same time.

In the invention, the black light leakage from side to side and the color shift from side to side are improved by employing an optical film or composite birefringent member, which has such optical characteristics as showing different retardation wavelength dispersions between an incident light in the normal line direction and another incident light in an oblique direction (for example, a polar angle off 60°), and willingly utilizing these optical characteristics in optical compensation. So long as this principle is used, the scope of the invention is not restricted by the display mode of liquid crystal layers but applicable to liquid crystal displays having liquid crystal layers of any mode such as the VA mode, the IPS mode, the ECB mode, the TN mode and so on.

Furthermore, the liquid crystal display of the invention is not restricted to the constitution as shown in FIG. 1 but may comprise other members. For example, a color filter may be provided between the liquid crystal cell and the polarizing film. In the case of using as a transmission type, it is possible to provide a backlight with the use of a cold cathode or hot cathode fluorescent tube, a light-emitting diode, a filed emission element or an electroluminescent element as a light source in the back side.

Moreover, liquid crystal displays of the direct viewing type, the image projection type and the light modulation type are also included in the scope of the liquid crystal display of the invention. The mode of applying the invention to an active matrix liquid crystal display with the use of a three terminal or two terminal semiconductor device such as a TFT or an MIM. Needless to say, a mode of applying the invention to a passive matrix liquid crystal display typified by the STN mode called the time-resolved driving system is also effective.

Next, an exemplary optical film and optically compensatory film establishing this optical compensation will be described in detail.

An optical film of the invention is not particularly restricted so long as it is a transparent polymer film. Namely, it is possible to employ a stretched polymer film or a combination of a polymer layer of the coating type with a polymer film. As the material for the polymer film, use is generally made of synthetic polymers (for example, polycarbonate, polysulfone, polyether sulfone, polyacrylate, polymethacrylate, norbornene resins, triacetylcellulose).

With the recent expansion of uses, there have been strongly required LCDs highly tolerant to the usage environment. For in-vehicle devices typified by car navigation systems, in particular, LCDs tolerant to high temperatures of 100° C. or higher are needed. Therefore, the transparent polymer film to be used in the invention should be tolerant to high temperatures of 100° C. or higher. As the results of the inventor's studies, it is found out that a polymer film having a glass transition temperature of 120° C. or higher would suffer from no optical change under heating at 100° C. Thus, it is preferable that the transparent polymer film of the invention has a glass transition temperature of 120° C. or higher.

Glass transition temperature was determined by measuring dynamic viscoelasticity. In the invention, the measurement was conducted by using DMA Q80 (manufactured by T A INSTRUMENTS, Inc.).

In an optical film of the invention, the value A1 defined by the following formula (1) ranges preferably from 0.10 to 0.95, more preferably from 0.3 to 0.8 and most preferably from 0.5 to 0.75; and the value A2 defined by the following formula (2) ranges preferably from 1.01 to 1.50, more preferably from 1.10 to 1.45 and most preferably from 1.20 to 1.40:

$$\text{Value } A1 = Re(450)/Re(550) \quad (1)$$

$$\text{Value } A2 = Re(650)/Re(550) \quad (2)$$

wherein Re(450) indicates an in-plane retardation value of the optical film to light of a wavelength of 450 nm; Re(550) indicates an in-plane retardation value of the optical film to light of a wavelength of 550 nm; and Re(650) indicates an in-plane retardation value of the optical film to light of a wavelength of 650 nm.

It is preferable that the preferable range of the absolute value of Re is regulated depending on the mode of each liquid crystal layer. In the case of the OCB and VA modes, for example, it ranges from 20 to 110 nm, preferably from 20 to 70 nm and more preferably from 35 to 70 nm.

In the optical film of the invention, the value C1 defined by the following formula (4) ranges preferably from 0.40 to 0.95, more preferably from 0.45 to 0.90 and most preferably from 0.50 to 0.80; and the value C2 defined by the following formula (5) ranges preferably from 1.05 to 1.93, more preferably from 1.10 to 1.80 and most preferably from 1.15 to 1.70. Rth(550) of the optical film of the invention ranges preferably from 70 to 400 nm, more preferably form 100 to 380 and most preferably from 130 to 350.

$$\text{Value } C1 = \{Re(450)/Rth(450)\}/\{Re(550)/Rth(550)\} \quad (4)$$

$$\text{Value } C2 = \{Re(650)/Rth(650)\}/\{Re(550)/Rth(550)\} \quad (5)$$

wherein Re(λ) indicates an in-plane retardation value of the optical film to light of a wavelength of λ (nm); and Rth(λ) indicates a thickness-direction retardation value of the optical film to light of a wavelength of λ (nm).

As a method of regulating Re of the optical film of the invention, it is preferable to employ a method of stretching a polymer film at a temperature of 25° C. to 100° C. corresponding to the glass transition temperature of the polymer.

On the other hand, the transmittance of the optical film is preferably 85% or higher, more preferably 90% or higher. By applying the stretching method according to the invention, an optical film having a higher transmittance can be obtained even in the case of using the same material. The inventor assumes that, by stretching at an extremely high temperature, impurities in the polymer material vaporize and thus factors causing scattering in the film are reduced.

Now, the mechanism of achieving a desired Re value at each wavelength by stretching at a high temperature will be illustrated by reference to a case of using cellulose acylate, i.e., the most preferred embodiment.

Cellulose acylate is composed of a main chain comprising glucopyranose ring and side chains comprising acyl group. When a film made of cellulose acetate is stretched, the main chain is oriented in the stretching direction, thereby expressing Re. As the results of intensive studies, the inventor has found out that when a cellulose acetate film is stretched at an extremely high temperature of from 175° C. to 210° C. (Tg of the cellulose acetate film employed: 140° C.), Re at 450 nm is lowered while Re at 650 nm is elevated.

After the stretching at such a high temperature as described above, the cellulose acetate film shows an X-ray diffraction peak seemingly assignable to crystallization. Thus, it is assumed that the orientation states of the main chain and the side chains are changed by the crystallization and thus the wavelength dependency of Re varies.

To provide the optical film of the invention in practice, therefore, crystallization is an important factor and the degree of orientation of the main chain, which is defined in accordance with the following formula calculated from X-ray diffractometry, preferably ranges from 0.04 to 0.30, more preferably form 0.06 to 0.25:

$$P = \langle 3\cos 2\beta - 1 \rangle / 2$$

provided that $\langle \cos 2\beta \rangle = \int (0,\pi) \cos^2 \beta I(\beta)\sin \beta d\beta / \int (0,\pi) I(\beta)\sin \beta d\beta$;

wherein β stands for the angle between the incident face of incident X ray and a direction 1 in the film plane; and I stands for the diffraction intensity at 2θ=8° in an X ray diffraction chart measured at the angle β.

The thickness-direction retardation (Rth) of the whole optical film has a function of canceling the retardation of the liquid crystal layer in the thickness direction in black display. Thus, the preferred range of Rth varies depending on the liquid crystal layer mode. In the case of using in optical compensation in an OCB mode liquid crystal cell (for example, an OCB mode liquid crystal cell having a product (Δn·d) of the thickness d (μm) of the liquid and the refractive index anisotropy Δn of from 0.2 to 1.5 μm), Rth ranges preferably from 70 to 400 nm, more preferably from 100 nm to 400 nm and more preferably from 130 to 200 nm.

As a method of regulating Rth, use is preferably made of a method of forming a liquid crystal layer as will be discussed hereinbelow or a method of adding an additive.

Next, an exemplary mode of cellulose acylate according to an aspect of the invention will be described.

As the cotton material for producing cellulose acylate, use can be made of a publicly known material (see, for example, Japan Institute of Invention and Innovation Journal of Technical Disclosure No. 2001-1745). Also, cellulose acylate can be synthesized by a publicly known method (see, for example, Migita et al., *Mokuzai Kagaku*, p. 180-190, Kyoritsu Shuppan, 1968). The viscosity-average degree of polymerization of the cellulose acylate is preferably from 200 to 700, more preferably from 250 to 500 and most preferably from 250 to 350. It is preferable that the cellulose ester to be used in the invention has a narrow molecular weight distribution Mw/Mn (wherein Mw stands for the weight-average molecular weight, while Mn stands for the number-average molecular weight) determined by gel permeation chromatography. Namely, Mw/Mn preferably ranges from 1.5 to 5.0, more preferably from 2.0 to 4.5 and most preferably from 3.0 to 4.0.

Although the acyl group in the cellulose acylate is not particularly restricted, it is preferable, from the view point of obtaining a desired glass transition temperature, to use an acetyl group or a propionyl group and an acetyl group is particularly preferred. The total degree of acyl-substitution is preferably from 2.7 to 3.0, more preferably from 2.8 to 2.95. The "degree of acyl-substitution" as used herein is a value calculated in accordance with ASTM D817. It is most preferable that the acyl group is an acetyl group. In the case of using cellulose acetate having an acetyl group as the acyl group, the degree of acetylation is preferably from 57.0 to 62.5%, more preferably from 58.0 to 62.0%. So long as the degree of acetylation falls within this range, Re would not exceed the desired level due to the transport tension in the casting step, there arises little in-plane scattering and the retardation suffers from little change depending on temperature or humidity.

In the case of a cellulose acylate film made of cellulose wherein hydroxyl groups in a glucose unit constituting the same have been substituted by acyl groups carrying 2 or more carbon atoms, the degree of substitution of the hydroxyl group at the 2-position in the glucose unit by an acyl group is referred to as DS2, the degree of substitution of the hydroxyl group at the 3-position by an acyl group is referred to as DS3, and the degree of substitution of the hydroxyl group at the 6-position by an acyl group is referred to as DS6. Then, it is preferred that these values fulfill the following formulae (1) and (11), since Re suffers from little change depending on temperature or humidity in such a case.

$$2.0 \leq DS2+DS3+DS6 \leq 3.0 \quad (I)$$

$$DS6/(DS2+DS3+DS6) \geq 0.315 \quad (II)$$

(Stretching)

As discussed above, the cellulose acylate film of the invention can exert its function when stretched.

Now, a preferred stretching method will be illustrated in detail.

To apply to a polarizing plate, it is preferable to stretch the cellulose acylate film of the invention in the width direction, as reported, for example, in JP-A-62-115035, JP-A-4-152125, WP-A-4-284211, JP-A-4-298310 and JP-A-11-48271. As described above, the film is stretched at a temperature of from Tg (25° C.) to 100° C. The film may be stretched either uniaxially or biaxially. The film can be stretched by treating during drying. It is particularly effective to stretch the film while the residual solvent is contained therein. For example, the film can be stretched by controlling the speed of a film transport roller so that the film is wound at a speed higher than the stripping speed. Alternatively, the film can be stretched by conveying the film while keeping its width by a tenter and widening the width of the tenter step by step. After drying, the film can also be stretched by using stretching machine (preferably by uniaxial stretching using a long stretching machine). The stretching ratio of the film (the ratio of the increase caused by stretching to the length of the unstretched film) is preferably from 0.5 to 300%, more preferably from 1 to 200% and particularly preferably from 1 to 100%. It is preferable to produce the cellulose acylate film of the invention by successively or continuously performing the film-formation step using the solvent cast method and the step of stretching the thus formed film. The stretching ratio is preferably 1.2-fold or more but not more than 1.8-fold. The stretching may be conducted either in a single step or in multiple steps. In the case of multiple step stretching, the product of the stretching ratios in individual steps should fall within the above range.

The stretching speed preferably ranges from 5%/min to 1,000%/min, more preferably from 10%/min to 500%/min. The stretching temperature is preferably from 30° C. to 160° C., more preferably form 70° C. to 150° C. and particularly preferably from 85 to 150° C. It is preferable to conduct the stretching with the use of heat rolls and/or a radiation heat source (an IR heater, etc.), or a hot air stream. To elevate the evenness in temperature, a thermostat may be provided. In the case of uniaxial roll-stretching, the ratio (L/W) of the distance between rolls (D) to the film width of the phase contrast plate (W) is preferably from 2.0 to 5.0.

It is preferable to employ a preheating step prior to the stretching. It is also possible to conduct a heat treatment after the completion of the stretching. The heating treatment is carried out preferably at a temperature of from the temperature lower by 20° C. than the glass transition temperature of the cellulose acylate film to a temperature higher by 10° C. than it. The heating is preferably conducted for 1 second to 3 minutes. Concerning the heat treatment, either zone heating or partial heating with the use of an infrared heater may be employed. Both edges of the film may be slit either in the course of the process or at the final stage. It is favorable that these film pieces thus slit are collected and re-used as the starting material. Concerning a tenter, it is described in JP-A-11-077718 that, in drying a web while holding its width with a tenter, worsening in the qualities such as surface smoothness in elevating the speed or widening the web in the solution cast method can be surely-prevented by appropriately controlling the method of blowing a drying gas, the blowing angle, the blowing speed distribution, the blowing speed, a difference in temperature, a difference in blowing rate, the ratio between the upper and lower blowing rates, use of a high-specific heat drying gas and so on.

According to the invention described in JP-A-11-077822, the occurrence of unevenness in a thermoplastic resin film is prevented by stretching the film and then applying a temperature gradient to the width direction of the film in the heat-relieving step.

According to the invention described in JP-A-4-204503, the occurrence of unevenness is prevented by controlling the solvent content in a film to 2 to 10% on the solid basis and then stretching the film.

According to the invention described in JP-A-2002-248680, curling due to the specification in the bite depth of clips is regulated by stretching a film at a tenter clip bite depth D≦(33/log(stretching ratio)×log(volatilization loss)) so as to suppress the curling and facilitate the film transport after the stretching step.

According to the invention described in JP-A-2002-337224, furthermore, the tenter transport is conducted by using pins in the first half and using clips in the second half.

Moreover, JP-A-2002-187960, which aims at easily improving viewing angle characteristics and improving the viewing angle, proposed a method which comprises casting a cellulose ester dope solution on a casting support, releasing a web (film) from the casting support and at least uniaxially stretching the web 1.0- to 4.0-fold while the amount of a residual solvent within the web is 100% by mass or less, specifically from 10 to 100% by mass to thereby establish optically biaxial film. In a preferred embodiment, it is stated to at least uniaxially stretch the web 1.0- to 4.0-fold while the amount of a residual solvent within the web is 100% by mass or less, particularly from 10 to 100% by mass. As other stretching methods, there are enumerated a method comprising using a plural number of rolls having different peripheral speeds and stretching a web in the longitudinal direction by taking advantage in the difference in peripheral speed between the rolls, a method comprising fixing a web at both ends with clips or pins and stretching the web by prolonging the intervals among the clips or pins in the transport direction, a method comprising stretching a web while similarly prolonging the intervals among clips or pins in the transverse direction, a method comprising stretching a web while similarly prolonging the intervals among clips or pins in the longitudinal and transverse directions at the same time, and a method comprising combining these techniques together. In the case of the so-called tenter method, furthermore, it is indicated that stretching can be smoothly performed by driving the clip parts by using the linear drive system and this method is favorable from the viewpoint of lessening troubles such as breakage.

To fabricate a phase contrast film showing little bleeding out of additives, no releasing phenomenon between layers and an excellent slipperiness and a high transparency, JP-A-2003-014933 proposes a method which comprises preparing a dope A containing a resin, an additive and an organic solvent and a dope B containing a resin, an organic solvent and no additive or an additive the content of which is lower than that in the dope A, co-casting them on a support so that the dope A serves as a core layer while the dope B serves a surface layer, evaporating the organic solvent so as to make the web strippable, subsequently stripping the web from the support and further stretching it 1.1 to 3.0-fold at least in a uniaxial direction while a residual solvent amount in the resin film is in the range of 3 to 50% by mass in the stretching. Preferred modes thereof comprise: stripping the web from the support and further stretching it 1.1 to 3.0-fold at least in a uniaxial direction at a stretching temperature of from 140° C. to 200°; preparing a dope A containing a resin and an organic solvent and a dope B containing a resin, microparticles and an organic solvent, co-casting them on a support so that the dope A serves as a core layer while the dope B serves a surface layer, evaporating the organic solvent so as to make the web strippable, subsequently stripping the web from the support and further stretching it to 1.1 to 3.0-fold at least in a uniaxial direction while a residual solvent amount in the resin film is in the range of 3 to 50% by mass in the stretching; further stretching the web 1.1 to 3.0-fold at least in a uniaxial direction at a stretching temperature of from 140° C. to 200°; preparing a dope A containing a resin, an additive and an organic solvent, a dope B containing a resin, an organic solvent and no additive or an additive the content of which is lower than that in the dope A and a dope C containing a resin, microparticles and an organic solvent, co-casting them on a support so that the dope A serves as a core layer, the dope B serves a surface layer and the dope C serves as another surface layer in the side opposite to the dope B, evaporating the organic solvent so as to make the web strippable, subsequently stripping the web from the support and further stretching it 1.1 to 3.0-fold at least in a uniaxial direction while a residual solvent amount in the resin film is in the range of 3 to 50% by mass in the stretching; stretching it 1.1 to 3.0-fold at least in a uniaxial direction at a stretching temperature of from 140° C. to 200°; the amount of the additive in the dope A being from 1 to 30% by mass based on the resin, the amount of the additive in the dope B being from 0 to 5% by mass based on the resin and the additive being a plasticizer, an UV absorber or a retardation regulating agent; and the organic solvents in the dopes A and B containing methylene chloride or methyl acetate in an amount of 50% by mass or more based on the total organic solvents.

In JP-A-2003-014933, it is also mentioned that a transverse stretching machine called a tenter, whereby a web is fixed at both ends with clips or pins and stretched by prolonging the intervals among the clips or pins in the transverse direction, is preferably usable. Moreover, it is disclosed therein that, to stretch or shrink in the longitudinal direction, the intervals among clips or pins in the transport direction (the longitudinal direction) are prolonged or shortened with the use of a simultaneous biaxial stretching machine. It is also indicated that stretching can be smoothly performed by driving the clip parts by using the linear drive system and this method is favorable from the viewpoint of lessening troubles such as breakage; and that, to stretch in the longitudinal direction, use can be made of a method comprising employing a plural number of rolls having different peripheral speeds and stretching a web in the longitudinal direction by taking advantage in the difference in peripheral speed between the rolls. It is furthermore indicated that these stretching methods may be combinedly employed and multiple stretching steps, for example, (longitudinal stretching, transverse stretching, longitudinal stretching) or (longitudinal stretching, longitudinal stretching).

The invention described in JP-A-2003-004374 provides a drying unit wherein the width of a dryer is shorter than the web width so as to prevent both edge of the web from the hot air stream from the dryer, thereby preventing bubbling in the web, improving the strippability of the web and preventing dusting in the course of the tenter-drying.

According to the invention described in JP-A-2003-019757, air-blocking plates are provided within both edge of a web to prevent the tenter holders from the drying air, thereby preventing bubbling in the web, improving the strippability of the web and preventing dusting in the course of the tenter-drying.

To stably conduct conveying and drying, JP-A-2003-053749 proposes an invention wherein, when the post-drying thickness of both edges of a film carried by a pin tenter is given as X μm and the average thickness of the finished product part of the film after drying is given as T μm, the relationship between X and T satisfies formula (1), formula (2) or formula (3): (1) in the case where $T \leq 60$, $40 \leq X \leq 200$; (2) in the case where $60 < T \leq 120$, $40+(T-60) \times 0.2 \leq X \leq 300$; or (3) in the case where $120 < T$, $52+(T-120) \times 0.2 \leq X \leq 400$.

To prevent wrinkles in a multistage tenter, JP-A-2-182654 proposes an invention wherein a heating chamber and a cooling chamber are provided in a dryer of a multistage tenter of a tenter device to cool the left and the right clip chains separately.

To prevent web breakage, wrinkles and transport failures, moreover, JP-A-9-077315 proposes an invention wherein a pin tenter is provided with pins at a higher density inside and at a lower density outside.

To prevent bubbling of a web per se or sticking of the web to a holder in a tenter, JP-A-9-085846 proposes an invention wherein, in a tenter drying apparatus, holder pins at both edges of a web are cooled to temperature lower than the bubbling temperature of the web and the pins just before the pins bite the web are cooled at the gelling temperature +15° C. or lower of a dope with a duct type cooler.

To prevent the detachment of a web from a pin tenter and ameliorate contamination with foreign matters, JP-A-2003-103542 proposes an invention relating to a solution film-forming method wherein, in a pin tenter, a biting construct is cooled so that the surface temperature of a web being in contact with the biting construct would not exceed the gelling temperature of the web.

To prevent worsening in the qualities such as surface smoothness in elevating the speed or widening a web in the solution cast method, JP-A-11-077718 proposes an invention wherein, in drying a web in a tenter, the blowing speed is controlled to 0.5 to 20(40) m/s, the temperature distribution in the transverse direction is regulated to 10% or less, the ratio between the upper and lower blowing rates is controlled to 0.2 to 1 and the drying gas ratio is controlled to 30 to 250 J/kmol. Moreover, preferable drying conditions for drying the web in the tenter depending on the amount of the residual solvent are disclosed therein. More specifically speaking, it is disclosed that: in the period of time from stripping off the web from the support till the content of the solvent remaining in the web amounts to 4% by mass, the blow-off angle of the drying gas from a blow-off port is set to 30 to 150° and, when the blowing speed distribution on the surface positioned in the blow-off extending direction of the drying gas is set on the basis of the upper limit value of blowing speed, the difference between upper and lower limit values is set within a range of 20% or less of the upper limit value to blow off the drying gas to perform drying; in the case where the content of the solvent remaining in the web is 70% by mass or more but not more than 130% by mass, the blowing speed of the drying gas from the blow type dryer on the web face is controlled to 0.5 m/sec or more but not more than 20 m/sec; in the case where the content of the solvent remaining in the web is 4% by mass or more but not more than 70% by mass, drying is conducted by a drying gas blown at a speed of from 0.5 m/sec or more but not more than 40 m/sec and when the blowing speed distribution in the transverse direction of the web of the drying gas is set on the basis of the upper limit value of blowing speed, the difference between upper and lower limit values is set within a range of 10% or less; and in the case where the content of the solvent remaining in the web is 4% by mass or more but not more than 200% by mass, the ratio of blowing rates (q) of the drying gas blown from the blow-off ports of the dryers located in the upper and lower sides of the web is $0.2 \leq q \leq 1$. Moreover, it is disclosed that, in a preferred embodiment, at least one gas is used as the drying gas, the average specific heat thereof is 31.0 J/Kmol or more but not more than 250 J/Kmol, drying is conducted by using a drying gas of the saturated vapor pressure in which the concentration of an organic compound being in a liquid state at ordinary temperatures contained therein is 50% or less, and so on.

To prevent worsening in planarity and coating properties due to the generation of contaminants, JP-A-11-077718 proposes an invention relating to an apparatus for producing TAC wherein a clips of a tenter have heating parts therein. In a preferred embodiment, it is disclosed that; within the period from the release of the web from the clips to the re-holding of the web, a unit is provided for removing contaminants which are generated in the area where the clips are in contact with a web, the contaminants are removed by using a jetting gas or liquid and a brush, the residual level upon the contact of the clips or pins with the web is 12% by mass or more but nor more than 50% by mass, and the surface temperature in the area where the clips are in contact with a web is 60° C. or higher but not higher than 200° C. (more preferably 80° C. or higher but not hither than 120° C.).

To relieve worsening in qualities caused by breakage in a tenter and elevate the productivity, JP-A-11-090943 proposes an invention wherein, in a tenter clip, the ratio Lr=Ltt/Lt (i.e., the ratio of an optional transportation length Lt (m) of the tenter to the total length Ltt (m) in the transportation direction of parts in which the web is held by clips in a tenter of the same length Lt) is made to be $1.0 \leq Lr \leq 1.99$. In a preferred embodiment, it is disclosed that the parts holding the web are provided with no intervals in the direction viewing from the web width.

To relieve worsening in planar conditions and unstable supply caused by sagging of a web in the case of feeding the web into a tenter, JP-A-11-090944 proposes an invention relating to an apparatus for producing a plastic film wherein a unit for preventing the sagging in the transverse direction of the web is provided before the tenter inlet. In a preferred embodiment, it is disclosed that the unit for preventing the sagging is a rotary roller expanding within the scope of direction of from 2 to 60° in the transverse direction, a sucking unit is located in the upper side of the web, a blower from which a gas can be blown from the lower side of the web is also provided, and so on.

To prevent sagging which causes worsening in qualities and lowering in productivity, JP-A-11-090945 proposes an invention relating to a method of producing TAC wherein a web stripped from a support is fed into a tenter at an angle to the horizontal direction.

To obtain a film having stable properties, JP-A-2000-289903 proposes an invention relating to a carrying device whereby a web having been stripped and containing 50 to 12% by weight of a solvent is carried while applying tension in the width direction of the web, characterized in that a means of detecting the web width, a means of retaining the web and two or more variable bending points are provided and the web width is computed based on the detection signals from the web width detection means to thereby alter the positions of the bending points.

To improve clipping properties, prevent a web from breakage over a long time and give a film having excellent qualities, furthermore, JP-A-2003-033933 proposes an invention relating to a device wherein guide plates for preventing curl generation are arranged at both of right and left sides near a portion of an entrance of the tenter and at least in one of the upper and lower positions at the marginal portions of right and left of the web and the face of each guild plate facing to the web comprises a resin part to be in contact with the web located in the delivery direction of the web and a metal part to be in contact with the web. In a preferred embodiment, it is disclosed that: resin part to be in contact with the web of the face opposite to the web of the guide plate is provided upstream in the web delivery direction while the metal part to be in contact with the web is provided downstream; the difference in height (including slope) between the resin part to be in contact with the web and the metal part to be in contact with the web of the guild plate is 500 μm or less; the web-contact distances in the width direction of the resin part to be in contact with the web and the metal part to be in contact with the web of the guild plate are each from 2 to 150 mm; the web-contact distances in the delivery direction of the resin part to be in contact with the web and the metal part to be in contact with the web of the guild plate are each from 2 to 150 mm; the resin part to be in contact with the web of the guide plate is formed by processing or coating a resin on the surface of the guide plate made of a metal; the resin part to be in contact with the web of the guide plate is made of a resin alone; the distance between the faces of the guide plates, which are provided at the upper and lower positions at the marginal portions of right and left of the web, facing to the web is from 3 to 30 mm; at the marginal portions of right and left of the web, the distance between the faces of the upper and lower guide plates facing to the web is enlarged at a ratio of 2 mm or more per 100 mm width in the width direction of the web and inward; at the marginal portions of right and left of the web, the upper lower guide plates have each a length of from 10 to 300 mm and the upper and lower guide plates are located with out of alignment in the delivery direction of the web, and the misalignment distance between the upper and lower guide plates is from −200 to +200 mm; the face of the upper guide plate facing to the web is made of a resin or a metal alone; the resin part to be in contact with the web of the guide plate is made of Teflon (registered trade name) while the metal part to be in contact with the web is made of stainless steel; the surface roughness of the face of the guide plate facing to the web or the resin part to be in contact with the web formed thereon and/or the metal part to be in contact with the web is 3 μm or less; and so on. It is also mentioned that the upper and lower guide plates for preventing curling in the web side margins are preferably located between the edge of the support in the stripping side to the tenter inlet, in particular, a position close to the tenter entrance.

To prevent cutting or irregularity occurring in a web during drying, JP-A-11-048271 proposes an invention wherein a stripped web having a solvent content of from 50 to 12% by weight is stretched with a width-stretching machine and dried and applying pressure of from 0.2 to 10 KPa from both sides of the web by using a pressurizing unit at the point of the solvent content of from 50 to 12% by weight. In a preferred embodiment, it is disclosed that: the application of the tension is ceased at the point of the solvent content of 4% by mass; and in the case of applying pressure by using nip rolls from both sides of the web (film), it is preferable to use 1 to 8 nip roll pairs and the temperature at pressurizing is from 100 to 200° C.

The invention of JP-A-2002-036266 aims at providing a thin tack of 20 to 85 μm in thickness having high qualities. In a preferred mode thereof, it is disclosed that: the difference in tensions along the transport direction of a web before and after tentering is regulated to 8 N/mm$^2$ or less; after the stripping step, a preheating step of preheating the web, the stretching step of stretching the web with the use of a tenter after the preheating step, and a relief step of relieving the web in a level less than the stretched level after the stretching step are employed and the temperature T1 in the preheating and stretching steps is adjusted to (glass transition temperature Tg of film-60)° C. or higher and the temperature T2 in the relief step is adjusted to (T1−10)° C. or lower; the web stretching ratio in the stretching step is from 0 to 30% expressed in the ratio to the web width immediately before entering the stretching step and the web stretching ratio in the relief step is from −10 to 10%; and so on.

JP-A-2002-225054, which aims at providing a thin film having a dry film thickness of 10 to 60 μm and a lightweight display having a high durability such as a low moisture permeability, discloses: after stripping, holding a web by clipping at both edges until the content of the solvent remaining in the web amounts to 10% by mass, thus holding the width to thereby prevent shrinkage due to drying, and/or stretching in the transverse direction to form a film having a planar orientation degree (S) represented by $S=\{(Nx+Ny)/2\}-Nz$ (wherein Nx stands for the refractive index in the direction showing the highest refractive index in the plane; Ny stands for the refractive index in the direction orthogonal to Nx in the plane; and Nz stands for the thickness-direction refractive index of the film) of from 0.0008 to 0.0020; conducting the procedures from casting to stripping within 30 to 90 seconds; stretching the stripped web in the transverse direction and/or the longitudinal direction.

JP-A-2002-341144 proposes a solution film-forming method involving the stretching step wherein the mass concentration of a retardation raising agent has an optical distribution showing an increase as being more closely to the center in the width direction of the film to thereby lessen optical unevenness.

According to the invention of JP-A-2003-071863 aiming at providing a film with no fogging, it is stated that the stretching ratio in the transverse direction preferably ranges from 0 to 100%, more preferably from 5 to 20% and most preferably form 8 to 15% in the case of using as a protective film of a polarizing plate. In the case of using a phase contrast film, on the other hand, the stretching ratio preferably ranges from 10 to 40% and most preferably form 20 to 30%. It is disclosed therein that Ro can be controlled depending on the stretching ratio and a higher stretching ratio is preferred since a film having excellent planarity can be thus obtained. It is also indicated that, in the case of conducting tentering, the content of the solvent remaining in the film is preferably from 20 to 100% by mass at the initiation of the tentering and it is also preferable to dry the film while tentering until the content of the solvent remaining in the film is lowered to 10% by mass or less, more preferably 5% by mass or less. It is also disclosed therein that, in the case of conducting tentering, the drying temperature is preferably from 30 to 150° C., more preferably from 50 to 120° C. and most preferably form 70 to 100° C.; the evaporation of a UV absorber, a plasticizer, etc. can be regulated and processing contamination can be lessened at a lower drying temperature while a film having a higher planarity can be obtained at a higher drying temperature; and so on.

JP-A-2002-248639 proposes an invention, which aims at providing a cellulose ester film reduced in longitudinal and lateral dimensional fluctuations, relating a method for manufacturing the cellulose ester film by casting a cellulose ester solution on a support and continuously stripping the web to dry the same wherein drying is conducted so that a drying shrinkage factor satisfies a formula: 0≦drying shrinkage factor (%)≦0.1×residual solvent amount (%) at the time of peeling. In a preferred embodiment, it is disclosed that, when the residual solvent amount in the stripped cellulose ester film falls within the range of from 40 to 100% by mass, the residual solvent amount is reduced by 30% by mass or more while holding both edge of the cellulose ester film in tenter transport; the residual solvent amount of the stripped cellulose ester film at the entrance of the tenter transport is from 40 to 100% by mass while the residual solvent amount at the exit is from 4 to 20% by mass; the tension for transporting the cellulose ester film by the tenter transport is increased from the entrance of the tenter transport toward the exit; the tension in transporting the cellulose ester film by the tenter transport is almost the same as the tension in the transverse direction of the cellulose ester film; and so on.

To obtain a film having a small film thickness and being excellent in optical anisotropy and planarity, JP-A-2000-239403 discloses a method wherein a relationship between the residual solvent ratio X at the time of release and the residual solvent ratio Y at the time of introduction to the tenter falls within the range of 0.3X≦Y≦0.9X.

JP-A-2002-286933 discloses a method of stretching a film formed by the casting method. In this patent, a method of stretching a film under heating and another method of stretching a film while it contains a solvent are presented. It is indicated therein that, in the case of stretching under heating, it is preferable to stretch the film at a temperature around the glass transition temperature of a resin or lower; and in the case of stretching a film formed by the casting method in a state of impregnated with a solvent, the film having been once dried can be contacted with a solvent and impregnated with the solvent followed by stretching.

(Retardation Raising Agent Having Maximum Absorption Wavelength ($\lambda$max) Shorter Than 250 nm)

To regulate the absolute value of Re of the optical film of the invention, it is preferable to use a compound which has a maximum absorption wavelength ($\lambda$max) shorter than 250 nm in the UV absorption spectrum of a solution as a retardation raising agent in an amount of from 0.01% by mass to 30% by mass, preferably from 0.5 to 20% by mass, based on the optical film. By using such a compound, the absolute value can be regulated without causing a substantial change in the wavelength dependency of Re in the visible region.

From the viewpoint of the function as a retardation raising agent, a rod-shaped compound is preferable and a compound having at least one aromatic ring is preferred and a compound having at least two aromatic rings is more preferred.

A rod-shaped compound having a linear molecular structure is preferred. The term "linear molecular structure" means that the molecular structure of a rod-shaped compound is linear in the thermodynamically most stable structure thereof. The thermodynamically most stable structure can be determined by analyzing crystalline structure or computing molecular orbital. Namely, the molecular structure wherein the heat of the formation of the compound attains the minimum level can be determined by computing the molecular orbital with the use of, for example, a molecular orbit computing software (for example, Win MOPAC 2000 manufactured by FUJITSU). A linear molecular structure means that, in the thermodynamically most stable state computed as described above, the angle of the molecular structure is 140° or above.

It is preferable that the rod-shaped compound shows liquid crystallinity. It is more preferred that the rod-shaped compound shows liquid crystallinity when heated (i.e., having thermotropic liquid crystallinity). As the liquid crystal phase, a nematic phase or a smectic phase is preferred.

Although preferable compounds are described in JP-A-2004-4550, the invention is not restricted thereto. Use may be also made of two or more rod-shaped compounds each having a maximum absorption wavelength ($\lambda$max) shorter than 250 nm in the UV absorption spectrum of a solution thereof.

Rod-shaped compounds can be synthesized by referring to methods reported in documents. As the documents, there can be enumerated Mol. Cryst. Liq. Cryst., vol. 53, p. 229 (1979); ibid. vol. 89, p. 93 (1982); ibid. vol. 145, p. 111 (1987); ibid. vol. 170, p. 43 (1989); J. Am. Chem. Soc., vol. 113, p. 1349 (1991); ibid. vol. 118, p. 5346 (1996); ibid. vol. 92, p. 1582 (1970); J. Org. Chem., vol. 40, p. 420 (1975); and Tetrahedron, vol. 49, No. 16, p. 3437 (1992).

(Retardation Raising Agent Having Maximum Absorption Wavelength ($\lambda$max) Longer Than 250 nm)

To achieve the desired Rth, it is preferable to use a retardation raising agent.

The term "retardation raising agent" as used herein means such an "additive" that the retardation value of a cellulose acylate film, which contains the additive, measured at a wavelength of 550 nm is higher by 20 nm or more than the retardation value of another cellulose acylate film which is produced in the same manner but not using the additive. The raise in the retardation value is preferably 30 nm or more, still preferably 40 nm or more and most preferably 60 nm or more.

It is preferable that the retardation raising agent is a compound having at least two aromatic rings. The retardation raising agent is used preferably in an amount of from 0.01 to 20 parts by mass, more preferably from 0.1 to 10 parts by mass, more preferably from 0.2 to 5 parts by mass and most preferably from 0.5 to 2 parts by mass, per 100 parts by mass of cellulose acylate. Use may be made of a combination of two or more types of retardation raising agents.

It is preferable that the retardation raising agent has the absorption peak in a wavelength range of from 250 to 400 nm and it preferably has no peak in the visible light range.

It is preferable that the retardation raising agent regulating Rth exerts no effect on Re expressed by stretching. It is also preferable to use a discotic compound.

The discotic compounds involve those having, in addition to aromatic hydrocarbon rings, aromatic heterocycles. It is particularly preferable that an aromatic hydrocarbon ring is a 6-membered ring (i.e., a benzene ring). Aromatic heterocycles are generally unsaturated heterocycles. As an aromatic heterocycle, a 5-membered ring, a 6-membered ring or a 7-membered ring is preferable and a 5-membered ring or a 6-membered ring is still preferable. In general, aromatic heterocycles have a large number of double bonds. As the hetero atom, a nitrogen atom, an oxygen atom and a sulfur atom are preferable and a nitrogen atom is particularly preferred. Examples of the aromatic heterocycles include a furan ring, a thiophene ring, a pyrrole ring, an oxazole ring, an isooxazole ring, a thiazole ring, an isothiazole ring, an imidazole ring, a pyrazole ring, a furazan ring, a triazole ring, a pyran ring, a pyridine ring, a pyridazine ring, a pyrimidine ring, a pyrazine ring and a 1,3-triazine ring.

As an aromatic ring, use is preferably made of a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring and a 1,3,5-triazine ring is particularly preferable. More specifically, it is preferable to use compounds disclosed in, for example, JP-A-2001-166144.

The aromatic compound is used within a range of from 0.01 to 20 parts by mass per 100 parts by mass of cellulose acetate. It is preferable to use the aromatic compound in an amount of from 0.05 to 15 parts by mass, more preferably from 0.1 to 10 parts by mass per 100 parts by mass of cellulose acetate. Use may be made of a combination of two or more compounds.

(Method of Regulating Rth: Method of Using Optically Anisotropic Layer)

As a method of regulating Rth without affecting Re expressed by stretching, it is preferable to employ a method of forming an optically anisotropic layer such as a liquid crystal layer.

As specific examples of the formation of a liquid crystal layer, there can be enumerated a method which comprises orienting discotic liquid crystals while controlling the angle between the disc face and the optical film plane as described above within 5° (JP-A-10-312166), and a method which comprises orienting rod-shaped liquid crystals while controlling the angle between the major axis thereof and the optical film plane as described above within 5° (JP-A-2000-304932).

(Optically Compensatory Film)

An optically compensatory film, which is obtained by forming an optically anisotropic layer made of a liquid crystal compound on the optical film of the invention, contributes to the viewing angle enlargement in a liquid crystal display (in particular, an OCB mode, VA mode or IPS mode liquid crystal display) and lessening in color shift depending on viewing angle. The optically compensatory film of the invention may be provided between a polarizing plate in the viewer side and a liquid crystal cell, or it may be provided between a polarizing plate in the back side and the liquid crystal cell. It is also possible to provide the optically compensatory films at both of these positions. The optically compensatory film may be packaged as an independent member into the liquid crystal display. Alternatively, the optical characteristics may be imparted to a protective film protecting a polarizing film to make it to serve as a transparent film too. Then, the film can be packaged into a liquid crystal display as a part of the polarizing plate. The optically compensatory film of the invention comprises at least two layer, i.e., the optical film of the invention and an optically anisotropic layer having different optical characteristics. An orientation film regulating the orientation of the liquid crystal compound in the optically anisotropic layer can be provided between the optical film and the optically anisotropic layer. Moreover, each of the optical film and the optically anisotropic layer may be composed of two or more layers, so long as the optical characteristics as will be described hereinafter are fulfilled. First, each constituting member of the optically compensatory film according to the invention will be described in greater detail.

[Optically Anisotropic Layer Comprising Liquid Crystal Compound]

The optically anisotropic layer as described above may be formed directly on the surface of the optical film. Alternatively, it may be formed on an orientation film having been formed on the optical film. It is also possible that a liquid crystal compound layer is formed on another support and then transferred onto the optical film by using a pressure-sensitive adhesive, an adhesive, etc. to thereby give the optically compensatory film of the invention.

As the liquid crystal compound to be used in forming the optically anisotropic layer, there can be enumerated rod-shaped liquid crystal compounds and discotic liquid crystal compounds (which will be called "discotic liquid crystal compounds" in some cases). These rod-shaped liquid crystal compound and discotic liquid crystal compounds may be either high-molecular ones or low-molecular ones. Further, it is not always required that the compound finally contained in the optically anisotropic layer shows liquid crystallinity. In the case of using a low-molecular compound in forming the optically anisotropic layer, the low-molecular compound having been crosslinked in the course of forming the optically anisotropic layer and thus showing no liquid crystallinity any more also fall within the scope.

In the case of directly forming a layer comprising the liquid crystal compound directly on the optical film, it is preferable to prevent the optical film from changes in the optical characteristics. Therefore, it is preferable to control the liquid crystal transition temperature of the liquid crystal layer not to be higher by 20° C. or more than the glass transition temperature of the optical film. From an industrial viewpoint, it is difficult to dry the solvent in the liquid crystal layer at room temperature or lower. It is therefore preferable that the liquid crystal transition temperature of the liquid crystal layer is not lower than room temperature. The liquid crystal transition temperature can be controlled not only depending on the structure of the liquid crystal but also by adding an additive or the like as will be discussed hereinafter. Namely, it is preferable to control the liquid crystal transition temperature within an appropriate range by controlling the addition amount, etc.

It is preferable that the optically anisotropic layer comprising the liquid crystal compound has the optical characteristics fulfilling the value B1 as defined by the following formula (3).

Value $B1$ $Re(450)/Re(650) \leq 1.25$ (3)

wherein Re(450) indicates an in-plane retardation value of the optical film to light of a wavelength of 450 nm; and Re(650) indicates an in-plane retardation value of the optical film to light of a wavelength of 650 nm.

It is more preferable that the value B1 is 1.2 or less, particularly preferably 1.18 or less.

It is mot preferable that the value B1 is appropriately determined based on the wavelength dispersion of the retardation of the liquid crystal in the cell.

In the case of applying to an OCB mode liquid crystal display, in particular, it is preferable that Re of the optically anisotropic layer fulfills $0 \leq Re(550) \leq 50$, more preferably $20 \leq Re(550) \leq 40$. It is preferable that the optically anisotropic layer is designed so that the liquid crystal compound in the liquid crystal cell can be compensated thereby in black display by the liquid crystal display. Orientation states of the liquid crystal compound in the liquid crystal cell are mentioned in IDW'00, FMC7-2, p. 411 to 414.

In the case of applying the liquid crystal compound directly to the optical film of the invention or via an orientation film, it is preferable to have a liquid crystal transition temperature not higher by 10° C. or more than the glass transition temperature of the optical film, more preferably not hither than the glass transition temperature. It is most preferable that the liquid crystal transition temperature is lower by 10° C. or more than the glass transition temperature.

The thickness of the optically anisotropic layer comprising the liquid crystal compound is preferably from 0.1 to 20 µm, more preferably from 0.3 to 10 µm and most preferably from 0.5 to 5 µm.

<<Rod-Shaped Liquid Crystal Compound>>

As the rod-shaped liquid crystal compound usable in the invention, use may be preferably made of azomethines, azoxys, cyanobiphenyls, cyanophenyl esters, benzoic acid esters, cyclohexanecarboxlic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles. Metal complexes also fall within the category of the rod-shaped liquid crystal compound. Moreover, use may be made of a liquid crystal polymer containing a rod-shaped liquid crystal compound in its repeating unit. In other words, the rod-shaped liquid crystal compound may be bonded to a (liquid crystal) polymer. Rod-shaped liquid crystal compounds are described in ed. by Nihon Kagaku-kai, Kikan Kagaku Sosetsu, No. 22, Ekisho no Kagaku, cahps.4, 7 and 11 (1994); and ed. by Nihon Gakujutsu Shinkokai Dai 142 Iinkai, Ekisho Debaisu Handobukku, chap. 3.

It is preferable that the birefringent index of the rod-shaped liquid crystal compound to be used in the invention ranges from 0.001 to 0.7.

To fix the orientation state, it is preferable that the rod-shaped liquid crystal compound has a polymerizable group. As the polymerizable group, an unsaturated polymerizable group or an epoxy group is preferred, an unsaturated polymerizable group is more preferred and an ethylenically unsaturated polymerizable group is most preferred.

<<Discotic Liquid Crystal Compound>>

Examples of the discotic liquid crystal compound usable in the invention include benzene derivatives reported by C.

Destrade et al., Mol. Cryst. Cryst., vol. 71, p. 111 (1981); truxene derivatives reported by C. Destrade et al., Mol. Cryst., vol. 122, p. 141 (1985) and Physics Lett., A, vol. 78, p. 82 (1990); cyclohexane derivatives reported by B. Kohne et al., Angew. Chem. vol. 96, p. 70 (1984); and azacrown type and phenylacetylene type macrocycles reported by J. M. Lehn et al., J. Chem. Commun., p. 1974 (1985) and J. Zhang et al., J. Am. Chem., Soc., vol. 116, p. 2655 (1994).

The discotic liquid crystal compounds as described above include a compound showing liquid crystallinity in which linear alkyl groups, alkoxy groups or substituted benzoyloxy substituents are radially attached as side chains to the mother nucleus at the molecular center. A compound which has rotational symmetry, as a molecule or a mass of molecules, and can impart definite orientation is preferable.

In the case of forming an optically anisotropic layer made of a liquid crystal compound as discussed above, the compound finally contained in the optically anisotropic layer would not necessarily show liquid crystallinity any more. When a low-molecule discotic liquid crystal compound has a heat- or light-reactive group and undergoes polymerization or crosslinkage by the reaction of this group due to heat or light to give a high-molecule compound thereby forming an optically anisotropic layer, for example, the compound contained in the optically anisotropic layer may not sustain its liquid crystal properties any longer. Preferable examples of the discotic liquid crystal compound is cited in JP-A-8-50206. Polymerization of the discotic liquid crystal compound is mentioned in JP-A-8-27284.

To fix the discotic liquid crystal compound by polymerization, a polymerizable group should be bonded as a substituent to the discotic core of the discotic liquid crystal compound. When a polymerizable group is bonded directly to the discotic core, however, it becomes difficult to sustain the orientation state during the polymerization. Therefore, it is preferable to introduce a linking group between the discotic core and the polymerizable group. Therefore, it is preferable that a discotic liquid crystal compound having a polymerizable group is a compound represented by the following formula (III) or (DI).

$$D(-L-Q)_n \quad \text{Formula (III)}$$

In the formula (III), D represents a discotic core; L represents a divalent linking group; Q represents a polymerizable group; and n is an integer of from 4 to 12.

Examples of the discotic core (D) are as follows. In each of these examples, LQ (or QL) stands for a combination of a divalent linking group (L) with a polymerizable group (Q).

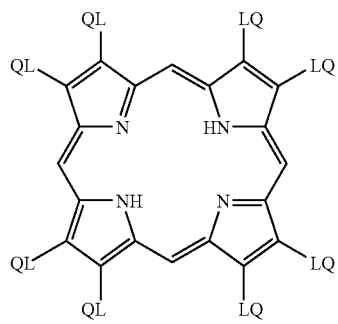
(D1)

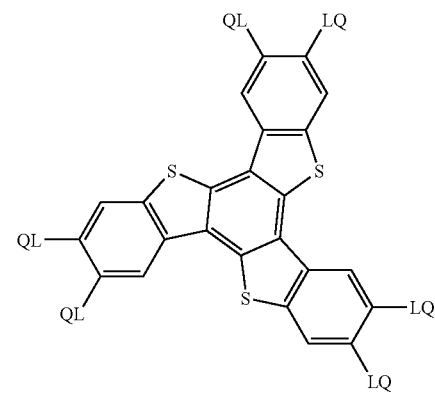
(D2)

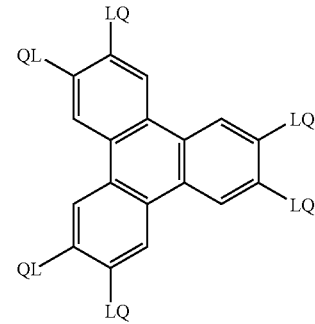
(D3)

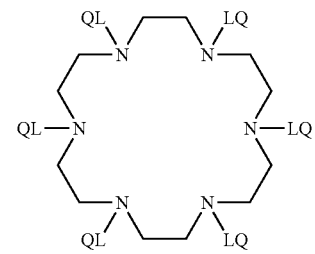
(D4)

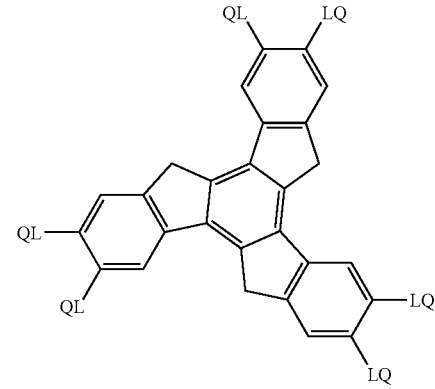
(D5)

-continued
(D6)
(D7)
(D8)
(D9)
(D10)
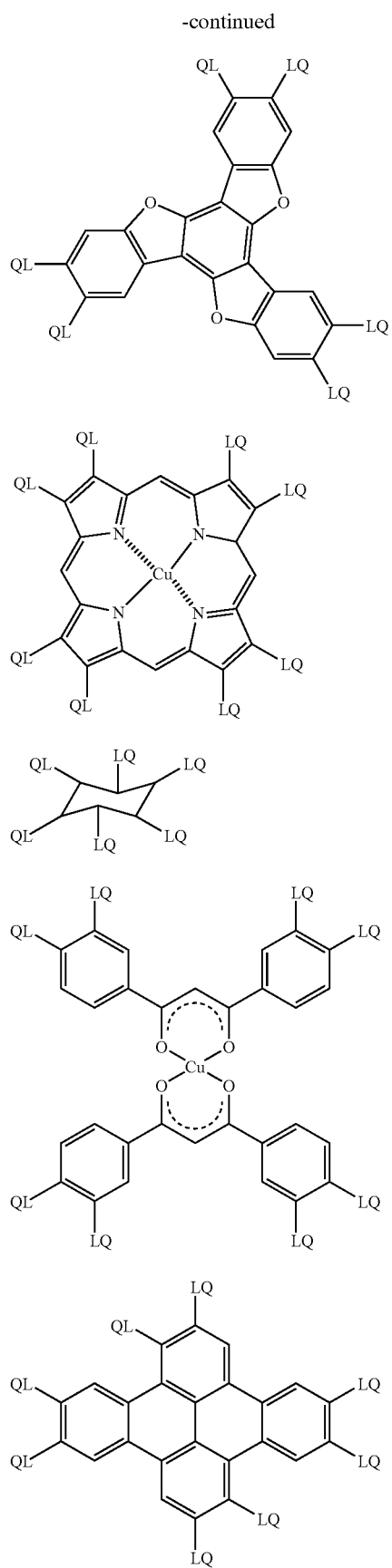
-continued
(D11)
(D12)
(D13)
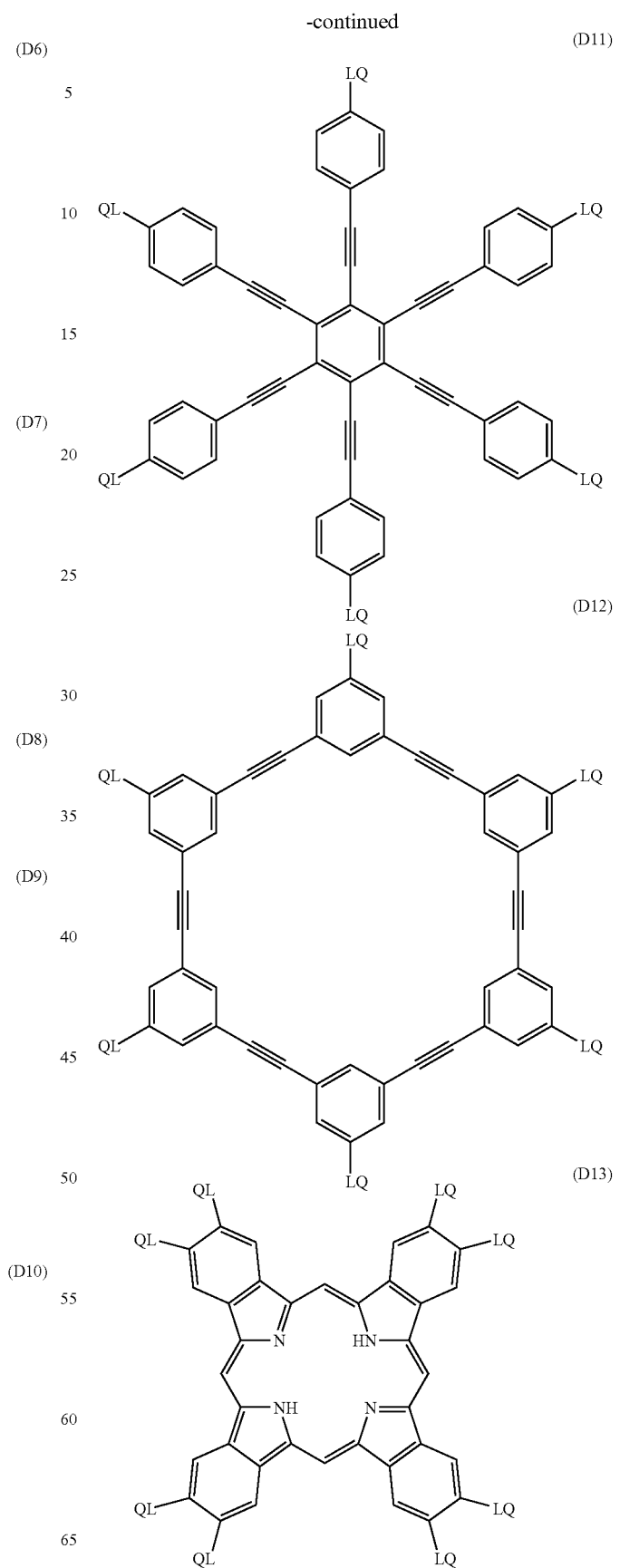

-continued

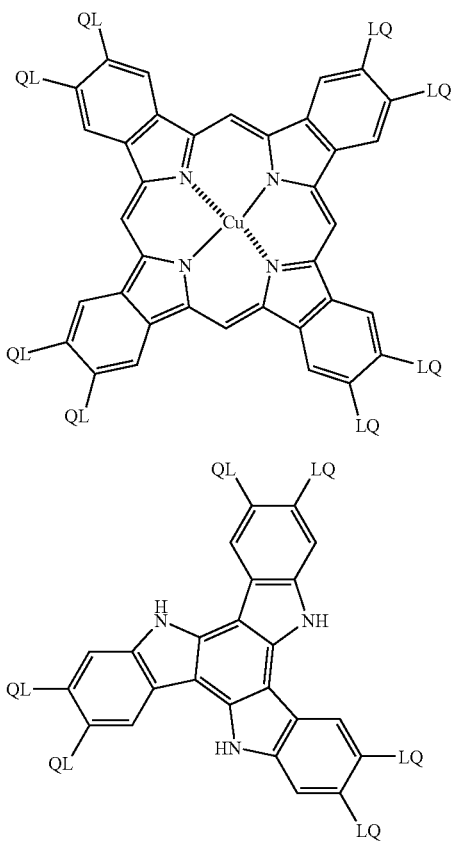

(D14)

(D15)

In the formula (III), it is preferable that the divalent linking group (L) is a divalent linking group selected from the group consisting of an alkylene group, an alkenylene group, an arylene group, —CO—, —NH—, —O—, —S— and a combination thereof. It is more preferable that the divalent linking group (L) is a divalent linking group in which at least two divalent groups selected from the group consisting of an alkylene group, an arylene group, —CO—, —NH—, —O—, —S— are combined. It is most preferable that the divalent linking group L) is a divalent linking group in which at least two divalent groups selected from the group consisting of an alkylene group, an arylene group, —CO— and —O— are combined. It is preferable that the alkylene group has form 1 to 12 carbon atoms. It is preferable that the alkenylene group has from 2 to 12 carbon atoms. It is preferable that the arylene group has from 6 to 10 carbon atoms.

Examples of the divalent linking group (L) are as follows. The left side of the divalent linking group is bonded to the discotic core (D) while the right side thereof is bonded to the polymerizable group (Q). AL stands for an alkylene group or an alkenylene group, and AR stands for an arylene group. These alkylene group, alkenylene group and arylene group may have a substituent (for example, an alkyl group).

L1: -AL-CO—O-AL-

L2: -AL-CO—O-AL-O—

L3: -AL-CO—O-AL-O-AL-

L4: -AL-CO—O-AL-O—CO—

L5: —CO-AR-O-AL-

L6: —CO-AR-O-AL-O—

L7: —CO-AR-O-AL-O—CO—

L8: —CO—NH-AL-

L9: —NH-AL-O—

L10: —NH-AL-O—CO—

L11: —O-AL-

L12: —O-AL-O—

L13: —O-AL-O—CO—

L14: —O-AL-O—CO—NH-AL-

L15: —O-AL-S-AL-

L16: —O—CO-AR-O-AL-CO—

L17: —O—CO-AR-O-AL-O—CO—

L18: —O—CO-AR-O-AL-O-AL-O—CO—

L19: —O—CO-AR—O-AL-O-AL-O-AL-O—CO—

L20: —S-AL-

L21: —S-AL-O—

L22: —S-AL-O—CO—

L23: —S-AL-S-AL-

L24: —S-AR-AL-

The polymerizable group (Q) in the formula (III) is determined depending on the type of the polymerization. As the polymerizable group (Q), an unsaturated polymerizable group or an epoxy group is preferred, an unsaturated polymerizable group is more preferred and an ethylenically unsaturated polymerizable group is most preferred.

In the formula (III), n is an integer of from 4 to 12. The numerical value is determined in practice depending on the type of the discotic core (D). Although the combinations of L with Q in a plural number may be different, it is preferred that these combinations are the same.

Formula (DI)

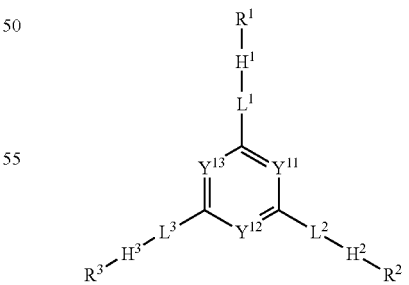

In the formula (DI), $Y^{11}$, $Y^{12}$ and $Y^{13}$ independently represent each a methine group or a nitrogen atom.

In the case where $Y^{11}$, $Y^{12}$ and $Y^{13}$ represent methine groups, hydrogen atoms in the methine groups may be substituted. The term "methine" as used herein means a group obtained by removing 3 hydrogen atoms from methane.

As preferable examples of the substituents which may be carried by the carbon atoms in a methine group, there can be enumerated an alkyl group, an alkoxy group, an aryloxy group, an acyl group, an alkoxycarbonyl group, an acyloxy group, an acylamino group, an alkoxycabronylamino group, an alkylthio group, an arylthio group, a halogen atom and a cyano group. Among these substituents, an alkyl group, an alkoxy group, an alkoxycarbonyl group, an acyloxy group, a halogen atom and a cyano group are preferable and an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group are most preferable.

It is preferable that $Y^{11}$, $Y^{12}$ and $Y^{13}$ all represent methine groups and these methine groups are not substituted.

In the formula (DI), $L^1$, $L^2$ and $L^3$ independently represent each a single bond or a divalent linking group. In the case where $L^1$, $L^2$ and $L^3$ are linking groups, it is preferable that they independently represent linking groups selected from the group consisting of —O—, —S—, —C(=O)—, —NR$^7$—, —CH=CH—, —C≡C—, a divalent cyclic group and a combination thereof. $R^7$ represents an alkyl group having form 1 to 7 carbon atoms or a hydrogen atom, preferably an alkyl group having from 1 to 4 carbon atoms or a hydrogen atom, more preferably a methyl group, an ethyl group or a hydrogen atom and most preferably a hydrogen atom.

In $L^1$, $L^2$ and $L^3$, a divalent linking group means a divalent linking group having at least one type of a cyclic group (hereinafter sometimes called "a cyclic group"). As the cyclic group, a 5-membered ring, a 6-membered ring or a 7-membered ring is preferable, a 5-membered ring or a 6-membered ring is more preferable and a 6-membered ring is most preferable. The ring contained in the cyclic group may be a fused ring. However, a single ring is preferred to a fused ring. The ring contained in the cyclic group may be either an aromatic ring, an aliphatic ring or a heterocycle. Preferable examples of the aromatic ring include a benzene ring and a naphthalene ring. As the aliphatic ring, a cyclohexane ring can be cited as a preferable one. As the heterocycle, a pyridine ring and a pyrimidine ring can be cited as preferable ones. As the cyclic group, an aromatic ring and an aliphatic ring are more preferable. It is more preferable that a divalent cyclic group to be used in the invention is a divalent linking group comprising a cyclic structure (including a substituent) alone (the same will apply hereinafter).

As a cyclic group having a benzene ring in the divalent cyclic groups represented by $L^1$, $L^2$ and $L^3$, a 1,4-phenylene group is preferable. As a cyclic group having a naphthalene ring, a naphthalene-1,5-diyl group and a naphthalene-2,6-diyl group are preferable. As a cyclic group having a cyclohexane ring, a 1,4-cyclohexylene group is preferable. As a cyclic group having a pyridine ring, a pyridine-2,5-diyl group is preferable. a cyclic group having a pyrimidine ring, a pyrimidine-2,5-diyl group is preferable.

The divalent cyclic groups represented by $L^1$, $L^2$ and $L^3$ may have a substituent. Examples of the substituent include a halogen atom, a cyano group, a nitro group, an alkyl group having from 1 to 16 carbon atoms, an alkenyl group having from 2 to 16 carbon atoms, an alkynyl group having from 2 to 16 carbon atoms, a haloalkyl group having from 1 to 16 carbon atoms, an alkoxy group having from 1 to 16 carbon atoms, an acyl group having from 2 to 16 carbon atoms, an alkylthio group having from 2 to 16 carbon atoms, an acyloxy group having from 2 to 16 carbon atoms, an alkoxycarbonyl group having from 2 to 16 carbon atoms, a carbamoyl group, a carbamoyl group substituted by an alkyl group having from 1 to 16 carbon atoms and acylamino group having from 2 to 16 carbon atoms.

As $L^1$, $L^2$ and $L^3$, a single bond, *—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH— and *-divalent cyclic group-C≡C— are preferable. In particular, a single bond, *—CH=CH—, *—C≡C—, *-divalent cyclic group-O—CO—, *—CH=CH-divalent cyclic group- and *-divalent cyclic group-C≡C— are preferable and a single bond is most preferable. * stands for the position at which the group is attached to the 6-membered ring side containing $Y^{11}$, $Y^{12}$ and $Y^{13}$ in the formula (DI).

$H^1$, $H^2$ and $H^3$ independently represent each a group represented by the following formula (DI-A) or the following formula (DI-B).

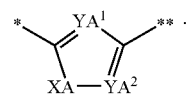

Formula (DI-A)

In the formula (DI-A), $YA^1$ and $YA^2$ independently represent each a methine group or a nitrogen atom. It is preferable that at least one of $YA^1$ and $YA^2$ is a nitrogen atom and it is more preferable that both of them are nitrogen atoms. XA represents an oxygen atom, a sulfur atom or a methylene group or an imino group, and an oxygen atom is preferable therefor. * stands for the position at which the group is attached to the $R^1$ to $R^3$ side in the formula (DI). The term "an imino group" as used herein means —NH—.

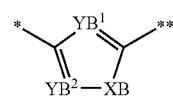

Formula (DI-B)

In the formula (DI-B), $YB^1$ and $YB^2$ independently represent each a methine group or a nitrogen atom. It is preferable that at least one of $YB^1$ and $YB^2$ is a nitrogen atom and it is more preferable that both of them are nitrogen atoms. XB represents an oxygen atom, a sulfur atom or a methylene group or an imino group, and an oxygen atom is preferable therefor. * stands for the position at which the group is attached to the $R^1$ to $R^3$ side in the formula (DI). The $R^1$, $R^2$ and $R^3$ independently represent each a group represented by the following formula (DI-R).

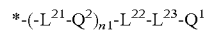

*-(-L$^{21}$-Q$^2$)$_{n1}$-L$^{22}$-L$^{23}$-Q$^1$   Formula (DI-R)

In the formula (DI-R), * stands for the position at which the group is attached to the $H^1$ to $H^3$ side in the formula (DI).

$L^{21}$ represents a single bond or a divalent linking group. In the case where $L^{21}$ is a divalent linking group, it is preferably a divalent linking group selected from the group consisting of —O—, —S—, —C(=O)—, —NR$^7$—, —CH=CH—, —C≡C— and a combination thereof. $R^7$ is an alkyl group having from 1 to 7 carbon atoms or a hydrogen atom, preferably an alkyl group having from 1 to 4 carbon atoms, more preferably a methyl group, an ethyl group or a hydrogen atom and most preferably a hydrogen atom.

It is preferable that $L^{21}$ is a single bond or any one selected from among *—O—CO—, *—CO—O—, *—CH=CH— and *—C≡C— (wherein *** stands for the *side in the formula (DI-R), more preferably a single bond.

$Q^2$ represents a divalent group having at least one type of a cyclic structure (a cyclic group). As the cyclic group, a cyclic group having a 5-membered ring, a 6-membered ring or a 7-membered ring is preferable, a cyclic group having a 5-membered ring or a 6-membered ring is more preferable and a cyclic group having a 6-membered ring is most preferable. The cyclic structure contained in the cyclic group may be a fused ring. However, a single ring is preferred to a fused ring. The ring contained in the cyclic group may be either an aromatic ring, an aliphatic ring or a heterocycle. Preferable examples of the aromatic ring include a benzene ring and a naphthalene ring. As the aliphatic ring, a cyclohexane ring can be cited as a preferable one. As the heterocycle, a pyridine ring and a pyrimidine ring can be cited as preferable ones.

As a cyclic group having a benzene ring represented by $Q^2$, a 1,4-phenylene group is preferable. As a cyclic group having a naphthalene ring, a naphthalene-1,5-diyl group and a naphthalene-2,6-diyl group are preferable. As a cyclic group having a cyclohexane ring, a 1,4-cyclohexylene group is preferable. As a cyclic group having a pyridine ring, a pyridine-2,5-diyl group is preferable. As a cyclic group having a pyrimidine ring, a pyrimidine-2,5-diyl group is preferable. Among these groups, a 1,4-phenylene group and a 1,4-cyclohexylene group are particularly preferable.

$Q^2$ may have a substituent. Examples of the substituent include a halogen atom (a fluorine atom, a chlorine atom, a bromine atom or an iodine atom), a cyano group, a nitro group, an alkyl group having from 1 to 16 carbon atoms, an alkenyl group having from 2 to 16 carbon atoms, an alkynyl group having from 2 to 16 carbon atoms, a haloalkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, a carbamoyl group substituted by an alkyl group having from 1 to 16 carbon atoms and acylamino group having from 2 to 16 carbon atoms. Among these substituents, a halogen atom, a cyano group, an alkyl group having from 1 to 6 carbon atoms and a haloalkyl group having from 1 to 6 carbon atoms are preferable, a halogen atom, an alkyl group having from 1 to 4 carbon atoms and a haloalkyl group having from 1 to 4 carbon atoms are more preferable, and a halogen atom, an alkyl group having from 1 to 3 carbon atoms and a trifluoromethyl group are more preferable.

n1 stands for an integer of from 0 to 4. As n1, an integer of from 1 to 3 is preferable and 1 or 2 is more preferable.

$L^{22}$ represents —O—, —O—CO—, —CO—O—, —O—CO—O—, —S—, —N(R)—, —CH$_2$—, —CH=CH— or —C≡C—, wherein  stands for a position at which the group is attached to the $Q^2$ side.

It is preferable that $L^{22}$ represents —O—, —O—CO—, —CO—O—, —O—CO—O—, —CH$_2$—, —CH=CH— or —C≡C—, more preferably —O—, —O—CO—, —O—CO—O— or **—CH$_2$—, $L^{23}$ represents a divalent linking group selected from the group consisting of —O—, —S—, —C(=O)—, —NH—, —CH$_2$—, —CH=CH—, —C≡C— and a combination thereof, wherein hydrogen atoms in —NH—, —CH$_2$— and —CH=CH— may be substituted. Examples of the substituent include a halogen atom, a cyano group, a nitro group, an alkyl group having from 1 to 6 carbon atoms, a haloalkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, a carbamoyl group substituted by an alkyl group having from 2 to 6 carbon atoms and acylamino group having from 2 to 6 carbon atoms. Among these substituents, a halogen atom and an alkyl group having from 1 to 6 carbon atoms are more preferable.

It is preferable that $L^{23}$ is selected from the group consisting of —O—, —C(=O)—, —CH$_2$—, —CH=CH—, —C≡C— and a combination thereof. It is preferable that $L^{23}$ has from 1 to 20 carbon atoms, more preferably from 2 to 14 carbon atoms. It is preferable that $L^{23}$ has from 1 to 16 —CH$_2$—'s, more preferably from 2 to 12 —CH$_2$—'s.

$Q^1$ represents a polymerizable group or a hydrogen atom. In the case of using the liquid crystal compound to be used in the invention in an optically compensatory sheet or the like wherein it is preferable that the phase contrast thereof would not be changed by heat (for example, an optically compensatory sheet), it is preferable that $Q^1$ is a polymerizable group. The polymerization is preferably addition polymerization (including ring-opening polymerization) or condensation polymerization. That is, the polymerizable group is preferably a functional group capable of undergoing addition polymerization or condensation polymerization. Examples of the polymerizable group are as follows.

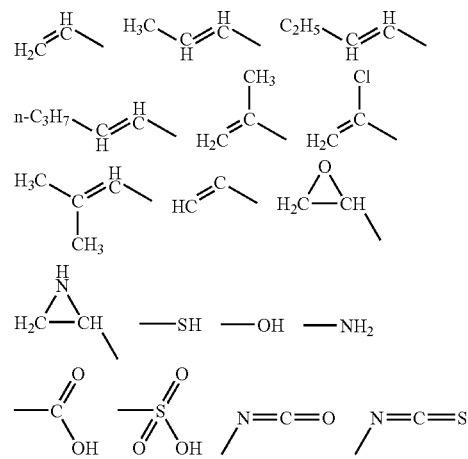

Furthermore, it is particularly preferable that the polymerizable group is a functional group capable of undergoing addition polymerization. As such a polymerizable group, a polymerizable ethylenically unsaturated group or a ring-opening polymerizable group is preferable.

As examples of the polymerizable ethylenically unsaturated group, there can be enumerated groups represented by the following formulae (M-1) to (M-6).

-continued

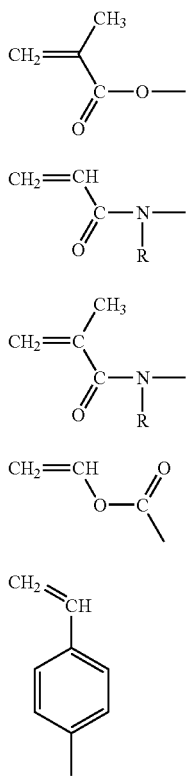

(M-2)

(M-3)

(M-4)

(M-5)

(M-6)

In the formulae (M-3) and (M-4), R represents a hydrogen atom or an alkyl group, preferably a hydrogen atom or a methyl group.

In the above formulae (M-1) to (M-6), (M-1) or (M-2) is preferable and (M-1) is more preferable.

As the ring-opening polymerizable group, a cyclic ether group is preferable, an epoxy group or an oxetanyl group is more preferable and an epoxy group is most preferable.

As the liquid crystal compound to be used in the invention, a liquid crystal compound represented by the following formula (DII) is preferred.

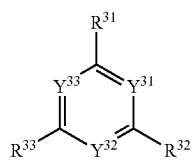

Formula (DII)

In the formula (DII), $Y^{31}$, $Y^{32}$ and $Y^{33}$ independently represent each a methine group or a nitrogen atom. $Y^{31}$, $Y^{32}$ and $Y^{33}$ have respectively the same definitions as $Y^{11}$, $Y^{12}$ and $Y^{13}$ in the formula (DI) and preferable ranges thereof are also the same.

In the formula (DII), $R^{31}$, $R^{32}$ and $R^{33}$ independently represent each a group represented by the following formula (DII-R).

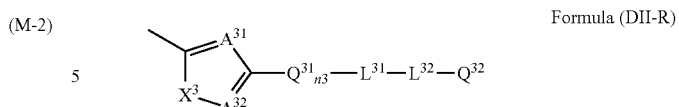

Formula (DII-R)

In the formula (DII-R), $A^{31}$ and $A^{32}$ independently represent each a methylene group or a nitrogen atom. It is preferable that at least one of them is a nitrogen atom and it is more preferable that both of them are nitrogen atoms. $X^3$ represents an oxygen atom, a sulfur atom, a methylene group or an imino group and an oxygen atom is preferred.

$Q^{31}$ represents a divalent group having a 6-membered cyclic structure (hereinafter sometimes called "a 6-membered cyclic group"). The 6-membered cyclic group may be a fused ring. However, a single ring is preferred to a fused ring. The ring contained in the 6-membered cyclic group may be either an aromatic ring, an aliphatic ring or a heterocycle. Preferable examples of the aromatic ring include a benzene ring and a naphthalene ring. As the aliphatic ring, a cyclohexane ring can be cited as a preferable one. As the heterocycle, a pyridine ring and a pyrimidine ring can be cited as preferable ones.

As a 6-membered cyclic group having a benzene ring represented by $Q^{31}$, a 1,4-phenylene group is preferable. As a cyclic group having a naphthalene ring, a naphthalene-1,5-diyl group and a naphthalene-2,6-diyl group are preferable. As a cyclic group having a cyclohexane ring, a 1,4-cyclohexylene group is preferable. As a cyclic group having a pyridine ring, a pyridine-2,5-diyl group is preferable. As a cyclic group having a pyrimidine ring, a pyrimidine-2,5-diyl group is preferable. Among these groups, a 1,4-phenylene group and a 1,4-cyclohexylene group are particularly preferable.

The cyclic structure of $Q^{31}$ may have a substituent. Examples of the substituent include a halogen atom (a fluorine atom, a chlorine atom, a bromine atom or an iodine atom), a cyano group, a nitro group, an alkyl group having from 1 to 16 carbon atoms, an alkenyl group having from 2 to 16 carbon atoms, an alkynyl group having from 2 to 16 carbon atoms, a haloalkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, a carbamoyl group substituted by an alkyl group having from 1 to 16 carbon atoms and acylamino group having from 2 to 16 carbon atoms. Preferable examples of the substituent of the 6-membered cyclic group include a halogen atom, a cyano group, an alkyl group having from 1 to 6 carbon atoms and a haloalkyl group having from 1 to 6 carbon atoms, and a halogen atom, an alkyl group having from 1 to 4 carbon atoms and a haloalkyl group having from 1 to 4 carbon atoms are more preferable, and a halogen atom, an alkyl group having from 1 to 3 carbon atoms and a trifluoromethyl group are more preferable.

n3 stands for an integer of from 1 to 3 and 1 or 2 is preferred.

$L^{31}$ represents *—O—, *—O—CO—, **—CO—O—, *—O—CO—O—, *—S—, *—N(R)—, *—CH$_2$—, *—CH=CH— or *—C≡C—, wherein * stands for a position at which the group is attached to the $Q^{31}$ side. Specific examples thereof are the same as those of $L^{22}$ in the formula (DI-R) and the preferable range is also the same.

$L^{32}$ represents a divalent linking group selected from the group consisting of —O—, —S—, —C(=O)—, —NH—, —CH$_2$—, —CH=CH—, —C≡C— and a combination thereof. Specific examples thereof are the same as those of $L^{23}$ in the formula (DI-R) and the preferable range is also the same.

In the formula (DII-R), $Q^{32}$ represents a polymerizable group or a hydrogen atom.

Next, specific examples of the liquid crystal compound represented by the formula (DI) will be presented, though the invention is not restricted thereto.

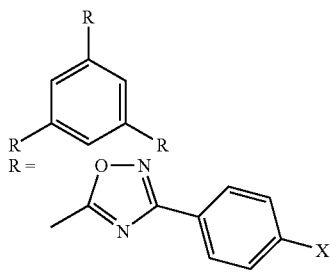

X = —OC$_4$H$_9$ D-1
—OC$_5$H$_{11}$ D-2
—OC$_6$H$_{13}$ D-3
—OC$_7$H$_{15}$ D-4
—OC$_8$H$_{17}$ D-5
—OCH$_2$CH(CH$_3$)C$_4$H$_9$ D-6
—O(CH$_2$)$_2$OCOCH=CH$_2$ D-7
—O(CH$_2$)$_3$OCOCH=CH$_2$ D-8
—O(CH$_2$)$_4$OCOCH=CH$_2$ D-9
—O(CH$_2$)$_5$OCOCH=CH$_2$ D-10
—O(CH$_2$)$_6$OCOCH=CH$_2$ D-11
—O(CH$_2$)$_7$OCOCH=CH$_2$ D-12
—O(CH$_2$)$_8$OCOCH=CH$_2$ D-13
—O(CH$_2$)$_2$C(CH$_3$)OCOCH=CH$_2$ D-14
—O(CH$_2$)$_3$C(CH$_3$)OCOCH=CH$_2$ D-15
—O(CH$_2$CH$_2$O)$_2$COCH=CH$_2$ D-16
—O(CH$_2$)$_4$OCOC(CH$_3$)=CH$_2$ D-17
—O(CH$_2$)$_4$OCOCH=CHCH$_3$ D-18
OCH=CH$_2$ D-19
—O(CH$_2$)$_4$—CH—CH$_2$ D-20
            \\ /
             O

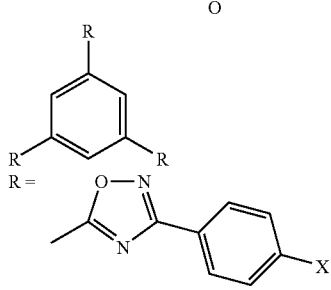

X = —OCOC$_4$H$_9$ D-21
—OCOC$_5$H$_{11}$ D-22
—OCOC$_6$H$_{13}$ D-23
—OCO(CH$_2$)$_2$OCOCH=CH$_2$ D-24
—OCO(CH$_2$)$_3$OCOCH=CH$_2$ D-25
—OCO(CH$_2$)$_4$OCOCH=CH$_2$ D-26
—OCO(CH$_2$)$_5$OCOCH=CH$_2$ D-27
—OCO(CH$_2$)$_6$OCOCH=CH$_2$ D-28
—OCO(CH$_2$)$_7$OCOCH=CH$_2$ D-29
—OCO(CH$_2$)$_2$C(CH$_3$)OCOCH=CH$_2$ D-30
—OCO(CH$_2$)$_2$OCOC(CH$_3$)=CH$_2$ D-31
—OCO(CH$_2$)$_2$OCOCH=CHCH$_3$ D-32
—OCO(CH$_2$)$_4$OCH=CH$_2$ D-33
—OCO(CH$_2$)$_4$—CH—CH$_2$ D-34
               \\ /
                O

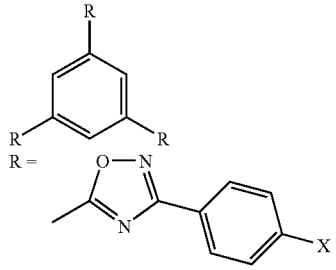

X = —OCOOC$_4$H$_9$ D-35
—OCOOC$_5$H$_{11}$ D-36
—OCOOC$_6$H$_{13}$ D-37
—OCOO(CH$_2$)$_2$OCOCH=CH$_2$ D-38
—OCOO(CH$_2$)$_3$OCOCH=CH$_2$ D-39
—OCOO(CH$_2$)$_4$OCOCH=CH$_2$ D-40
—OCOO(CH$_2$)$_5$OCOCH=CH$_2$ D-41
—OCOO(CH$_2$)$_6$OCOCH=CH$_2$ D-42
—OCO(CH$_2$)$_7$OCOCH=CH$_2$ D-43
—OCOOC(CH$_3$)CH$_2$CH$_2$OCOCH=CH$_2$ D-44
—OCOOC(CH$_2$CH$_2$O)$_2$COCH=CH$_2$ D-45
—OCOO(CH$_2$)$_2$OCOC(CH$_3$)=CH$_2$ D-46
—OCOO(CH$_2$)$_2$OCOCH=CHCH$_3$ D-47
—OCOO(CH$_2$)$_4$OCH=CH$_2$ D-48
—OCOO(CH$_2$)$_4$—CH—CH$_2$ D-49
                 \\ /
                  O

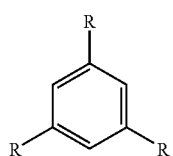

-continued

R =

[structure: 5-methyl-1,2,4-oxadiazole connected to 2-fluoro-4-X-phenyl]

X =
- —OC$_4$H$_9$  D-50
- —OC$_5$H$_{11}$  D-51
- —OC$_6$H$_{13}$  D-52
- —OC$_7$H$_{15}$  D-53
- —OC$_8$H$_{17}$  D-54
- —OCH$_2$CH(CH$_3$)C$_4$H$_9$  D-55
- —O(CH$_2$)$_2$OCOCH=CH$_2$  D-56
- —O(CH$_2$)$_3$OCOCH=CH$_2$  D-57
- —O(CH$_2$)$_4$OCOCH=CH$_2$  D-58
- —O(CH$_2$)$_5$OCOCH=CH$_2$  D-59
- —O(CH$_2$)$_6$OCOCH=CH$_2$  D-60
- —O(CH$_2$)$_7$OCOCH=CH$_2$  D-61
- —O(CH$_2$)$_8$OCOCH=CH$_2$  D-62
- —O(CH$_2$)$_2$C(CH$_3$)OCOCH=CH$_2$  D-63
- —O(CH$_2$)$_3$C(CH$_3$)OCOCH=CH$_2$  D-64
- —O(CH$_2$CH$_2$O)$_2$COCH=CH$_2$  D-65
- —O(CH$_2$)$_4$OCOC(CH$_3$)=CH$_2$  D-66
- —O(CH$_2$)$_4$OCOCH=CHCH$_3$  D-67
- —O(CH$_2$)$_4$OCH=CH$_2$  D-68
- —O(CH$_2$)$_4$—CH(—O—)CH$_2$  D-69

[structure: 1,3,5-trisubstituted benzene with three R groups]

R = [5-methyl-1,2,4-oxadiazol-3-yl connected to 2-fluoro-4-X-phenyl]

X =
- —OCOC$_4$H$_9$  D-70
- —OCOC$_5$H$_{11}$  D-71
- —OCOC$_6$H$_{13}$  D-72
- —OCO(CH$_2$)$_2$OCOCH=CH$_2$  D-73
- —OCO(CH$_2$)$_3$OCOCH=CH$_2$  D-74
- —OCO(CH$_2$)$_4$OCOCH=CH$_2$  D-75
- —OCO(CH$_2$)$_5$OCOCH=CH$_2$  D-76
- —OCO(CH$_2$)$_6$OCOCH=CH$_2$  D-77
- —OCO(CH$_2$)$_7$OCOCH=CH$_2$  D-78

-continued

- —OCO(CH$_2$)$_2$C(CH$_3$)OCOCH=CH$_2$  D-79
- —OCO(CH$_2$)$_2$OCOC(CH$_3$)=CH$_2$  D-80
- —OCO(CH$_2$)$_2$OCOCH=CHCH$_3$  D-81
- —OCO(CH$_2$)$_4$OCH=CH$_2$  D-82
- —OCO(CH$_2$)$_4$—CH(—O—)CH$_2$  D-83

[structure: 1,3,5-trisubstituted benzene with three R groups]

R = [5-methyl-1,2,4-oxadiazol-3-yl connected to 2-fluoro-4-X-phenyl]

X =
- —OCOOC$_4$H$_9$  D-84
- —OCOOC$_5$H$_{11}$  D-85
- —OCOOC$_6$H$_{13}$  D-86
- —OCOO(CH$_2$)$_2$OCOCH=CH$_2$  D-87
- —OCOO(CH$_2$)$_3$OCOCH=CH$_2$  D-88
- —OCOO(CH$_2$)$_4$OCOCH=CH$_2$  D-89
- —OCOO(CH$_2$)$_5$OCOCH=CH$_2$  D-90
- —OCOO(CH$_2$)$_6$OCOCH=CH$_2$  D-91
- —OCO(CH$_2$)$_7$OCOCH=CH$_2$  D-92
- —OCOOC(CH$_3$)CH$_2$CH$_2$OCOCH=CH$_2$  D-93
- —OCOOC(CH$_2$CH$_2$O)$_2$COCH=CH$_2$  D-94
- —OCOO(CH$_2$)$_2$OCOC(CH$_3$)=CH$_2$  D-95
- —OCOO(CH$_2$)$_2$OCOCH=CHCH$_3$  D-96
- —OCOO(CH$_2$)$_4$OCH=CH$_2$  D-97
- —OCOO(CH$_2$)$_4$—CH(—O—)CH$_2$  D-98

[structure: 1,3,5-trisubstituted benzene with three R groups]

R = [5-methyl-1,2,4-oxadiazol-3-yl connected to 3-fluoro-4-X-phenyl]

X =
- —OC$_4$H$_9$  D-99
- —OC$_5$H$_{11}$  D-100
- —OC$_6$H$_{13}$  D-101
- —OC$_7$H$_{15}$  D-102

-continued

—OC₈H₁₇ D-103

—OCH₂CH(CH₃)C₄H₉ D-104

—O(CH₂)₂OCOCH=CH₂ D-105

—O(CH₂)₃OCOCH=CH₂ D-106

—O(CH₂)₄OCOCH=CH₂ D-107

—O(CH₂)₅OCOCH=CH₂ D-108

—O(CH₂)₆OCOCH=CH₂ D-109

—O(CH₂)₇OCOCH=CH₂ D-110

—O(CH₂)₈OCOCH=CH₂ D-111

—O(CH₂)₂C(CH₃)OCOCH=CH₂ D-112

—O(CH₂)₃C(CH₃)OCOCH=CH₂ D-113

—O(CH₂CH₂O)₂COCH=CH₂ D-114

—O(CH₂)₄OCOC(CH₃)=CH₂ D-115

—O(CH₂)₄OCOCH=CHCH₃ D-116

—O(CH₂)₄OCH=CH₂ D-117

—O(CH₂)₄—CH—CH₂ D-118
              \\O/

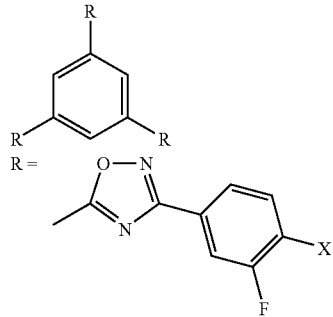

X = —OCOC₄H₉ D-119

—OCOC₅H₁₁ D-120

—OCOC₆H₁₃ D-121

—OCO(CH₂)₂OCOCH=CH₂ D-122

—OCO(CH₂)₃OCOCH=CH₂ D-123

—OCO(CH₂)₄OCOCH=CH₂ D-124

—OCO(CH₂)₅OCOCH=CH₂ D-125

—OCO(CH₂)₆OCOCH=CH₂ D-126

—OCO(CH₂)₇OCOCH=CH₂ D-127

—OCO(CH₂)₂C(CH₃)OCOCH=CH₂ D-128

—OCO(CH₂)₂OCOC(CH₃)=CH₂ D-129

—OCO(CH₂)₂OCOCH=CHCH₃ D-130

—OCO(CH₂)₄OCH=CH₂ D-131

—OCO(CH₂)₄—CH—CH₂ D-132
                \\O/

-continued

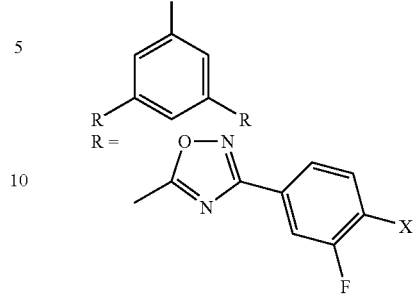

X = —OCOOC₄H₉ D-133

—OCOOC₅H₁₁ D-134

—OCOOC₆H₁₃ D-135

—OCOO(CH₂)₂OCOCH=CH₂ D-136

—OCOO(CH₂)₃OCOCH=CH₂ D-137

—OCOO(CH₂)₄OCOCH=CH₂ D-138

—OCOO(CH₂)₅OCOCH=CH₂ D-139

—OCOO(CH₂)₆OCOCH=CH₂ D-140

—OCO(CH₂)₇OCOCH=CH₂ D-141

—OCOOC(CH₃)CH₂CH₂OCOCH=CH₂ D-142

—OCOOC(CH₂CH₂O)₂COCH=CH₂ D-143

—OCOO(CH₂)₂OCOC=CH₂ D-144
                  |
                  CH₃

—OCOO(CH₂)₂OCOCH=CHCH₃ D-145

—OCOO(CH₂)₄OCH=CH₂ D-146

—OCOO(CH₂)₄—CH—CH₂ D-147
                 \\O/

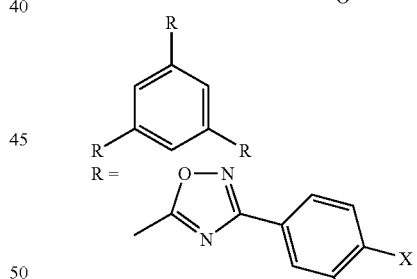

X = —OC₆H₁₃ D-148

—OCOC₅H₁₁ D-149

—OCOOC₄H₉ D-150

—O(CH₂)₄OCOCH=CH₂ D-151

—O(CH₂)₆OCOCH=CH₂ D-152

—OCO(CH₂)₃OCOCH=CH₂ D-153

—OCO(CH₂)₄OCOCH=CH₂ D-154

—OCOO(CH₂)₂OCOCH=CH₂ D-155

—OCOO(CH₂)₄OCOCH=CH₂ D-156

-continued

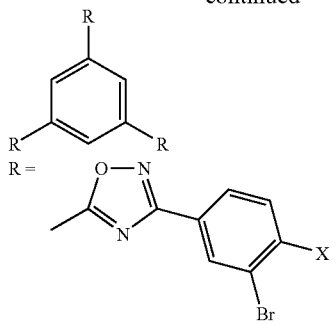

X =
- —OC₆H₁₃ D-157
- —OCOC₅H₁₁ D-158
- —OCOOC₄H₉ D-159
- —O(CH₂)₄OCOCH=CH₂ D-160
- —O(CH₂)₆OCOCH=CH₂ D-161
- —OCO(CH₂)₃OCOCH=CH₂ D-162
- —OCO(CH₂)₄OCOCH=CH₂ D-163
- —OCOO(CH₂)₂OCOCH=CH₂ D-164
- —OCOO(CH₂)₄OCOCH=CH₂ D-165

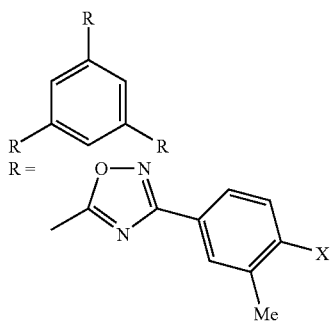

X =
- —OC₆H₁₃ D-166
- —OCOC₅H₁₁ D-167
- —OCOOC₄H₉ D-168
- —O(CH₂)₄OCOCH=CH₂ D-169
- —O(CH₂)₆OCOCH=CH₂ D-170
- —OCO(CH₂)₃OCOCH=CH₂ D-171
- —OCO(CH₂)₄OCOCH=CH₂ D-172
- —OCOO(CH₂)₂OCOCH=CH₂ D-173
- —OCOO(CH₂)₄OCOCH=CH₂ D-174

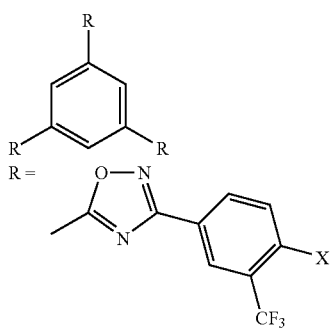

X =
- —OC₆H₁₃ D-175
- —OCOC₅H₁₁ D-176
- —OCOOC₄H₉ D-178
- —O(CH₂)₄OCOCH=CH₂ D-179
- —O(CH₂)₆OCOCH=CH₂ D-180
- —OCO(CH₂)₃OCOCH=CH₂ D-181
- —OCO(CH₂)₄OCOCH=CH₂ D-182
- —OCOO(CH₂)₂OCOCH=CH₂ D-183
- —OCOO(CH₂)₄OCOCH=CH₂ D-184

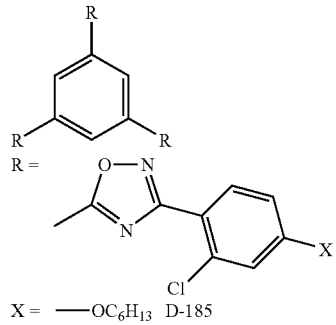

X =
- —OC₆H₁₃ D-185
- —OCOC₅H₁₁ D-186
- —OCOOC₄H₉ D-187
- —O(CH₂)₄OCOCH=CH₂ D-188
- —O(CH₂)₆OCOCH=CH₂ D-189
- —OCO(CH₂)₃OCOCH=CH₂ D-190
- —OCO(CH₂)₄OCOCH=CH₂ D-191
- —OCOO(CH₂)₂OCOCH=CH₂ D-192
- —OCOO(CH₂)₄OCOCH=CH₂ D-193

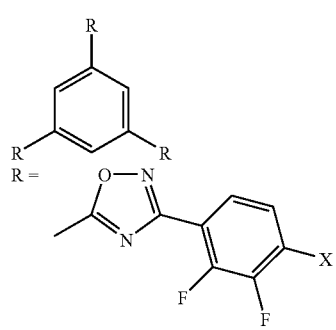

X =
- —OC₆H₁₃ D-194
- —OCOC₅H₁₁ D-195
- —OCOOC₄H₉ D-196
- —O(CH₂)₄OCOCH=CH₂ D-197
- —O(CH₂)₆OCOCH=CH₂ D-198
- —OCO(CH₂)₃OCOCH=CH₂ D-199
- —OCO(CH₂)₄OCOCH=CH₂ D-200
- —OCOO(CH₂)₂OCOCH=CH₂ D-201
- —OCOO(CH₂)₄OCOCH=CH₂ D-202

-continued

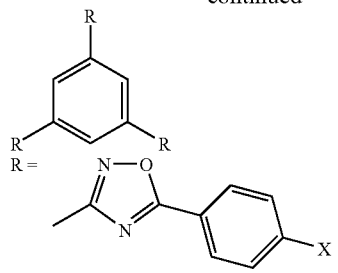

R =

X = —OC$_6$H$_{13}$ D-203
—OCOC$_5$H$_{11}$ D-204
—OCOOC$_4$H$_9$ D-205
—O(CH$_2$)$_4$OCOCH=CH$_2$ D-206
—O(CH$_2$)$_6$OCOCH=CH$_2$ D-207
—OCO(CH$_2$)$_3$OCOCH=CH$_2$ D-208
—OCO(CH$_2$)$_4$OCOCH=CH$_2$ D-209
—OCOO(CH$_2$)$_2$OCOCH=CH$_2$ D-210
—OCOO(CH$_2$)$_4$OCOCH=CH$_2$ D-211

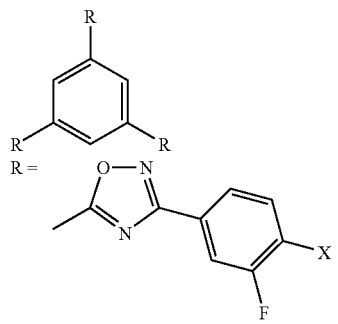

R =

X = —OC$_6$H$_{13}$ D-212
—OCOC$_5$H$_{11}$ D-213
—OCOOC$_4$H$_9$ D-214
—O(CH$_2$)$_4$OCOCH=CH$_2$ D-215
—O(CH$_2$)$_6$OCOCH=CH$_2$ D-216
—OCO(CH$_2$)$_3$OCOCH=CH$_2$ D-217
—OCO(CH$_2$)$_4$OCOCH=CH$_2$ D-218
—OCOO(CH$_2$)$_2$OCOCH=CH$_2$ D-219
—OCOO(CH$_2$)$_4$OCOCH=CH$_2$ D-220

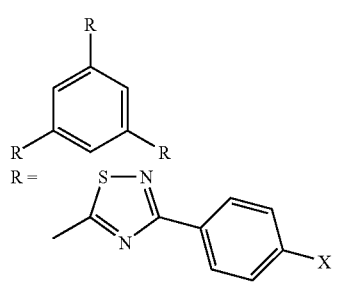

R =

X = —OC$_6$H$_{13}$ D-221
—OCOC$_5$H$_{11}$ D-222
—OCOOC$_4$H$_9$ D-223

—O(CH$_2$)$_6$OCOCH=CH$_2$ D-224
—OCOO(CH$_2$)$_3$OCOCH=CH$_2$ D-225
—OCOO(CH$_2$)$_4$OCOCH=CH$_2$ D-226

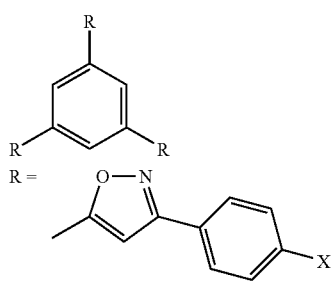

R =

X = —OC$_6$H$_{13}$ D-227
—OCOC$_5$H$_{11}$ D-228
—OCOOC$_4$H$_9$ D-229
—O(CH$_2$)$_6$OCOCH=CH$_2$ D-230
—OCOO(CH$_2$)$_3$OCOCH=CH$_2$ D-231
—OCOO(CH$_2$)$_4$OCOCH=CH$_2$ D-232

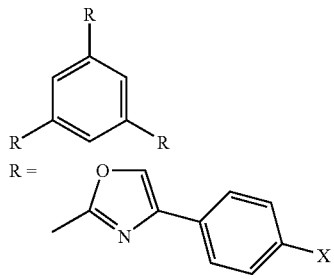

R =

X = —OC$_6$H$_{13}$ D-233
—OCOC$_5$H$_{11}$ D-234
—OCOOC$_4$H$_9$ D-235
—O(CH$_2$)$_6$OCOCH=CH$_2$ D-236
—OCOO(CH$_2$)$_3$OCOCH=CH$_2$ D-237
—OCOO(CH$_2$)$_4$OCOCH=CH$_2$ D-238

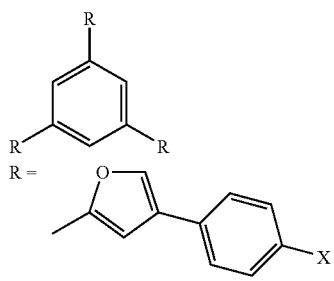

X = —O(CH$_2$)$_6$OCOCH=CH$_2$ D-239

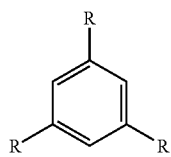

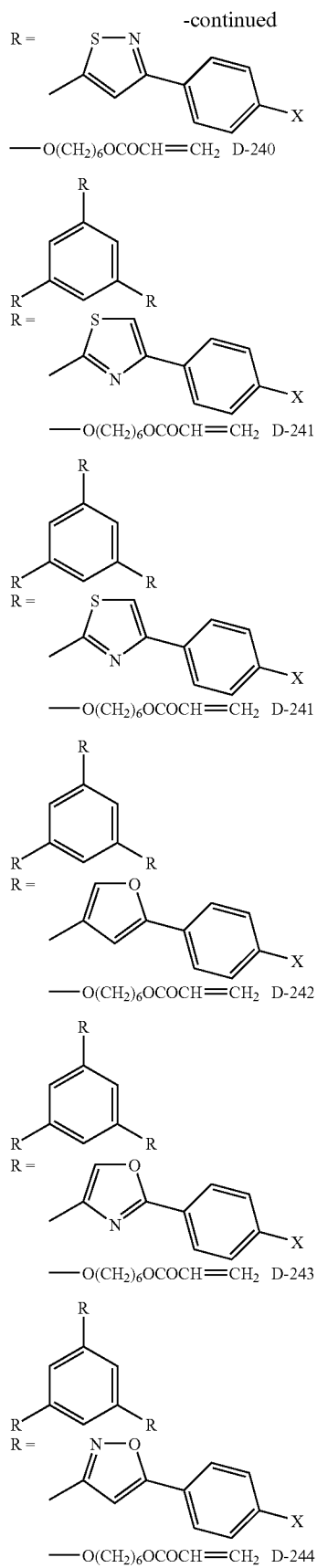
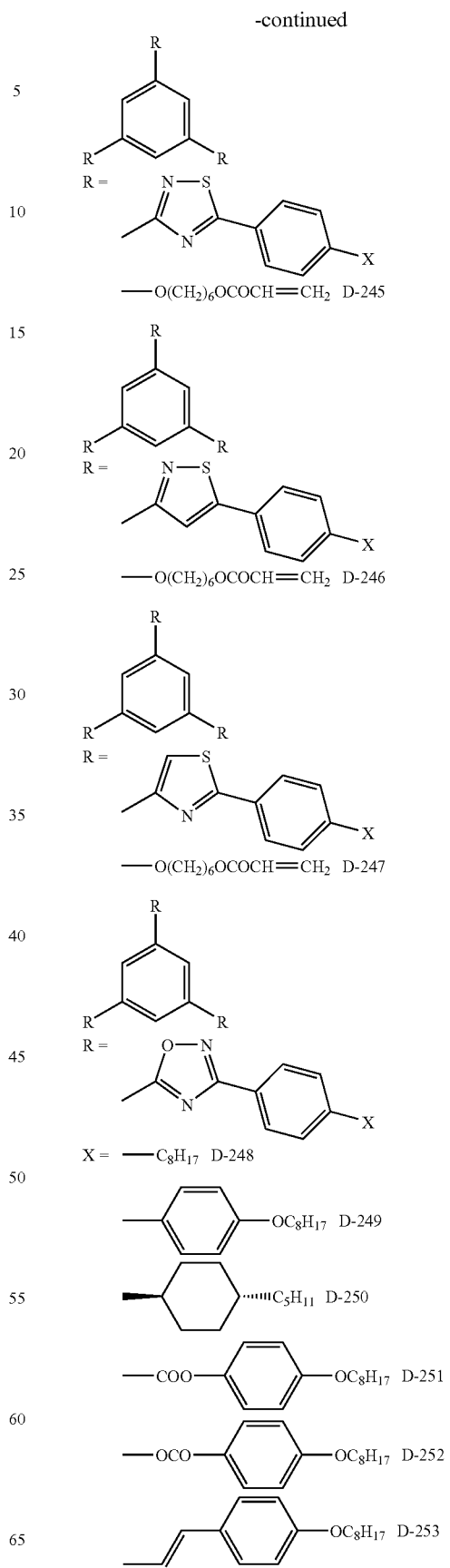

-continued
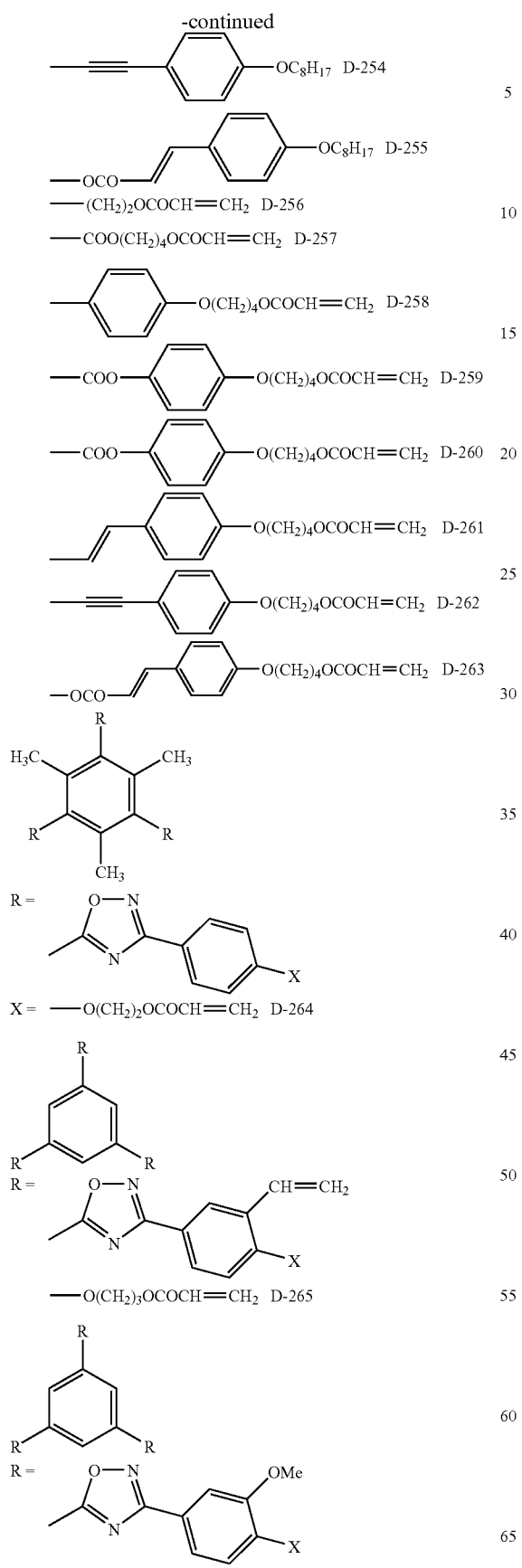
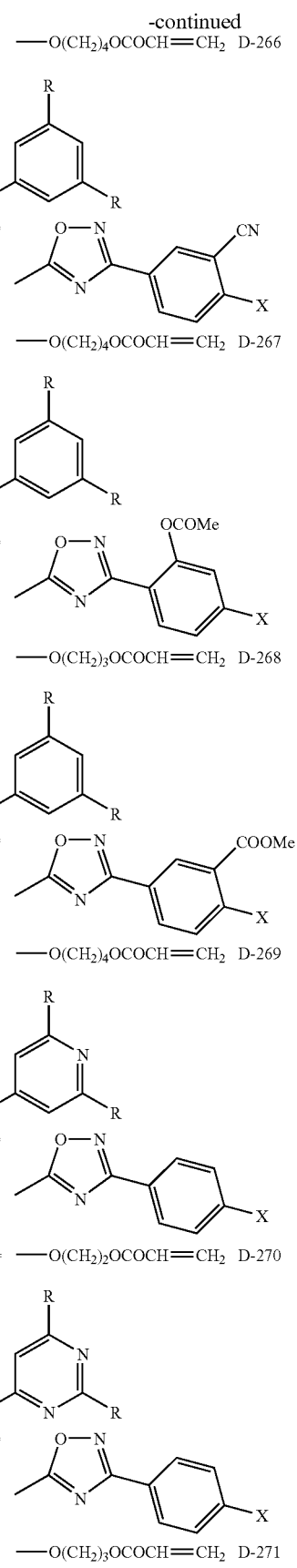

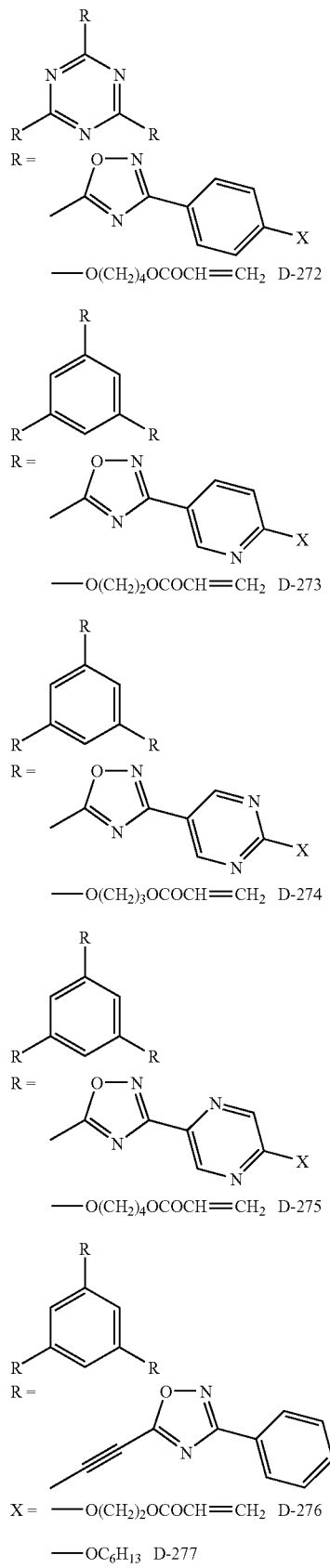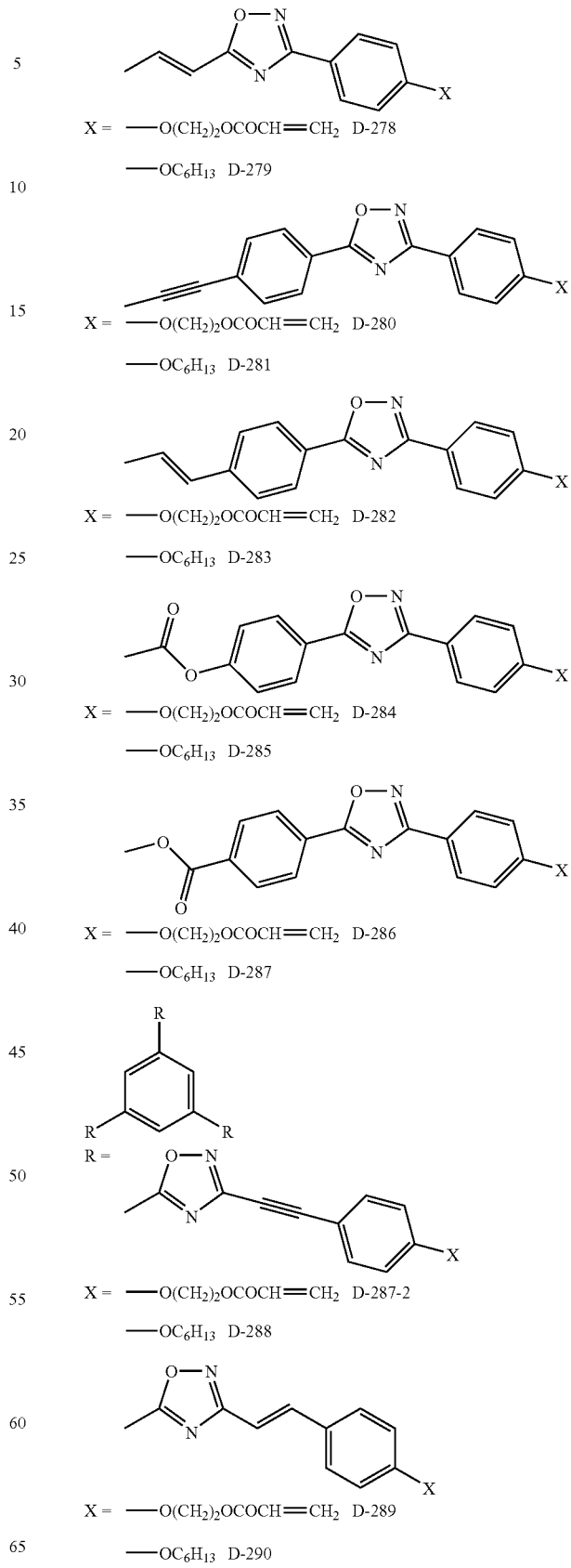

-continued

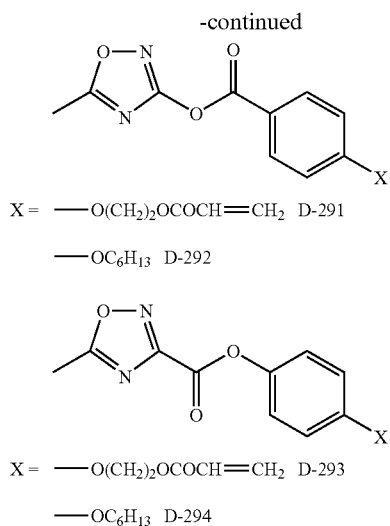

X = —O(CH₂)₂OCOCH=CH₂ D-291

—OC₆H₁₃ D-292

X = —O(CH₂)₂OCOCH=CH₂ D-293

—OC₆H₁₃ D-294

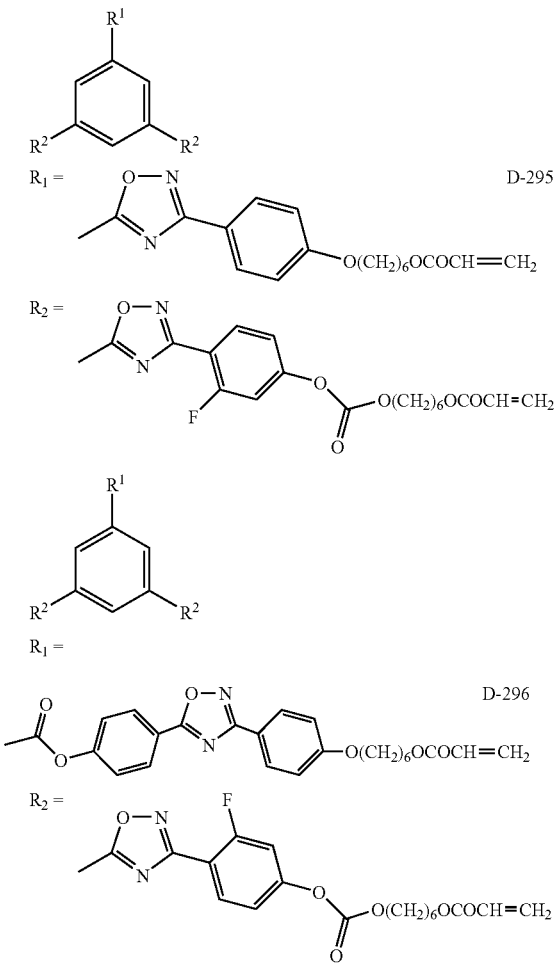

D-295

D-296

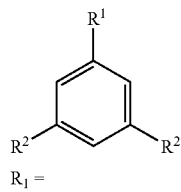

-continued

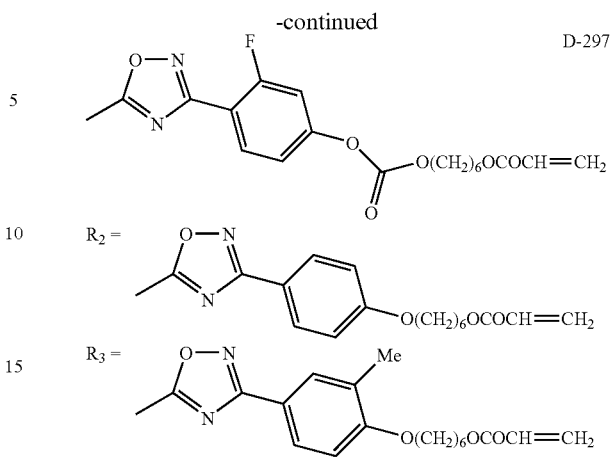

D-297

It is preferable that the liquid crystal compound to be used in the invention expresses a liquid crystal phase showing favorable monodomain characteristics. By achieving such favorable monodomain characteristics, it becomes possible to effectively prevent a problem that a polydomain structure is formed and an orientation failure arises at the boundary between domains, thereby causing light scattering. Moreover, a compound showing favorable monodomain properties is preferred, since a phase contrast plate having the same exhibits an elevated light transmittance.

As the liquid crystal phase expressed by the liquid crystal compound to be used in the invention, there can be enumerated a columnar phase and a discotic nematic (ND) phase. Between these liquid crystal phases, the discotic nematic (ND) phase is most preferable, since it shows favorable monodomain characteristics and is capable of undergoing hybrid orientation.

In the liquid crystal compound to be used in the invention, a smaller wavelength dispersion is preferred. As discussed above, the optically anisotropic layer preferably has Re(450)/Re(650) of 1.25 or less, more preferably 1.20 or less and most preferably 1.18 or less. It is also preferable that this value is appropriately optimized due to the wavelength dispersion of the phase contrast of the liquid crystal in the cell.

Concerning the orientation of the liquid crystal compound in the optically anisotropic layer, the liquid crystal compound is oriented in such a manner that the molecular symmetry axis thereof in the optically anisotropic layer is located at an angle of 43° to 47° to, for example, the longitudinal direction.

In hybrid orientation, the angle between the molecular symmetry axis of the liquid crystal compound and the support face is increased or decreased with an increase in the distance from the support face in the depth direction of the optically anisotropic layer. It is preferred that this angle is decreased with an increase in the distance. As the change in the angle, there can be enumerated a continuous increase, a continuous decrease, an intermittent increase, an intermittent decrease, a change including a continuous increase and a continuous decrease, and an intermittent change including an increase and a decrease. An intermittent change includes an area wherein the tilt angle shows no change in the course of the depth direction.

There may be an area wherein the angle shows no change, so long as the angle is increased or decreased as a whole. It is preferred that the angle shows a continuous change.

The average direction of the molecular symmetry axis of the liquid crystal compound can be adjusted generally by selecting an appropriate material of the liquid crystal compound or the orientation film or selecting an appropriate rubbing method.

In the case of producing, for example, an optically compensatory film for the OCB mode in the invention, an orientation film for forming optically anisotropic layer is produced by rubbing. Subsequently, rubbing is made in the direction at 45° to the slow axis of the optical film or composite birefringent member. Thus, an optically anisotropic layer, wherein the average direction of orientation of the molecular symmetry axis of the liquid crystal compound at least in the interface with the optical film or composite birefringent member is at an angle of 45° to the slow axis of the optical film or composite birefringent member, can be formed.

For example, the optically compensatory film of the invention can be continuously produced by using the optical film or composite birefringent member of the invention in long sheet type wherein the slow axis is orthogonal to the longitudinal direction. More specifically speaking, a coating solution for forming orientation film is continuously applied to the surface of the composite birefringent member in long sheet type to form a film. Next, the surface of the film is rubbed at an angle of 45° in the longitudinal direction to form an orientation film. Then a coating solution for forming optically anisotropic layer, which contains a liquid crystal compound, is continuously applied to the orientation film thus formed and the liquid crystal molecules are oriented and fixed to this state, thereby forming an optically anisotropic layer. Thus, an optically compensatory film in long sheet type can be continuously formed. The obtained optically compensatory film in long sheet type is cut into a desired shape before introducing into a liquid crystal display.

Concerning the average direction of orientation at the liquid crystal compound surface side (atmosphere side) of the molecular symmetry axis of the liquid crystal compound, the average direction of orientation at the atmosphere interface side of the molecular symmetry axis of the liquid crystal compound is preferably located at an angle of about 45° to the slow axis of the composite birefringent member, more preferably from 42 to 48° and more preferably from 43 to 47°. The average direction of orientation at the atmosphere interface side of the molecular symmetry axis of the liquid crystal compound can be controlled by selecting an appropriate liquid crystal compound or the type of an additive to be used together with the liquid crystal compound. Examples of the additive to be used together with the liquid crystal compound include a plasticizer, a surfactant, a polymerizable monomer, a polymer and so on. Similarly, the extent of change in the orientation direction of the molecular symmetry axis can be controlled by appropriately selecting a liquid crystal compound and an additive as discussed above. With respect to a surfactant, it is particularly preferable that a surfactant also contributes to the control of the surface tension of the coating solution as described above.

It is preferable that a plasticizer, a surfactant and a polymerizable monomer to be used together with the liquid crystal compound are compatible with the liquid crystal compound and can impart a change in the tilt angle of the liquid crystal or not inhibit the orientation thereof. Use is preferably made of a polymerizable monomer (for example, compounds having a vinyl group, a vinyloxy group, an acryloyl group and a methacryloyl group). Such a compound is added in an amount of generally from 1 to 50% by mass, preferably from 5 to 30% by mass, based on the liquid crystal compound. By using a mixture of monomers having 4 or more polymerizable and reactive functional groups, the adhesiveness between the orientation film and the optically anisotropic layer can be elevated.

As the surfactant, it is preferable to use a fluorinated compound. Surfactants are described in JP-A-2001-33072. It is preferable that the polymer and the low molecular compound can impart a change in the tilt angle of the discotic compound. As the polymer, a cellulose ester is preferred. Cellulose esters are described in JP-A-2000-155216, paragraph 0178. Not to interfere the orientation of the discotic compound, it is preferable to add the polymer in an amount of from 0.1 to 10% by mass, more preferably from 0.1 to 8 by mass, based on the discotic compound.

The optically anisotropic layer can be formed by applying a coating solution containing the discotic compound optionally together with a polymerization initiator and an arbitrary component, if required, as will be described hereinafter on the orientation film.

As the solvent to be used in preparing the coating solution, an organic solvent is preferred. Examples of the organic solvent include an amide (for example, N,N-dimethylformamide), a sulfoxide (for example, dimethyl sulfoxide), a heterocyclic compound (for example, pyridine), a hydrocarbon (for example, benzene or hexane), an alkyl halide (for example, chloroform, dichloromethane or tetrachloroethane), an ester (for example, methyl acetate or butyl acetate), a ketone (for example, acetone or methyl ethyl ketone) and an ether (for example, tetrahydrofuran or 1,2-dimethoxyethane). An alkyl halide and a ketone are preferred. Use may be made of a mixture of two or more organic solvents.

The coating solution can be applied by a publicly known method (for example, the wire bar coating method, the extrusion coating method, the direct gravure coating method, the reverse gravure coating method or a die coating method).

The discotic compound having been oriented can be fixed while holding it in the orientation state. It is preferable to conduct the fixation by polymerization. The polymerization includes heat polymerization with the use of a heat polymerization initiator and photopolymerization with the use of a photopolymerization initiator. Photopolymerization is preferred. Examples of the photopolymerization initiator include an α-carbonyl compound (described in U.S. Pat. No. 2,367,661 and U.S. Pat. No. 2,366,670), an acyloin ether (described in U.S. Pat. No. 2,448,828), an α-hydrocarbon-substituted aromatic acyloin compound (described in U.S. Pat. No. 2,722,512), a polynuclear acyloin compound (described in U.S. Pat. No. 3,046,127 and U.S. Pat. No. 2,951,758), a combination of a triarylimidazole dinner with p-aminophenyl ketone (described in U.S. Pat. No. 3,549,367), acridine and phenadine compounds (described in JP-A-60-105667 and U.S. Pat. No. 4,239,850) and an oxadiazole compound (described in U.S. Pat. No. 4,212,970).

It is preferable to use the photopolymerization initiator in an amount of form 0.01 to 20% by mass, more preferably from 0.5 to 5% by mass based on the solid matters in the coating solution. In photo irradiation for polymerizing liquid crystal molecules, use is preferably made of ultraviolet light. The irradiation energy preferably ranges from 20 mJ/cm$^2$ to 50 J/cm$^2$, more preferably from 20 to 5000 mJ/cm$^2$ and most preferably from 100 to 800 mJ/cm$^2$. To accelerate the photopolymerization, light irradiation may be conducted under heating. It is also possible to form a protective layer on the first optically anisotropic layer.

In the invention, molecules of the rod-shaped compound or the discotic compound are fixed in the orientation state in the optically anisotropic layer. In the case of applying to an OCB mode liquid crystal display, the average direction of the orientation of the molecular symmetry axis of the liquid crystal compound at the interface in the optical film side is at an angle of about 45° to the in-plane slow axis of the optical film. The expression "about 45°" as used herein means an angle falling within the range of 45°±5°, preferably from 42 to 48° and more preferably from 43 to 47°.

In the case of using a discotic liquid crystal compound as the liquid crystal compound, it is preferable to use a polymer which is somewhat compatible with the discotic liquid crystal compound and can impart a change in the tilt angle of the discotic liquid crystal compound.

As the polymer, cellulose esters can be enumerated. Preferable examples of the cellulose esters include cellulose acetate, cellulose acetate propionate, hydroxypropylcellulose and cellulose acetate butyrate. In order not to inhibit the orientation of the discotic liquid crystal compound, it is preferable to add the above polymer in an amount of from 0.1 to 10% by mass, more preferably from 0.1 to 8% by mass and more preferably from 0.1 to 5% by mass, based on the discotic liquid crystal compound.

The discotic nematic liquid crystal phase-solid phase transition temperature of the discotic liquid crystalline compound which is used in the invention is preferably from 70 to 300° C., and especially preferably from 70 to 170° C.

It is preferable to conduct the orientation and fixation at a temperature not higher than the discotic nematic liquid crystal phase-solid phase transition temperature.

In the invention, the optically anisotropic layer has at least in-plane optical anisotropy. The in-plane retardation of the optically anisotropic layer is preferably from 3 to 300 nm, more preferably from 5 to 200 nm and more preferably from 10 to 100 nm. The thickness-direction retardation of the optically anisotropic layer is preferably from 20 to 400 nm, more preferably from 50 to 200 nm. The thickness of the optically anisotropic layer is preferably from 0.1 to 20 µm, more preferably 0.5 to 15 µm and most preferably from 1 to 10 µm.

Next, a transparent film comprising a composite birefringent member of the invention will be illustrated.

A transparent film of the invention may be a composite birefringent member comprising a first birefringent layer and a second birefringent layer wherein the second birefringent layer is formed on at least one face of the first birefringent layer. It is preferable that the second birefringent layer is made of a non-liquid crystal polymer or a liquid crystal compound. As the non-liquid crystal polymer, materials mentioned in JP-A-2005-77853 are preferable and there can be enumerated at least one member selected from the group consisting of polyamides, polyimides, polyesters, polyether ketones, polyaryl ether ketones, polyamide-imides and polyester imides. As the liquid crystal compound, there can be enumerated the liquid crystal compounds usable in the optically anisotropic layer as described above. For example, use can be preferably made of rod-shaped liquid crystal compound such as azomethines, azoxys, cyanobiphenyls, cyanophenyl esters, benzoic acid esters, cyclohexanecarboxlic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles.

It is preferred that the second birefringent layer is made of a material which differs from the material of the first birefringent layer.

In the composite birefringent member as a whole, the value A1 defined by the following formula (1) ranges from 0.10 to 0.95, preferably form 0.2 to 0.85 and more preferably form 0.3 to 0.80, the value A2 defined by the following formula (2) ranges from 1.01 to 1.50, preferably from 1.10 to 1.45 and more preferably from 1.20 to 1.40, the value C1 defined by the following formula (4) ranges from 0.40 to 0.95, preferably from 0.45 to 0.85 and more preferably from 0.50 to 0.80, the value C2 defined by the following formula (5) ranges from 1.05 to 1.93, preferably from 1.10 to 1.90 and more preferably from 1.15 to 1.85, and Rth(550) is from 70 to 400 nm, preferably from 100 to 300 and more preferably from 130 to 250.

Value $A1 = Re(450)/Re(550)$ (1)

Value $A2 = Re(650)/Re(550)$ (2)

Value $C1 = \{Re(450)/Rth(450)\}/\{Re(550)/Rth(550)\}$ (4)

Value $C2 = \{Re(650)/Rth(650)\}/\{Re(550)/Rth(550)\}$ (5)

wherein $Re(\lambda)$ indicates an in-plane retardation value of the transparent film to light of a wavelength of $\lambda$ (nm); and $Rth(\lambda)$ indicates a thickness-direction retardation value of the transparent film to light of a wavelength of $\lambda$ (nm).

As the material for forming the first birefringent layer, there can be enumerated a material which shows birefringence when stretched or shrunk. As this material, use is preferably made of a polymer from which a transparent film can be produced. This material is not particularly restricted so long as the composite birefringent member finally fulfills the requirements in the invention as described above.

As the polymer to be used as the material for forming the first birefringent layer, there can be enumerated polyolefins (polyethylene, polypropylene, polynorbornene, etc.), amorphous polyolefins, polyimides, polyamide imides, polyamides, polyether imides, polyether ether ketones, polyether ketones, polyketone sulfides, polyether sulfones, polysulfones, polyphenylene sulfide, polyphenylene oxide, polyethylene terephthalate, polyethylene naphthalate, polyacetal, polycarbonate, polyallylate, polymethyl methacrylate, polymethacrylate, polyacrylate, polystyrene, polypropylene, polynorbornene, cellulose-based polymers (triacetylcellulose (TAC), etc.), epoxy resins, phenol resins, norbornene resins, polyester resins, polyethersulfone resins, polysulfone resins, polycarbonate resins, polyamide resins, polyimide resins, polyolefin resins, acrylic resins, polynorbornene resins, polyallylate resins, polystyrene resins, polyvinyl alcohol resins, polyvinyl chloride resins, polyvinylidene chloride resins, polyacrylic resins and mixtures thereof.

As the material for forming the first birefringent layer, it is also possible to use a liquid crystal polymer and the like. For example, use can be made of a mixture of a thermoplastic resin having a substituted imide group or an unsubstituted imide group in its side chain with another thermoplastic resin having a substituted phenyl group or an unsubstituted phenyl group and a nitrile group in its side chain, as reported in JP-A-2001-343529 (WO 01/37007). Specific examples thereof include a mixture of an alternate copolymer of isobutene and N-methyl maleimide with an acrylonitrile/styrene copolymer.

Among these materials, it is preferable to use as the material for forming the first birefringent layer, for example, polyethylene, polypropylene, polynorbornene, cellulose-based polymers, polymer carbonate resins and so on. It is also preferable that the material for forming the first birefringent layer has a negative birefringence. Moreover, it is preferable that the first birefringent layer has such a characteristic as $Re(400)/Re(550)<1$. From the viewpoint of having this characteristic, it is particularly preferable to use a cellulose-based polymer, in particular, cellulose acylate.

(Method of Regulating Re or Rth: Retardation Raising Agent Having Maximum Absorption Wavelength ($\lambda$max) Shorter Than 250 nm)

To regulate the absolute value of Re or Rth of the composite birefringent member of the invention, it is preferable to use a compound which has a maximum absorption wavelength ($\lambda$max) shorter than 250 nm in the UV absorption spectrum of a solution as a retardation raising agent. By using such a compound, the absolute value can be regulated without causing a substantial change in the wavelength dependency of Re or Rth in the visible region.

The term "retardation raising agent" means such an "additive" that the Re or Rth retardation value of a cellulose acylate film, which contains the additive, measured at a wavelength of 550 nm is higher by 20 nm or more than the Re or Rth retardation value of another optical resin film which is produced in the same manner but not using the additive. The raise in the retardation value is preferably 30 nm or more, still preferably 40 nm or more and most preferably 60 nm or more.

From the viewpoint of the function as a retardation raising agent, a rod-shaped compound is preferable and a compound having at least one aromatic ring is preferred and a compound having at least two aromatic rings is more preferred.

A rod-shaped compound having a linear molecular structure is preferred. The term "linear molecular structure" means that the molecular structure of a rod-shaped compound is linear in the thermodynamically most stable structure thereof. The thermodynamically most stable structure can be determined by analyzing crystalline structure or computing molecular orbital. Namely, the molecular structure wherein the heat of the formation of the compound attains the minimum level can be determined by computing the molecular orbital with the use of, for example, a molecular orbit computing software (for example, Win MOPAC 2000 manufactured by FUJITSU). A linear molecular structure means that, in the thermodynamically most stable state computed as described above, the angle of the molecular structure is 140° or above.

It is preferable that the rod-shaped compound shows liquid crystallinity. It is more preferred that the rod-shaped compound shows liquid crystallinity when heated (i.e., having thermotropic liquid crystallinity). As the liquid crystal phase, a nematic phase or a smectic phase is preferred.

Although preferable compounds are described in JP-A-2004-4550, the invention is not restricted thereto. Use may be also made of two or more rod-shaped compounds each having a maximum absorption wavelength ($\lambda$max) shorter than 250 nm in the UV absorption spectrum of a solution thereof.

Rod-shaped compounds can be synthesized by referring to methods reported in documents. As the documents, there can be enumerated Mol. Cryst. Liq. Cryst., vol. 53, p. 229 (1979); ibid. vol. 89, p. 93 (1982); ibid. vol. 145, p. 111 (1987); ibid. vol. 170, p. 43 (1989); J. Am. Chem. Soc., vol. 113, p. 1349 (1991); ibid. vol. 118, p. 5346 (1996); ibid. vol. 92, p. 1582 (1970); J. Org. Chem., vol. 40, p. 420 (1975); and Tetrahedron, vol. 49, No. 16, p. 3437 (1992).

In the invention, it is preferable to add the retardation raising agent in an amount of from 0.1 to 30% by mass, more preferably from 0.5 to 20% by mass, based on the amount of the polymer.

On at least one face of the first birefringent layer, the polymer forming the second birefringent layer as defined above is coated to form a precursor layer for the second birefringent layer. Although the coating method is not particularly restricted, there can be enumerated a method of melting the amorphous liquid crystal polymer by heating and coating the same, a method of coating a solution having the amorphous liquid crystal polymer dissolved in a solvent and so on. Among all, the method of coating a polymer solution is preferred from the viewpoint of workability and the regulation of optical anisotropy.

The polymer concentration in the amorphous liquid crystal polymer solution is not particularly restricted. To give a viscosity appropriate for coating, it is preferable, for example, to use from 0.5 to 50 parts by mass, preferably from 5 to 50 parts by mass and more preferably from 10 to 40 parts by mass, of the polymer per 100 parts by mass of the solvent. It is preferable to use the polymer in an amount of 0.5 part by mass or more per 100 parts by mass of the solvent, since a viscosity appropriate for coating can be thus obtained. It is preferable to use the polymer in an amount of not more than 50 parts by mass, since a viscosity at which a smooth coated face is formed can be obtained thereby.

The solvent of the polymer solution as described above is not particularly restricted so long as the forming material such as the non-liquid crystal polymer is dissolved therein. Namely, an appropriate solvent may be selected depending on the type of the forming material. As specific examples of the solvent, there can be enumerated halogenated hydrocarbons such as chloroform, dichloromethane, carbon tetrachloride, dichloroethane, tetrachloroethane, trichloroethylene, tetrachloroethylene, chlorobenzene and ortho-dichlorobenzene; phenols such as phenol and para-chlorophenol; aromatic hydrocarbons such as benzene, toluene, xylene, methoxybenzene and 1,2-dimethoxybenzene; ketones such as acetone, methyl ethyl ketone, methyl isobutyl ketone, cyclohexanone, cyclopentanone, 2-pyrrolidone and N-methyl-2-pyrrolidone; esters such as ethyl acetate and butyl acetate; alcohols such as t-butyl alcohol, glycerol, ethylene glycol, triethylene glycol, ethylene glycol monomethyl ether, diethylene glycol dimethyl ether, propylene glycol, dipropylene glycol and 2-methyl-2,4-pentanediol; amides such as dimethylformamide and dimethylacetamide; nitriles such as acetonitrile and butyronitrile; ethers such as diethyl ether, dibutyl ether and tetrahydrofuran; carbon disulfide, ethyl cellosolve, butyl cellosolve and so on. Either one of these solvents or two or more of the same may be used. It is preferable to use a solvent having no corrosive action on the first birefringent layer.

The polymer solution may further contain various additives such as a stabilizer, a plasticizer, metals and so on, if needed.

Moreover, the polymer solution may contain an additional different resin within such a scope that the orientation properties, etc. of the forming material are not considerably worsened thereby. Examples of such an additional resin include various resins commonly employed, engineering plastics, thermoplastic resins, thermosetting resins and so on.

As the resins commonly employed, there can be enumerated, for example, polyethylene (PE), polypropylene (PP), polystyrene (PS), polymethyl methacrylate (PMMA), ABS resins, AS resins and so on. As the engineering plastics, there can be enumerated, for example, polyacetate (POM), polycarbonate (PC), polyamide (PA: nylon), polyethylene terephthalate (PET), polybutylene terephthalate (PBT) and so on. As the thermoplastic resins, there can be enumerated, for example, polyphenylene sulfide (PPS), polyether sulfone (PES), polyketone (PK), polyimide (PI), polycyclohexanedimethanol terephthalate (PCT), polyarylate (PAR), liquid crystal polymers (LCP) and so on. As the thermosetting resins, there can be enumerated, for example, epoxy resins, phenol resins, novolak resins and so on.

In the case of blending such an additional resin with the polymer solution, the content thereof may range, for example, from 0 to 50% by mass, preferably form 0 to 30% by mass based on the polymer as described above.

In the case where the material forming the second birefringent layer is a liquid crystal compound, use may be preferably made of a method which comprises forming an orientation film on the first birefringent layer and then rubbing the same. In this case, it is preferred that the orientation direction of the liquid crystal compound corresponds to the width direction of the film. It is also preferred to employ an orientation film reported in JP-A-2002-62427.

[Orientation Film]

In the optically compensatory film of the invention, an orientation film may be provided between the optical film or composite birefringent member of the invention and the optically anisotropic layer. It is also possible that an orientation film is used exclusively in forming the optically anisotropic layer and, after forming the optically anisotropic layer on the orientation film, the optically anisotropic layer alone is transferred onto the optical film or composite birefringent member of the invention.

It is preferable in the invention that the orientation film is a layer made of a crosslinked polymer. The polymer to be used in the orientation film may be either a polymer being crosslinkable per se or a polymer undergoing crosslinkage by using a crosslinking agent. The orientation film is formed by reacting molecules of a polymer having a functional group or a polymer, into which a functional group has been introduced, due to light, heat, pH change, etc. Alternatively, the orientation film can be formed by crosslinking polymer molecules by using a crosslinking agent which is a highly reactive compound and introducing a binding group originating in the crosslinking agent into the polymer molecules.

The orientation film made of the crosslinked polymer can be usually formed by applying a coating solution, which contains the above-described polymer or a mixture of the polymer with the crosslinking agent, on a support followed by, for example, heating.

To prevent dusting in the orientation film in the rubbing step as will be mentioned hereinafter, it is preferable to elevate the degree of crosslinkage. When the degree of crosslinkage is defined as a value calculated by subtracting the ratio (Ma/Mb) (wherein Mb stands for the amount of the crosslinking agent added to the coating solution; and Ma stands for the amount of the crosslinking agent remaining after the completion of the crosslinkage) from 1 (1−(Ma/Mb)), the degree of crosslinkage preferably ranges from 50% to 100%, more preferably from 65% to 100% and most preferably from 75% to 100%.

The polymer to be used in the orientation film in the invention may be either a polymer which is crosslinkable per se or a polymer which is crosslinked by a crosslinking agent. Needless to say, it is also possible to use a polymer having both of these functions. As these polymers, there can be enumerated polymers such as polymethyl methacrylate, acrylic acid/methacrylic acid copolymer, styrene/maleimide copolymer, polyvinyl alcohol and denatured polyvinyl alcohol, poly(N-methylolacrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, gelatin, polyethylene, polypropylene and polycarbonate and compounds such as a silane coupling agent. Preferable examples of the polymers include water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are more preferable and polyvinyl alcohol and denatured polyvinyl alcohol are particularly preferable.

In the case of applying polyvinyl alcohol and denatured polyvinyl alcohol directly onto the optical film or composite birefringent member of the invention, use may be preferably made of the method of forming a hydrophilic undercoat layer or conducting a saponification treatment.

In the case of applying polyvinyl alcohol and denatured polyvinyl alcohol directly onto the optical film or composite birefringent member of the invention (in particular, the cellulose acetate film), it is preferable to provide a hydrophilic undercoat layer or employ a method of conducting saponification as mentioned in Japanese Patent Application No. 2000-369004.

Among the polymers as cited above, polyvinyl alcohol or denatured polyvinyl alcohol is preferred.

There are polyvinyl alcohols having degree of saponification of, for example, from 70 to 100%. Those having degree of saponification of from 80 to 100% are generally preferable and those having degree of saponification of from 82 to 98% are more preferable. Polyvinyl alcohols having degree of polymerization of from 100 to 3000 are preferred.

As the denatured polyvinyl alcohol, there can be enumerated those denatured by copolymerization (for example, having a denaturation group such as COONa, $Si(OX)_3$, $N(CH_3)_3Cl$, $C_9H_{10}COO$, $SO_3Na$, $C_{12}H_{25}$, etc. introduced thereinto), those denatured by chain transfer (for example, having a denaturation group such as COONa, SH, $SC_{12}H_{25}$, etc. introduced thereinto) and those denatured by block polymerization (for example, having a denaturation group such as COOH, $CONH_2$, COOR, $C_6H_5$, etc.). Denatured polyvinyl alcohols having degree of polymerization of from 100 to 3000 are preferred. Among them, an undenatured or denatured polyvinyl alcohol having a degree of saponification of from 80 to 100% is preferable and an undenatured or alkylthio-denatured polyvinyl alcohol having a degree of saponification of from 85 to 95% is more preferable.

To impart a favorable adhesiveness between the composite birefringent member and the optically anisotropic layer, it is preferable to introduce a crosslinking/polymerization active group into the polyvinyl alcohol. Preferable examples thereof are mentioned in detail in JP-A-8-338913.

In the case of using a hydrophilic polymer such as polyvinyl alcohol in the orientation film, it is preferable to regulate the moisture content thereof from the viewpoint of film hardness. Namely, the moisture content preferably ranges from 0.4% to 2.5%, more preferably from 0.6 to 1.6%. The moisture content can be measured by a marketed moisture content meter of the Karl Fischer method.

It is preferable that the orientation film has a film thickness of 10 μm or less.

[Polarizing Plate]

In the invention, use can be made of a polarizing plate comprising a polarizing film and a pair of protective films holding the polarizing film. For example, it is possible to use a polarizing plate constructed by dyeing a polarizing film made of polyvinyl alcohol, etc. with iodine, stretching the polarizing film and then laminating protective films on both faces thereof. The polarizing plate is located outside a liquid crystal cell. It is preferable to provide a pair of polarizing plates, each comprising a polarizing film and a pair of protective films holding the polarizing film, in both sides of the liquid crystal cell. As discussed above, the protective film located in the liquid crystal cell side may be the optically compensatory film of the invention.

<<Adhesive>>

Although the adhesive to be used for the polarizing film and the protective films is not particularly restricted, it is preferable to use a PVA-based resin (including denatured PVA having an acetoacetyl group, a sulfonate group, a carboxyl group, an oxyalkylene group, etc.) or an aqueous solution of a boron compound can be enumerated. Among all, a PVA-based resin is preferred. After drying, the thickness of the adhesive layer is preferably from 0.01 to 10 µm, particularly preferably form 0.05 to 5 µm.

<<Consistent Process for Producing Polarizing Film and Transparent Protective Film>>

A polarizing plate usable in the invention is produced by a method including the drying step wherein a stretched film for polarizing film is shrunk to thereby lower the content of volatile mattes. It is preferable that, after or during the drying step, a protective film is bonded to at least one face prior to the heating step. More specifically speaking, the bonding can be conducted by a method comprising, in the step of drying the film, bonding a protective film to the polarizing film, which is held at both edges, with the use of an adhesive and then trimming both edges, or another method comprising, after drying, relieving the film for polarizing film from the holders at both edges, trimming the both edges and then bonding a protective film thereto. Trimming can be carried out by using a technique commonly employed, for example, using a cutter such as a knife or using laser beams. After bonding, it is preferable to heat the polarizing plate so as to dry the adhesive and improve the polarization performance. The heating conditions vary from adhesive to adhesive. In the case of an aqueous system, it is preferable to conduct the heating treatment at 30° C. or higher, more preferably at 40° C. to 100° C. and more preferably at 50° C. to 90° C. It is more preferable to conduct these steps in a consistent line from the viewpoints of the performance and the efficiency in production.

<<Performance of Polarizing Plate>>

It is preferable that the optical properties and durability (keeping qualities over a short period and a long period) of the polarizing plate of the invention are equivalent or superior to those of a marketed super-high contrast polarizing plate (for example, HLC2-5618, manufactured by SANRITZ Co.). More specifically speaking, it is preferable that: the visible light transmittance is 42.5% or higher; the degree of polarization $\{(Tp-Tc)/(Tp+Tc)\}^{1/2} \geqq 0.9995$ (wherein Tp stands for a parallel transmittance; and Tc stands for an orthogonal transmittance); and, after allowing to stand in an atmosphere at 60° C. and 90% RH for 500 hours and a dry atmosphere at 80° C. for 500 hours, a change in light transmittance before and after standing is 3% or less (more preferably 1% or less) based on the absolute value and a change in the degree of polarization is 1% or less (more preferably 0.1% or less) based on the absolute value.

In the polarizing plate of the invention, it is preferable to provide an antireflective layer on the surface in the viewing side. From the viewpoint of lessening color change depending on viewing angle in a liquid crystal display, it is preferable to adjust the inner haze within the antireflective layer to 50% or above. Antireflective layers are described in JP-A-2001-33783, JP-A-2001-343646 and JP-A-2002-328228.

In the polarizing plate according to the invention, it is also preferable to provide a light diffusion film as will be discussed hereinafter on the surface in the viewing side.

FIG. 7 is a sectional model view which shows a typical mode of a light diffusion film to be used in the invention.

The light diffusion film 10 shown in FIG. 7 comprises a transparent base film 20 and a light diffusion layer 30, which contains, for example, first light-permeable microparticles 41 and second light-permeable microparticles 42 in a light-permeable resin, stacked thereon. Now, explanation will be made on the case of using two types (having different refractive indexes) of light-permeable microparticles having two peaks in particle size distribution. However, use may be made of light-permeable microparticles having two peaks in particle size distribution of the same types (having the same refractive index) or light-permeable microparticles of a single type.

The first light-permeable microparticles 41 are made of a light-permeable resin, for example, silica microparticles (average particle size 1.0 µm, refractive index 1.51), while the second light-permeable microparticles 42 are made of a light-permeable resin, for example, styrene beads (average particle size 3.5 µm, refractive index 1.61). The light diffusion function is established by taking advantage of the difference in refractive index between the light-permeable microparticles (41 and 42) and the light-permeable resin 40. It is preferable that the difference in refractive index is 0.02 or more but not more than 0.15. In the case where the difference in refractive index is less than 0.02, no light diffusion effect can be obtained in some cases. In the case where the refractive index exceeds 0.15, the whole film is whitened in some cases because of the excessively high light diffusion. It is more preferable that the difference in refractive index is 0.03 or more but not more than 0.13, most preferably 0.04 or more but not more than 0.10.

[Liquid Crystal Display]

The optical film, optically compensatory film or polarizing plate according to the invention can be advantageously used in a liquid crystal display, in particular, a transmission type liquid crystal display.

A liquid crystal display of transmission type comprises a liquid crystal cell and two polarizing plates provided in both sides thereof. A polarizing plate comprises a polarizing film and two protective films provided in both sides thereof. The liquid crystal cell carries liquid crystal sandwiched between two electrode substrates.

The polarizing plate of the invention may be used as at least one of the polarizing plates provided in both sides of the liquid crystal cell. In this case, the polarizing plate of the invention is located so that the optically compensatory film is provided in the liquid crystal side.

It is preferable to use a liquid crystal cell of the VA mode, the OCB mode, the IPS mode or the TN mode.

In a liquid crystal cell of the VA mode, rod-shaped liquid crystal molecules are substantially vertically oriented when no voltage is applied.

Liquid crystal cells of the VA mode include: (1) a VA mode liquid crystal cell in a narrow sense in which rod-shaped liquid crystal molecules are substantially vertically oriented when no voltage is applied, and substantially horizontally oriented when voltage is applied (JP-A-2-176625); (2) a liquid crystal cell of the multidomained VA mode (MVA mode) for enlarging viewing angle (SID97, Digest of tech Papers, 28 (1987) 845); (3) a liquid crystal cell in which rod-shaped liquid crystal molecules are substantially vertically oriented when no voltage is applied, and oriented in a twisted multi-domain state when voltage is applied (n-ASM mode) (Digest of tech Papers, Nihon Ekisho Toronkai, 58-59 (1998)); and (4) a liquid crystal cell of the survival mode (reported in LCD International 98).

A liquid crystal cell of the OCB mode is a liquid crystal cell of the bend orientation mode in which rod-shaped liquid crystal molecules are oriented substantially oppositely (symmetrically) in the upper part and lower part of the liquid crystal cell. Liquid crystal displays using the bend orientation mode liquid crystal cells are disclosed in U.S. Pat. No. 4,583,825 and U.S. Pat. No. 5,410,422. Since rod-shaped liquid crystal molecules are symmetrically oriented in the upper and lower parts of the liquid crystal cell, the liquid crystal cell of the bend orientation mode has an optically self-compensatory function.

Thus, a liquid crystal cell of this mode is called the OCB (Optically Compensatory Bend) liquid crystal mode. A liquid crystal display of the bend orientation mode is advantageous in a high response speed.

In a liquid crystal cell of the TN mode, rod-shaped liquid crystal molecules are substantially horizontally oriented when no voltage is applied, and further oriented in a direction twisted by 60 to 120°.

Liquid crystal cells of the TN mode, which are most frequently employed in color TFT liquid crystal displays, have been reported in a number of documents.

EXAMPLES

Next, the invention will be illustrated in greater detail by referring the following Example. However, it is to be understood that the invention is not restricted thereto.

Example 1

Application to OCB Mode (Formation of Cellulose Acylate Film PK-1)
The following composition was poured into a mixing tank and stirred under heating to dissolve individual components. Thus, a cellulose acetate solution was prepared.

| Materials: solution composition | |
|---|---|
| Cellulose acetate (degree of substitution 2.81, degree of acetylation 60.2%) | 100.0 parts by mass |
| Triphenyl phosphate (plasticizer) | 6.5 parts by mass |
| Biphenyl phosphate (plasticizer) | 5.2 parts by mass |
| Methylene chloride (first solvent) | 500 parts by mass |
| Methanol (second solvent) | 80 parts by mass |
| Retardation raising agent (A) | 1.0 parts by mass |
| Retardation raising agent (B) | 2.5 parts by mass |

(A) Retardation raising agent

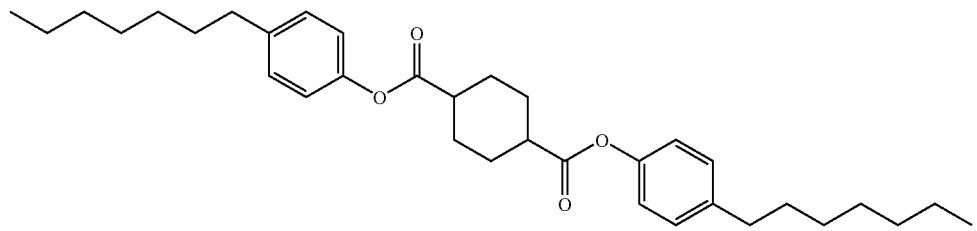

(B) Retardation raising agent

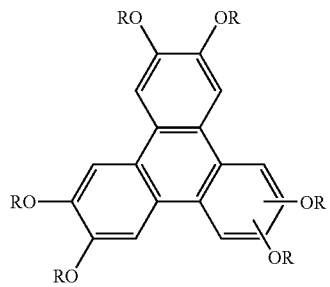

R:

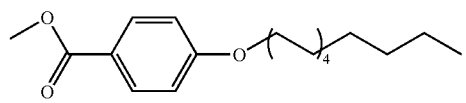

The obtained dope was cast by using a casting machine provided with a band of 2 m in width and 65 m in length. When the film face temperature on the band attained 40° C., the film was dried for 1 minute and stripped. Then, it was further dried under a drying air stream at 135° C. for 20 minutes. Next, this film was uniaxially stretched at a ratio of 120% at a temperature of 185° C. and wound into a roll. The thickness of the TAC film thus formed was 88 μm. Then, it was cooled to room temperature by allowing to stand to thereby give a rolled optical film (PK-1).

The glass transition temperature of PK-1 was 145° C.

Next, the optical characteristics of the film thus produced were measured. After conditioning at 25° C. and 55% RH for 2 hours, Re(550) thereof measured was 45.0 nm and the retardation Rth(550) thereof measured at a wavelength of 550 nm was 160.0 nm.

Figure 8:
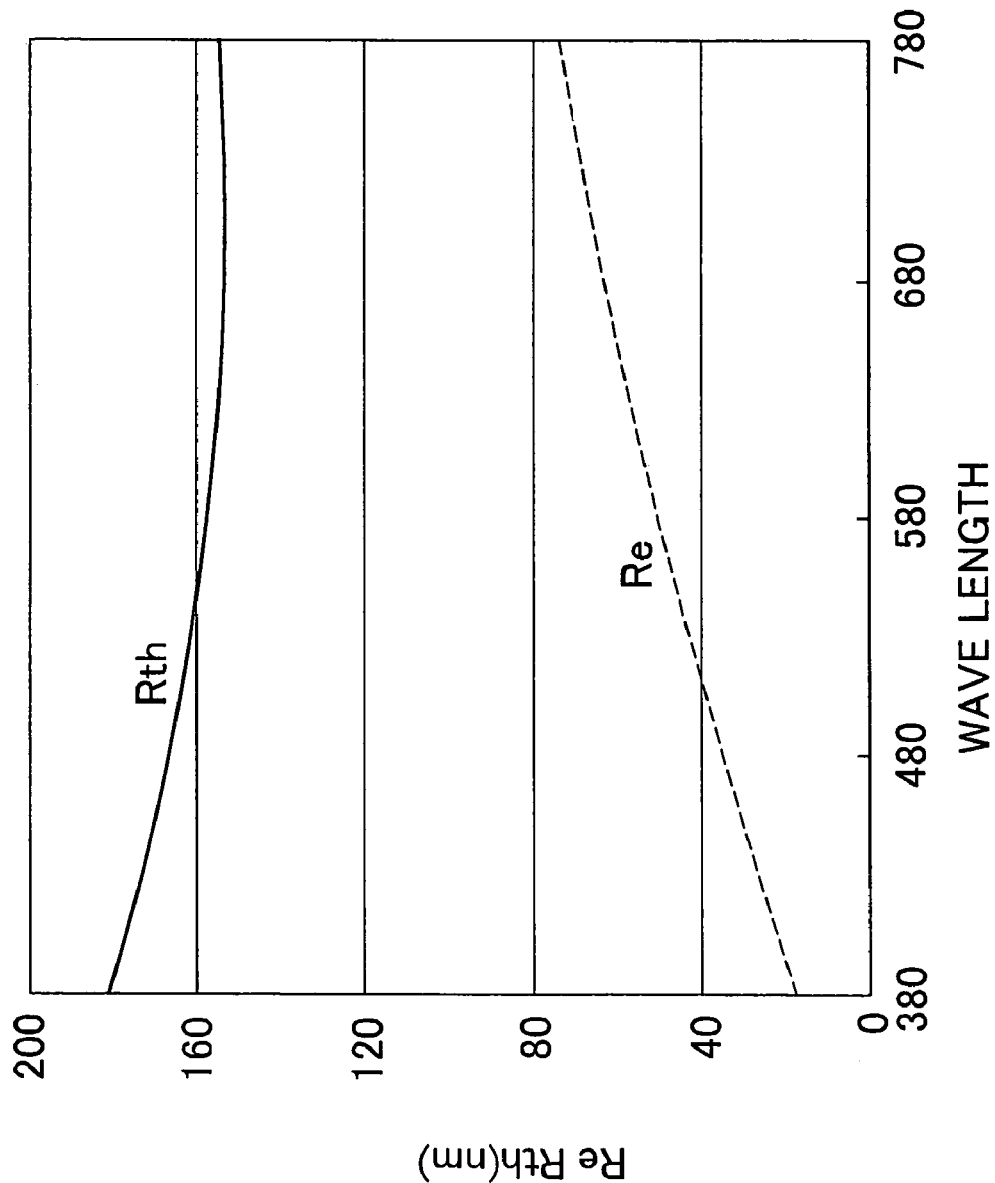
FIG. 8 provides curves showing the Re and Rth data measured in Example 1.

Similarly, the retardation (Re) values measured at wavelengths of 450 nm and 650 nm were 31 nm and 59 nm respectively, while the retardation (Rth) values measured at wavelengths of 450 nm and 650 nm were 171 nm and 155 nm respectively. FIG. 8 provides curves showing the Re and Rth data measured in this Example 1.

When the polarizing plate was disposed in the crossed Nicols configuration, unevenness in the optically compensatory sheet thus obtained was observed. As a result, no unevenness was detected from the front direction and direction tilting at 60° from the normal line.

(Saponification of PK-1)

In the band face side of the PK-1 thus formed, a 1.0 N potassium hydroxide solution (solvent: water/isopropyl alcohol/propylene glycol=69.2 parts by mass/15 parts by mass/15.8 parts by mass) was coated at a ratio of 10 cc/m². After maintaining at about 40° C. for 30 seconds, the alkali solution was scratched off and the face was washed with purified water. After removing water droplets with an air knife, it was dried at 10° C. for 15 seconds. The contact angle of the PK-2 to purified water was 42°.

(Formation of Orientation Film)

A coating solution for orientation film having the following composition was coated on the saponified face of PK-1 with a #14 wire bar coater at a ratio of 24 ml/m². After drying under a hot air stream at 60° C. for 60 seconds and another hot air stream at 90° C. for 150 seconds, the film thus formed was rubbed in the direction at an angle of 45° to the stretching direction (almost agreeing with the slow axis) of PK-1.

| Composition of coating solution for orientation film | |
| --- | --- |
| Denatured polyvinyl alcohol as shown below | 10 parts by mass |
| Water | 371 parts by mass |
| Methanol | 119 parts by mass |
| Glutaraldehyde (crosslinking agent) | 0.5 part by mass |

Denatured polyvinyl alcohol

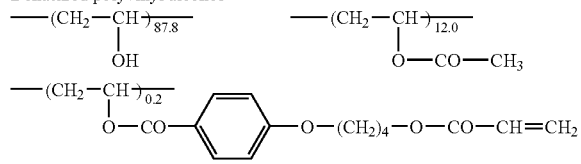

(Formation of Optically Anisotropic Layer)

In 400.0 parts by mass of methyl ethyl ketone, 100 parts by mass of the discotic compound D-89 as shown above, 0.4 part by mass of an atmospheric interface orientation regulating agent V-(1) as shown below, 3 parts by mass of a photopolymerization initiator (IRGACURE 907, manufactured by Ciba-Geigy) and 1 part by mass of a sensitizer (KAYACURE DETX, manufactured by Nippon Kayaku Co., Ltd.) were dissolved to give a coating solution. This coating solution was continuously applied to the orientation film with a #3.0 wire bar. Next, it was attached to a metallic frame and heated in a thermostat at 95° C. for 2 minutes to thereby orient the discotic compound. Subsequently, it was irradiated with ultraviolet light from a high-pressure mercury lamp (120 W/cm) at 80° C. for 1 minute to thereby polymerize the discotic compound. Next, it was cooled to room temperature by allowing to stand. Thus, an optically anisotropic layer is formed and an optically compensatory sheet (KH-1) was formed. The liquid crystal transition temperature of this liquid crystal compound layer observed under a polarization microscope was 75° C.

Atmospheric Interface Orientation Regulating Agent V-(1)

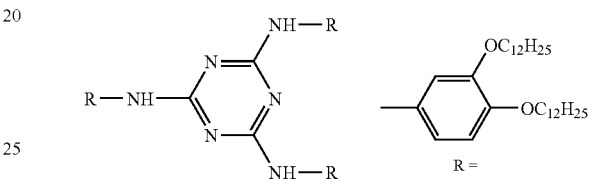

By using the same procedure, an orientation film was formed on a glass plate and an optically anisotropic layer was formed on the orientation film. As the results of Re measurement at individual wavelengths, the Re values of the optically anisotropic layer were as follows: Re(450)=32 nm, Re(550)=30 nm and Re(650)=28 m and Re (450)/Re(650)=1.14.

Comparative Example 1

Formation of Support

The following composition was poured into a mixing tank and stirred under heating to dissolve individual components. Thus, a cellulose acetate solution was prepared.

| Materials: solution composition | |
| --- | --- |
| Cellulose acetate butyrate (CAB381-20, manufactured by EASTMAN CHEMICAL) | 100.0 parts by mass |
| Triphenyl phosphate (plasticizer) | 7.8 parts by mass |
| Biphenyl phosphate (plasticizer) | 3.9 parts by mass |
| Methylene chloride (first solvent) | 300 parts by mass |
| Methanol (second solvent) | 45 parts by mass |

The obtained dope was cast by using a casting machine provided with a band of 2 m in width and 65 m in length. When the film face temperature on the band attained 40° C., the film was dried for 1 minute and stripped. Then, it was stretched at a ratio of 28% in the width direction by using a tenter under a drying air stream at 140° C. Further, it was dried under a drying air stream at 135° C. for 20 minutes. Thus, a support (PK-2) having a residual solvent content of 0.3% by mass was formed. The glass transition temperature of PK-2 was 105° C.

The width of the support (PK-2) thus obtained was 1340 mm and the thickness thereof was 92 μm. Re(550) thereof measured was 38 nm and the retardation Rth(550) thereof measured was 175 mm.

Similarly, the retardation (Re) values measured at wavelengths of 450 nm and 650 nm were 40 nm and 37 nm respectively, while the retardation (Rth) values measured at wavelengths of 450 nm and 650 nm were 178 nm and 173 nm respectively.

An orientation film was formed in PK-2 as in Example 1 and rubbed.

In 204.0 parts by mass of methyl ethyl ketone, 95 parts by mass of the discotic compound as shown above, 5 part by mass of ethylene oxide-denatured trimethylolpropane triacrylate (V#360, manufactured by Osaka Yuki Kagaku K.K.), 1 part by mass of cellulose acetate butyrate (CAB531-1, manufactured by EASTMAN CHEMICAL), 3 parts by mass of a photopolymerization initiator (IRGACURE 907, manufactured by Ciba-Geigy) and 1 part by mass of a sensitizer (KAYACURE DETX, manufactured by Nippon Kayaku Co., Ltd.) were dissolved to give a coating solution. This coating solution was applied to the orientation film with a #3.4 wire bar. Next, it was attached to a metallic frame and heated in a thermostat at 145° C. for 2 minutes to thereby orient the discotic compound. Subsequently, it was irradiated with ultraviolet light from a high-pressure mercury lamp (120 W/cm) at 110° C. for 1 minute to thereby polymerize the discotic compound. Next, it was cooled to room temperature by allowing to stand. Thus, an optically anisotropic layer is formed and an optically compensatory sheet (KH-2) was formed. The liquid crystal transition temperature of this liquid crystal compound layer observed under a polarization microscope was 130° C.

Discotic Liquid Crystal Compound

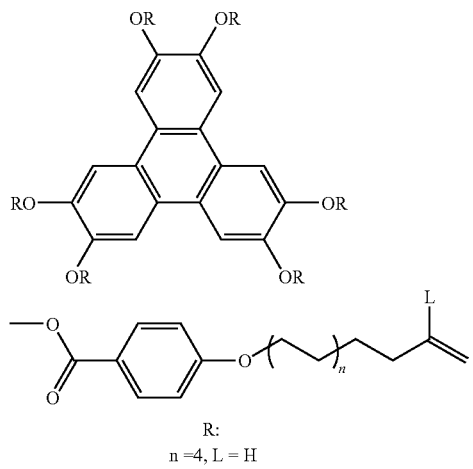

R:
n = 4, L = H

By using the same procedure, an orientation film was formed on a glass plate and an optically anisotropic layer was formed on the orientation film. As the results of Re measurement at individual wavelengths, the Re values of the optically anisotropic layer were as follows: Re(450)=34 nm, Re(550) =30 nm and Re(650)=27 nm and Re (450)/Re(650)=1.26.

Example 2

Construction of Polarizing Plate

Iodine was absorbed onto a stretched polyvinyl alcohol film to prepare a polarizing film. By using a polyvinyl alcohol-based adhesive, the film (KH-1) produced in Example 1 was bonded to one face of the polarizing film. The transmission axis of the polarizing film was located in parallel to the slow axis of PK-1.

A commercially available cellulose acetate film (FUJITAC TD80UF, manufactured by Fuji Photo Film Co., Ltd.) was saponified and bonded to the opposite side of the polarizing film using a polyvinyl alcohol-based adhesive. Thus, a polarizing plate was constructed.

Comparative Example 2

Construction of Polarizing Plate

Iodine was absorbed onto a stretched polyvinyl alcohol film to prepare a polarizing film. By using a polyvinyl alcohol-based adhesive, the film (KH-2) produced in Comparative Example 1 was bonded to one face of the polarizing film. The transmission axis of the polarizing film was located in parallel to the slow axis of PK-2.

A commercially available cellulose acetate film (FUJITAC TD80UF, manufactured by Fuji Photo Film Co., Ltd.) was saponified and bonded to the opposite side of the polarizing film using a polyvinyl alcohol-based adhesive. Thus, a polarizing plate was constructed.

Example 3

Packaging Evaluation in Liquid Crystal Display (Construction of Bend Orientation Liquid Crystal Cell)

Polyimide films were formed as orientation films on ITO electrode-provided glass substrates and subjected to rubbing. Two glass substrates thus obtained were made to face to each other so that the rubbing directions were in parallel and the cell gap was adjusted to 4.7 µm. A liquid crystal compound (ZLI1132, manufactured by Merck) having Δn of 0.1396 was poured into the cell gap to give a bend orientation liquid crystal cell.

The two polarizing plates constructed in Example 2 were bonded so that the bend orientation liquid crystal cell constructed above was sandwiched between them. The optically anisotropic layer of each polarizing plate was made to face to the cell substrate and the rubbing direction of the liquid crystal cell was in anti-parallel to the rubbing direction of the optically anisotropic layer facing thereto.

A square wave voltage at 55 Hz was applied to the liquid crystal cell. Use was made of the normally white system of white display at 2 V and black display at 5 V. The voltage giving the minimum transmittance at the front (i.e., the black voltage) was applied and the black display transmittance (%) in the viewing angle direction of an azimuth angle of 0° and a polar angle of 60° and the color shift Δx between an azimuth angle of 0° and a polar angle 60° and an azimuth angle of 180° and a polar angle 60° were determined. Table 1 shows the results. By referring a transmittance ratio (white display/ black display) as to a contrast ratio, viewing angles and front CR were measured in 8 grades from black display (L1) to white display (L8) with the use of a measuring machine (EZ-Contrast 160D, manufactured by ELDIM). Table 2 shows the results.

Comparative Example 3

A liquid crystal cell was constructed as in Example 3 but using the polarizing plate of Comparative Example 2 as a substitute for the polarizing plate of Example 2. Thus, viewing angles were evaluated. Tables 1 and 2 show the results.

TABLE 1

|       | Value A1 | Value A2 | Value B1 | Value C1 | Value C2 | Color shift | Transmittance |
|-------|----------|----------|----------|----------|----------|-------------|---------------|
| Ex. 3 | 0.69     | 1.31     | 1.14     | 0.64     | 1.36     | 0.05        | 0.01          |
| C. Ex. 3 | 1.05  | 0.97     | 1.26     | 1.23     | 1.02     | 0.40        | 0.08          |

Remarks: Color shift: Sum of ΔCu', v'; u', v' (polar angle 60°) − u'v'(polar angle 0°) at azimuth angle 0° and ΔCu', v'; u', v' (polar angle 60°) − u'v'(polar angle 0°) at azimuth angle 180°. (u'v': color coordinates in CIELAB space).

The results in Table 1 indicate that the liquid crystal display of the invention of Example 3, which fulfilled the requirements for the values A1 and A2 of the invention and the values B1, C1 and C2, showed a lower transmittance in black display at a polar angle of 60° and less color shift at the front respectively than those of the liquid crystal display of Comparative Example 3.

TABLE 2

| Liquid display device | Viewing angle (scope showing no inverted gradation in black side at contrast ratio of 10 or above) | | | Front CR |
|---|---|---|---|---|
| | Upper | Lower | Left and right | |
| Ex. 3 | 80° | 80° | 80° | 800 |
| C. Ex. 3 | 80° | 80° | 80° | 470 |

Remarks: Inverted gradation in black side: inversion between L1 and L2.

Example 4

Application to OCB Mode (Formation of Composite Birefringent Member TF-01)

An isotropic Norbornene film of 100 μm in thickness was uniaxially tenter-stretched in the transverse direction at 175° C. at a ratio of 170% to give a stretched Norbornene film of 60 μm in thickness (a first birefringent layer). The optical characteristics of this film were as follows: Re(550)=115 nm, Rth(550)=65.

A polyimide having a mass-average molecular weight (Mw) of 120,000, which had been synthesized from 2,2'-bis (3,4-dicarboxyphenyl)hexafluoropropane (6FDA) and 2,2'-bis(trifluoromethyl)-4,4'-diaminobiphenyl (PFMBTFMB), was dissolved in cyclohexanone to give a 15% by mass polyimide solution. This solution was coated on the stretched Norbornene film as described above. By heating at 100° C. for 10 minutes, a completely transparent and flat polyimide film of 5 μm in thickness was formed on the stretched Norbornene film. Further, it was uniaxially stretched in the longitudinal direction at 175° C. at a ratio of 3% to give a composite birefringent member.

The optical characteristics of the composite birefringent member TF-01 thus formed were measured. Re(550) measured after conditioning for 2 hours at 25° C. and 55% RH was 45.0 nm. Rth(550) thus measured was 160.0 nm. The optical characteristics of the above-described polyimide film (the second birefringent layer) were as follows: Re(550)=70, Rth(550)=95.

Similarly, the retardation (Re) values measured at wavelengths of 450 nm and 650 nm were 31 nm and 59 nm respectively, while the retardation (Rth) values measured at wavelengths of 450 nm and 650 nm were 171 nm and 155 nm respectively.

That is, value A1=0.69, value A2=1.31, value B1=0.64 and value B2=1.35.

In the polyimide side of this TF-01, a 1.0 N potassium hydroxide solution (solvent: water/isopropyl alcohol/propylene glycol=69.2 parts by mass/15 parts by mass/15.8 parts by mass) was coated at a ratio of 10 cc/m². After maintaining at about 40° C. for 30 seconds, the alkali solution was scratched off and the face was washed with purified water. After removing water droplets with an air knife, it was dried at 100° C. for 15 seconds.

The contact angle of the alkali-treated face to purified water was 42°.

(Formation of Orientation Film)

A coating solution for orientation film having the following composition was coated on the alkali-treated face with a #16 wire bar at a ratio of 28 ml/m². After drying under a hot air stream at 60° C. for 60 seconds and another hot air stream at 90° C. for 150 seconds, an orientation film was formed.

| Composition of coating solution for orientation film | |
|---|---|
| Denatured polyvinyl alcohol as shown below | 10 parts by mass |
| Water | 371 parts by mass |
| Methanol | 119 parts by mass |
| Glutaraldehyde (crosslinking agent) | 0.5 part by mass |
| Citric acid ester (AS3, manufactured by Snakyo Chemical Industry, Co., Ltd.) | 0.35 part by weight |

Denatured polyvinyl alcohol

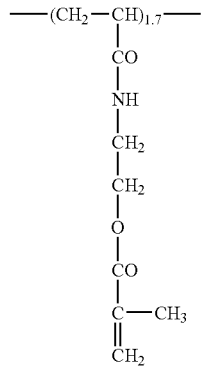

(Rubbing)

While transporting the transparent film having the orientation film formed thereon at a speed of 20 m/min, rubbing rolls (300 mm in diameter) were set so as to conduct rubbing at an angle of 45° to the longitudinal direction and rotated at 650 rpm. Thus, the transparent film was rubbed in the surface having the orientation film. The contact length of the rubbing rolls with the transparent film was 18 mm.

(Formation of Optically Anisotropic Layer)

In 102 kg of methyl ethyl ketone, 41.0 kg of the discotic liquid crystal compound as shown below, 4.06 kg of ethylene oxide-denatured trimethylolpropane triacrylate (V#360, manufactured by Osaka Yuki Kagaku K.K.), 0.35 kg of cellulose acetate butyrate (CAB531-1, manufactured by EASTMAN CHEMICAL), 1.35 kg of a photopolymerization initiator (IRGACURE 907, manufactured by Ciba-Geigy) and 0.45 kg of a sensitizer (KAYACURE DETX, manufactured by Nippon Kayaku Co., Ltd.) were dissolved. To the resultant solution, 0.1 kg of a fluoroaliphatic group-containing copolymer (MEGAFAC F780 (manufactured by Dainippon Ink and Chemicals, Incorporated) was added to prepare a coating solution. This coating solution was continuously applied to the orientation film face of the transparent film, which was transported at a speed of 20 m/min, by rotating a #3.2 wire bar at 391 rpm in the same direction as the transport direction of the film.

Discotic Liquid Crystal Compound

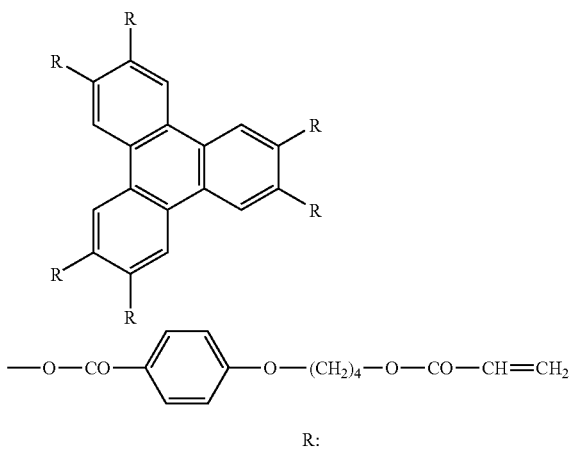

The solvent was dried by continuously heating from room temperature to 100° C. Then, the film was heated for about 90 seconds in a drying zone at 130° C. in such a manner as to give a blowing rate on the film face of the discotic optically anisotropic layer of 2.5 m/sec, thereby orienting the discotic liquid crystal compound. Next, it was transported into another drying zone at 80° C. and irradiated with ultraviolet light (luminance 600 mW) from a UV irradiation device (an UV lamp: output 160 W/cm, illumination length 1.6 m) at the film surface temperature of about 10° C. Thus, crosslinkage was promoted and the discotic liquid crystal compound was fixed to the orientation state. After cooling to room temperature by allowing to stand, the film was wound into a roll. Thus, a rolled optically compensatory film (KH-1) was produced.

The viscosity of the optically anisotropic layer measured at a film face temperature of 127° C. was 695 cp. The viscosity was determined by measuring the viscosity of a liquid crystal layer having the same composition as the optically anisotropic layer (excluding the solvent) by a thermal E-type viscosity system.

A portion of the rolled optically compensatory film KH-1 thus produced was cut out and employed as a sample in measuring the optical characteristics. The retardation Re of the optically anisotropic layer measured at a wavelength of 546 nm was 38 nm. The angle (tilt angle) between the disc face of the discotic liquid crystal compound in the optically anisotropic layer and the support face continuously varied in the depth-direction of the layer and the average thereof was 28°. When the optically anisotropic layer alone was stripped from the sample and the average direction of the molecular symmetry axis of the optically anisotropic layer was measured, this direction was at an angle of 45° to the longitudinal direction of the optically compensatory film.

Example 5

Application to OCB Mode (Formation of Composite Birefringent Member TF-02)

(Formation of Cellulose Acylate film PK-1)

The following composition was poured into a mixing tank and stirred under heating to dissolve individual components. Thus, a cellulose triacetate (triacetylcellulose:TAC) solution was prepared.

| Materials: solution composition | |
|---|---|
| Cellulose acetate (degree of substitution 2.81, degree of acetylation 60.2%) | 100.0 parts by mass |
| Triphenyl phosphate (plasticizer) | 6.5 parts by mass |
| Biphenyl phosphate (plasticizer) | 5.2 parts by mass |
| Methylene chloride (first solvent) | 500 parts by mass |
| Methanol (second solvent) | 80 parts by mass |
| Retardation raising agent as shown below (λmax = 276 nm) | 5.6 parts by mass |

Rth retardation raising agent

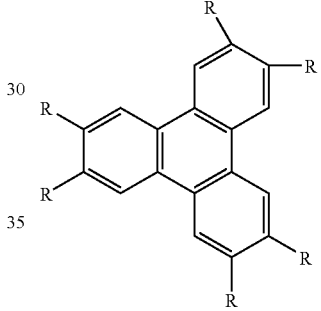

R:

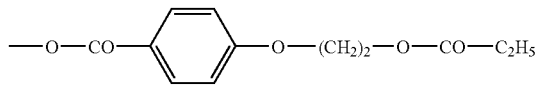

The obtained dope was cast by using a casting machine provided with a band of 2 m in width and 65 m in length. When the film face temperature on the band attained 40° C., the film was dried for 1 minute and stripped. Then, it was further dried under a drying air stream at 135° C. for 20 minutes. Next, this film was uniaxially stretched at a ratio of 140% at a temperature of 185° C. The Tg of the cellulose acylate employed was 140° C.

The thickness of the cellulose acylate film PK-1 thus formed was 88 μm. After conditioning at 25° C. and 55% RH for 2 hours, Re(550) thereof measured with the use of an ellipsometer (M–150 manufactured by JASCO ENGINEERING) was 65.0 nm and Rth(550) thereof was 145.0 nm.

The polyimide used in Example 4 was dissolved in cyclohexanone to give a 15% by mass polyimide solution. This solution was coated on the above-described PK-1. Then it was heated at 100° C. for 10 minutes to form a completely transparent and flat polyimide film (thickness 5 μm) on the PK-1. Further, it was uniaxially stretched at a ratio of 3% at 175° C. in the longitudinal direction to give a composite birefringent member (TF-02).

The optical characteristics of the film TF-02 thus obtained were measured. After conditioning at 25° C. and 55% RH for 2 hours, Re(550) thereof was 45.0 nm and Rth(550) thereof was 165.0 nm. The optical characteristics of the polyimide film (the second birefringent layer) were as follows: Re(550)=20 and Rth(550)=20.

Similarly, the retardation (Re) values measured at wavelengths of 450 nm and 650 nm were 31 nm and 59 nm respectively, while the retardation (Rth) values measured at wavelengths of 450 nm and 650 nm were 176 nm and 160 nm respectively.

That is, value A1=0.69, value A2=1.31, value B1=0.64 and value B2=1.35.

In the cellulose acylate film side of this TF-02, a 1.0 N potassium hydroxide solution (solvent: water/isopropyl alcohol/propylene glycol=69.2 parts by mass/15 parts by mass/15.8 parts by mass) was coated at a ratio of 10 cc/m². After maintaining at about 40° C. for 30 seconds, the alkali solution was scratched off and the face was washed with purified water. After removing water droplets with an air knife, it was dried at 100° C. for 15 seconds.

The contact angle of the alkali-treated face to purified water was 420.

(Formation of Orientation Film)

In alkali-treated face, a denatured polyvinyl alcohol (VA231) shown below was dissolved in a solvent mixture comprising N-methylpyrrolidone/methyl ethyl ketone (ratio by mass=¼) to give a 4% by mass solution. This solution was coated on the PK-1 with a bar coater to give a thickness of 1 μm. This coating layer was dried by heating at 120° C. for 5 minutes. By rubbing the surface of the coating layer in the longitudinal direction of the film, an orientation film was formed.

VA231

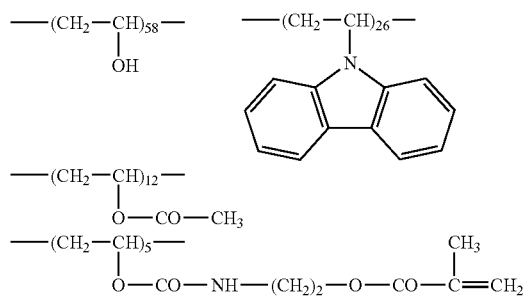

On this orientation film, a coating solution of the following composition was coated with a bar coater to give a thickness of 0.7 μm.

| Composition of coating solution for optically anisotropic layer | |
| --- | --- |
| Rod-shaped liquid crystal compound as shown below | 100 parts by mass |
| Photopolymerization initiator (IRGACURE 907, manufactured by Ciba-Geigy) | 3 parts by mass |
| Photopolymerization sensitizer (KAYACURE DETX, manufactured by Nippon Kayaku Co., Ltd.) | 1 part by mass |
| Methyl ethyl ketone | 400 parts by mass |

Rod-shaped liquid crystal compound

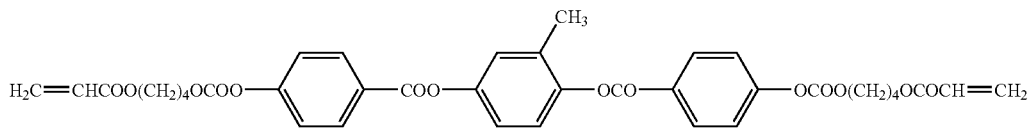

The coating layer was heated at 100° C. for 1 minute to thereby orient the rod-shaped liquid crystal molecules. At the same temperature, it was irradiated with ultraviolet light for 4 seconds to polymerize the rod-shaped liquid crystal molecules, thereby fixing the orientation state. Thus, an optically anisotropic layer was formed and an optically compensatory film was produced. When the orientation properties of the optically anisotropic layer and the director (the major axis direction) of the rod-shaped liquid crystal molecules were observed under a polarization microscope, the rod-shaped liquid crystal molecules had been oriented so that the major axis was orthogonal to the rubbing direction.

Thus, an optically compensatory film (KH-2) was constructed.

Comparative Example 4

Formation of Support PK-3

The following composition was poured into a mixing tank and stirred under heating to dissolve individual components. Thus, a cellulose triacetate solution was prepared.

| Cellulose acetate solution composition | |
| --- | --- |
| Cellulose acetate (degree of acetylation 60.9%) | 100.0 parts by mass |
| Triphenyl phosphate (plasticizer) | 7.8 parts by mass |
| Biphenyl phosphate (plasticizer) | 3.9 parts by mass |
| Methylene chloride (first solvent) | 300 parts by mass |
| Methanol (second solvent) | 45 parts by mass |
| Dye (360 FP manufactured by SUMIKA FINE CHEM) | 0.0009 part by mass |

To another mixing tank, 16 parts by mass of a retardation raising agent (UV526: λmax=328 nm) having the following composition ratio by mass, 80 parts by mass of methylene chloride and 20 parts by mass of methanol were poured and stirred under heating to prepare a retardation raising agent solution.

To 464 parts by mass of the cellulose acetate solution of the above composition, 36 parts by mass of the retardation raising agent solution and 1.1 parts by mass of silica microparticles (R972 manufactured by AEROSIL) were added and the mixture was thoroughly stirred to give a dope. The amount of the retardation raising agent was 5.0 parts by mass per 100 parts by mass of the cellulose acetate. The amount of the silica microparticles was 0.15 parts by mass per 100 parts by mass of the cellulose acetate.

UV526

| Composition ratio | Compound |
|---|---|
| 2 | HO-benzophenone-O-CH₂-phenyl structure |
| 1 | phenyl-CH₂-O-benzophenone-O-CH₂-phenyl structure |

The obtained dope was cast by using a casting machine provided with a band of 2 m in width and 65 m in length. When the film face temperature on the band attained 40° C., the film was dried for 1 minute and stripped. Next, this film was tenter-stretched in the width direction at a ratio of 28% under a drying air stream at a temperature of 140° C. Then it was dried under a drying air stream at 135° C. for 20 minutes to give a support (PK-3) containing 0.3% by mass of the solvent remaining therein. The Tg of the cellulose acylate employed was 140° C.

The width of the obtained support PK-3 thus formed was 1340 mm while its thickness was 92 μm. Re(550) thereof was 38 nm. Rth(550) thereof was 175 nm.

Similarly, the retardation (Re) values measured at wavelengths of 450 nm and 650 nm were 40 nm and 37 nm respectively, while the retardation (Rth) values measured at wavelengths of 450 nm and 650 nm were 178 nm and 173 nm respectively.

That is, value A1=1.05, value A2=0.97, value B1=1.03 and value B2=0.98.

On this PK-3, an optically anisotropic layer was formed as in Example 4 to give an optically compensatory film (KH-H1).

Example 6

Construction of Polarizing Plate

Iodine was absorbed onto a stretched polyvinyl alcohol film to prepare a polarizing film. By using a polyvinyl alcohol-based adhesive, the optically compensatory film (KR-1) produced in Example 4 was bonded to one face of the polarizing film. The transmission axis of the polarizing film was located in parallel to the slow axis of the composite birefringent member in the optically compensatory film (KH-1).

A commercially available cellulose acetate film (FUJITAC TD80UF, manufactured by Fuji Photo Film Co., Ltd.) was saponified and bonded to the opposite side of the polarizing film using a polyvinyl alcohol-based adhesive. Thus, a polarizing plate was constructed.

Example 7

Construction of Polarizing Plate

Iodine was absorbed onto a stretched polyvinyl alcohol film to prepare a polarizing film. By using a polyvinyl alcohol-based adhesive, the optically compensatory film (KH-2) produced in Example 5 was bonded to one face of the polarizing film. The transmission axis of the polarizing film was located in parallel to the slow axis of the composite birefringent member in the optically compensatory film (KH-2).

A commercially available cellulose acetate film (FUJITAC TD80UF, manufactured by Fuji Photo Film Co., Ltd.) was saponified and bonded to the opposite side of the polarizing film using a polyvinyl alcohol-based adhesive. Thus, a polarizing plate was constructed.

Comparative Example 5

Construction of Polarizing Plate

Iodine was absorbed onto a stretched polyvinyl alcohol film to prepare a polarizing film. By using a polyvinyl alcohol-based adhesive, the optically compensatory film (KH-H1) produced in Comparative Example 4 was bonded to one face of the polarizing film. The transmission axis of the polarizing film was located in parallel to the slow axis of the composite birefringent member in the optically compensatory film (KH-H1).

A commercially available cellulose acetate film (FUJITAC TD80UF, manufactured by Fuji Photo Film Co., Ltd.) was saponified and bonded to the opposite side of the polarizing film using a polyvinyl alcohol-based adhesive. Thus, a polarizing plate was constructed.

Example 8

Packaging Evaluation in Liquid Crystal Display (Construction of Bend Orientation Liquid Crystal Cell)

Polyimide films were formed as orientation films on ITO electrode-provided glass substrates and subjected to rubbing. Two glass substrates thus obtained were made to face to each other so that the rubbing directions were in parallel and the cell gap was adjusted to 4.7 μm. A liquid crystal compound (ZLI1132, manufactured by Merck) having Δn of 0.1396 was poured into the cell gap to give a bend orientation liquid crystal cell.

The two polarizing plates constructed in Example 6 were bonded so that the bend orientation liquid crystal cell constructed above was sandwiched between them. The optically anisotropic layer of each polarizing plate was made to face to the cell substrate and the rubbing direction of the liquid crystal cell was in anti-parallel to the rubbing direction of the optically anisotropic layer comprising the discotic compound facing thereto.

A square wave voltage at 55 Hz was applied to the liquid crystal cell. Use was made of the normally white system of white display at 2 V and black display at 5 V. The voltage giving the minimum transmittance at the front (i.e., the black voltage) was applied and the black display transmittance (%) in the viewing angle direction of an azimuth angle of 0° and a polar angle of 60° and the color shift Δx between an azimuth angle of 0° and a polar angle 60° and an azimuth angle of 180° and a polar angle 60° were determined. Table 3 shows the results. By referring a transmittance ratio (white display/black display) as to a contrast ratio, viewing angles were measured in 8 grades from black display (L1) to white display (L8) with the use of a measuring machine (EZ-Contrast 160D, manufactured by ELDIM). Table 2 shows the results.

Comparative Example 6

A liquid crystal cell was constructed as in Example 8 but using the polarizing plate of Comparative Example 5 as a substitute for the polarizing plate of Example 6. Thus, the color shift and the black display transmittance were determined. Table 3 shows the results. Also, viewing angles were evaluated. Table 4 shows the results.

TABLE 3

| | Re/Rth | | | | | | |
|---|---|---|---|---|---|---|---|
| | A: 450 nm | B: 550 nm | C: 650 nm | B1 A/B | B2 C/B | Color shift | Transmittance |
| Ex. 8 | 0.18 | 0.28 | 0.38 | 0.64 | 1.35 | 0.05 | 0.01 |
| C. Ex. 6 | 0.22 | 0.22 | 0.22 | 1.03 | 0.98 | 0.40 | 0.08 |

Remarks: Color shift: sum of ΔCu', v'; u', v' (polar angle 60°) – u'v'(polar angle 0°) at azimuth angle 0° and ΔCu', v'; u', v' (polar angle 60°) – u'v'(polar angle 0°) at azimuth angle 180°. (u'v': color coordinates in CIELAB space).

The results in Table 3 indicate that the liquid crystal display of the invention of Example 8, the Re/Rth (450 nm) of which was 0.64 falling within the scope of from 0.40 to 0.95 times as much as Re/Rth(550 nm) and the Re/Rth (650 nm) of which was 0.35 falling within the scope of from 1.05 to 1.93 times as much as Re/Rth(550 nm), showed a lower transmittance in black display and less color shift at the front respectively than those of the liquid crystal display of Comparative Example 6 the factors of which were excluded from the scope as defined above.

TABLE 4

| Liquid display device | Viewing angle (scope showing no inverted gradation in black side at contrast ratio of 10 or above) | | |
|---|---|---|---|
| | Upper | Lower | Left and right |
| Ex. 8 | 80° | 80° | 80° |
| C. Ex. 6 | 80° | 80° | 80° |

Remarks: Inverted gradation in black side: inversion between L1 and L2.

INDUSTRIAL CAPABILITY

The invention can be used in a liquid crystal display to achieves a high contrast and an improved viewing angle-dependent color shift in black display.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-240265 and JP2005-253692, filed Aug. 22 and Sep. 1, 2005, respectively the contents of which are incorporated herein by reference.

The invention claimed is:

1. An optical film comprising a transparent polymer film, wherein the optical film has: a value A1 defined by formula (1), the value A1 ranging from 0.10 to 0.95; a value A2 defined by the formula (2), the value A2 ranging from 1.01 to 1.50; and a glass transition temperature of 120° C. or higher:

$$\text{Value } A1 = Re(450)/Re(550) \tag{1}$$

$$\text{Value } A2 = Re(650)/Re(550) \tag{2}$$

wherein $Re(\lambda)$ indicates an in-plane retardation value of the optical film to light having a wavelength of $\lambda$ (nm);

wherein the optical film comprises a compound in an amount of 0.01 to 30% by mass, the compound having a maximum absorption wavelength $\lambda$max shorter than 250 nm in a UV absorption spectrum of a solution of the compound.

2. The optical film according to claim 1, wherein the optical film comprises cellulose acylate as a main component of the optical film.

3. The optical film according to claim 1, which has: a value C1 defined by formula (4), the value C1 ranging from 0.40 to 0.95; a value C2 defined by formula (5), the value C1 ranging from 1.05 to 1.93; and Rth(550) of 70 to 400 nm:

$$\text{Value } C1 = \{Re(450)/Rth(450)\}/\{Re(550)/Rth(550)\} \tag{4}$$

$$\text{Value } C2 = \{Re(650)/Rth(650)\}/\{Re(550)/Rth(550)\} \tag{5}$$

wherein $Rth(\lambda)$ indicates a thickness-direction retardation value of the optical film to light having a wavelength of $\lambda$ (nm).

4. The optical film according to claim 3, which comprises a first birefringent layer and a second birefringent layer.

5. An optically compensatory film comprising:
an optical film according to claim 1; and
an optically anisotropic layer comprising a liquid crystal compound, the optically anisotropic layer having a liquid crystal transition temperature of from 25° C. to a temperature higher by 20° C. than a glass transition temperature of the optical film.

6. The optically compensatory film according to claim 5, wherein the optically anisotropic layer has such an optical characteristic to fulfill formula (3):

$$Re(450)/Re(650) \leq 1.25 \tag{3}$$

wherein Re(450) indicates an in-plane retardation value of the optically anisotropic layer to light having a wavelength of 450 nm; and Re(650) indicates an in-plane retardation value of the optically anisotropic layer to light having a wavelength of 650 nm.

7. The optically compensatory film according to claim 5, wherein the liquid crystal compound is a discotic compound.

8. An optically compensatory film comprising:
a transparent film comprising a first birefringent layer and a second birefringent layer; and
an optically anisotropic layer comprising a liquid crystal compound,
wherein the transparent film has: a value A1 defined by formula (1), the value A1 ranging from 0.10 to 0.95; a value A2 defined by formula (2), the value A2 ranging from 1.01 to 1.50; a value B1 defined by formula (4), the value B1 ranging from 0.40 to 0.95; a value B2 defined by formula (5), the value B2 ranging from 1.05 to 1.93; and Rth(550) of 70 to 400 nm:

Value $A1 = Re(450)/Re(550)$ (1)

Value $A2 = Re(650)/Re(550)$ (2)

Value $C1 = \{Re(450)/Rth(450)\}/\{Re(550)/Rth(550)\}$ (4)

Value $C2 = \{Re(650)/Rth(650)\}/\{Re(550)/Rth(550)\}$ (5)

wherein Re(λ) indicates an in-plane retardation value of the transparent film to light having a wavelength of λ (nm); and Rth(λ) indicates a thickness-direction retardation value of the transparent film to light having a wavelength of λ (nm).

9. The optically compensatory film according to claim 8, wherein the first and second birefringent layers differ from each other in wavelength dependency of birefringence.

10. The optically compensatory film according to claim 9, wherein at least one of the first and the second birefringent layers is a birefringent layer comprising a liquid crystal compound.

11. The optically compensatory film according to claim 8, wherein the liquid crystal compound is a discotic compound.

12. A polarizing plate comprising: a polarizer; and an optical film according to claim 1.

13. A liquid crystal display comprising: a liquid crystal cell; and a polarizing plate according to claim 12.

14. The liquid crystal display according to claim 13, wherein the liquid crystal cell is in one of VA mode, OCB mode and IPS mode.

* * * * *